US010638193B2

(12) United States Patent
Ohmura et al.

(10) Patent No.: US 10,638,193 B2
(45) Date of Patent: Apr. 28, 2020

(54) IMAGE PROCESSING DEVICE, IMAGE PROCESSING SYSTEM, AND IMAGE PROCESSING METHOD

(71) Applicants: Keiji Ohmura, Kanagawa (JP); Takeshi Hasegawa, Kanagawa (JP)

(72) Inventors: Keiji Ohmura, Kanagawa (JP); Takeshi Hasegawa, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 250 days.

(21) Appl. No.: 15/647,427

(22) Filed: Jul. 12, 2017

(65) Prior Publication Data
US 2017/0311037 A1 Oct. 26, 2017

Related U.S. Application Data

(63) Continuation of application No. PCT/JP2015/082626, filed on Nov. 19, 2015.

(30) Foreign Application Priority Data

Feb. 5, 2015 (JP) .................................. 2015-021638

(51) Int. Cl.
H04N 21/00 (2011.01)
H04N 21/462 (2011.01)
(Continued)

(52) U.S. Cl.
CPC ......... *H04N 21/4621* (2013.01); *H04N 5/232* (2013.01); *H04N 7/18* (2013.01);
(Continued)

(58) Field of Classification Search
CPC ........ G06T 1/00; H04N 5/232; H04N 19/136; H04N 19/146; H04N 7/181; H04N 21/4621; H04N 7/18; H04N 19/15; G06K 9/32
See application file for complete search history.

(56) References Cited

U.S. PATENT DOCUMENTS 9,256,974 B1 * 2/2016 Hines .................... G06F 3/0346
2004/0022437 A1 * 2/2004 Beardsley .......... G06K 9/00362
382/199
(Continued)

FOREIGN PATENT DOCUMENTS

JP 2008-167429 7/2008
JP 2010-014601 1/2010
(Continued)

OTHER PUBLICATIONS

Extended European Search Report dated Feb. 21, 2018 in European Patent Application No. 15881183.6. 8 pages.
(Continued)

Primary Examiner — Zhihan Zhou
(74) Attorney, Agent, or Firm — Oblon, McClelland, Maier & Neustadt, L.L.P.

(57) ABSTRACT

An image processing device includes: a display unit displaying a first display region displaying a static image being a reference for matching an imaging unit to a predetermined imaging position and a second display region displaying video data imaged by the imaging unit; a determining unit executing a first matching operation of searching for an image coincident with an image of a first reference region set in the first display region, in a frame of the video data, and determining a region of the coincident image as a second reference region; and a correcting unit correcting a position of a determination region being a target of image determination performed with respect to the video data, based on a shift amount between the first reference region and the second reference region, and information representing a positional relationship between the determination region and the first reference region.

12 Claims, 28 Drawing Sheets

(51) Int. Cl.
  *H04N 7/18*     (2006.01)
  *H04N 5/232*    (2006.01)
  *H04N 19/146*   (2014.01)
  *H04N 19/15*    (2014.01)
  *G06K 9/00*     (2006.01)
  *H04N 19/136*   (2014.01)

(52) U.S. Cl.
  CPC .......... *H04N 7/181* (2013.01); *H04N 19/146* (2014.11); *H04N 19/15* (2014.11); *G06K 9/00771* (2013.01); *H04N 19/136* (2014.11)

(56) References Cited

U.S. PATENT DOCUMENTS

| | | | | |
|---|---|---|---|---|
| 2006/0203098 | A1* | 9/2006 | Henninger, III | G06K 9/00771 348/211.99 |
| 2008/0152232 | A1* | 6/2008 | Skans | G08B 13/196 382/209 |
| 2011/0115922 | A1* | 5/2011 | Shimizu | G06T 7/80 348/188 |
| 2012/0207386 | A1* | 8/2012 | Ofek | G11B 27/00 382/168 |
| 2013/0128028 | A1 | 5/2013 | Nagoshi | |
| 2015/0138384 | A1* | 5/2015 | Kennedy | H04N 5/23206 348/211.2 |

FOREIGN PATENT DOCUMENTS

| | | |
|---|---|---|
| JP | 2011-191086 | 9/2011 |
| JP | 2013-108875 | 6/2013 |
| JP | 2016-018571 | 2/2016 |
| JP | 2016-039496 | 3/2016 |
| JP | 2016-048910 | 4/2016 |

OTHER PUBLICATIONS

International Search Report dated Feb. 16, 2016 in PCT/JP2015/082626 filed on Nov. 19, 2015. (with English Translation).
Written Opinion dated Feb. 16, 2016 in PCT/JP2015/082626 filed on Nov. 19, 2015.

* cited by examiner

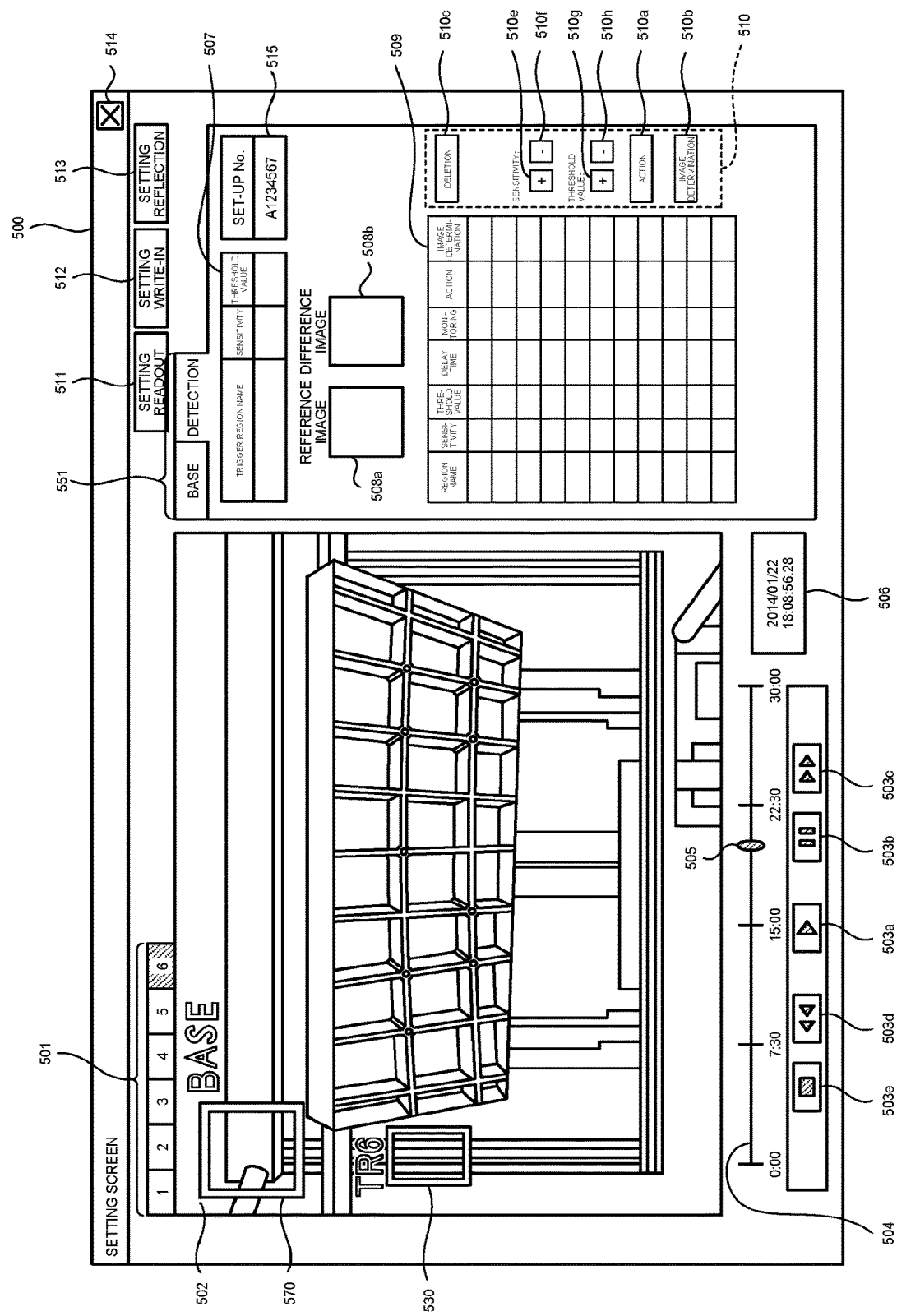

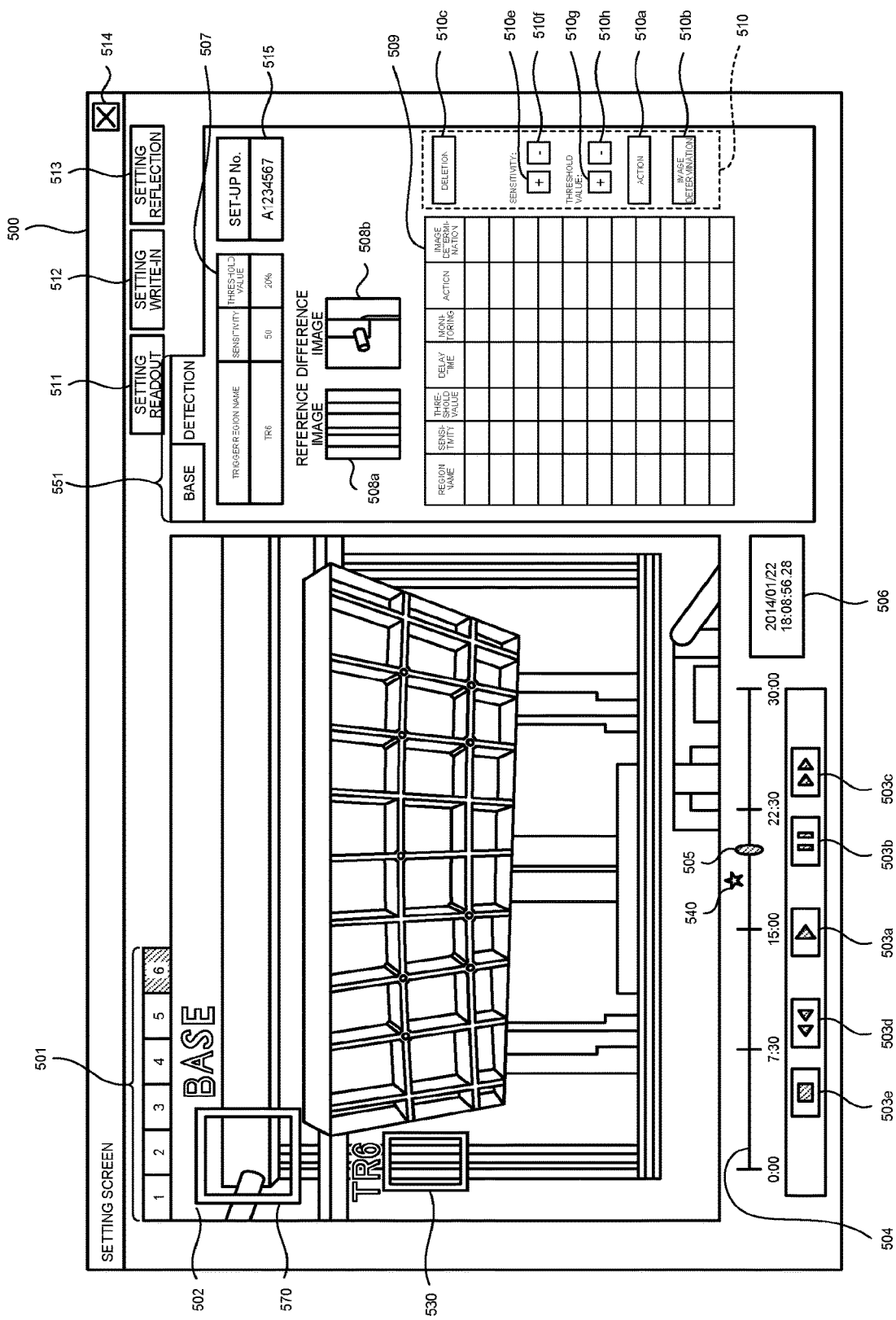

IMAGE PROCESSING DEVICE, IMAGE PROCESSING SYSTEM, AND IMAGE PROCESSING METHOD

CROSS-REFERENCE TO RELATED APPLICATIONS

The present application is a continuation application of International Application No. PCT/JP2015/082626, filed Nov. 19, 2015, which claims priority to Japanese Patent Application No. 2015-021638, filed Feb. 5, 2015. The contents of these applications are incorporated herein by reference in their entirety.

BACKGROUND OF THE INVENTION

1. Field of the Invention

The present invention relates to an image processing device, an image processing system, and an image processing method.

2. Description of the Related Art

Recently, the development of an image monitoring system is remarkable in which video data obtained by recording a video by an imaging device such as a camcorder is analyzed, and the detection of an object, the detection of the movement or the abnormality of the object on the video, or the like is performed. Such an image monitoring system, for example, is applied to a production line or the like of a product. In a production process, in particular, in a case where a small amount and various types of productions are performs, there is a case where different products are produced in the same production process. In a case where different products are produced in the same production process, a so-called set-up change is necessary in which a jig or the like imposing a component is switched to a different jig or the like, the data used in the production process is substituted with different data, or the like. As described above, in a case where the image monitoring system is applied to the production line, there is a case where it is necessary to change the setting or the like of the camera to be used in abnormality detection or the like of the image monitoring system at the time of performing a set-up change operation.

A system has been proposed in which in a case where an abnormality detection target is changed in the production process in such set-up change, the focus of the disposed camera is changed without physically moving a disposing position of the camera of the image monitoring system, and thus, the setting of the camera is changed (refer to Japanese Patent Application Laid-open No 2013-108875).

However, in a technology described in Japanese Patent Application Laid-open No 2013-108875, in the set-up change, in a case where the abnormality detection target in the production process is changed, and it is necessary to performing shooting by moving the disposing position of the camera, there is a problem that it is not possible to solve the problem by only changing the focus.

SUMMARY OF THE INVENTION

According to one aspect of the present invention, an image processing device includes a display unit, a storing unit, a determining unit, and a correcting unit. The display unit is configured to display a first display region displaying a static image which is a reference for matching an imaging unit to a predetermined imaging position and a second display region displaying video data which is imaged by the imaging unit. The storing unit stores information representing a positional relationship between a determination region which is a target of image determination performed with respect to the video data imaged by the imaging unit and a first reference region which is set in the first display region. The determining unit is configured to execute a first matching operation of searching for an image which is coincident with an image of the first reference region, in a frame of the video data displayed on the second display region, and determining a region of the coincident image as a second reference region. The correcting unit configured to correct a position of the determination region based on a shift amount between a position of the first reference region in the first display region and a position of the second reference region in the second display region, and the information representing the positional relationship stored in the storing unit.

BRIEF DESCRIPTION OF THE DRAWINGS

FIG. 8 is a diagram illustrating an example in which a trigger region is designated in the setting video display unit on the setting screen to be displayed on the display device of the information processing device according to the embodiment.

FIG. 9 is a diagram illustrating an example of mark display in a case where a change point is observed in the trigger region on the setting screen to be displayed on the display device of the information processing device according to the embodiment.

The accompanying drawings are intended to depict exemplary embodiments of the present invention and should not be interpreted to limit the scope thereof. Identical or similar reference numerals designate identical or similar components throughout the various drawings.

DETAILED DESCRIPTION OF THE PREFERRED EMBODIMENTS

Figure 1:
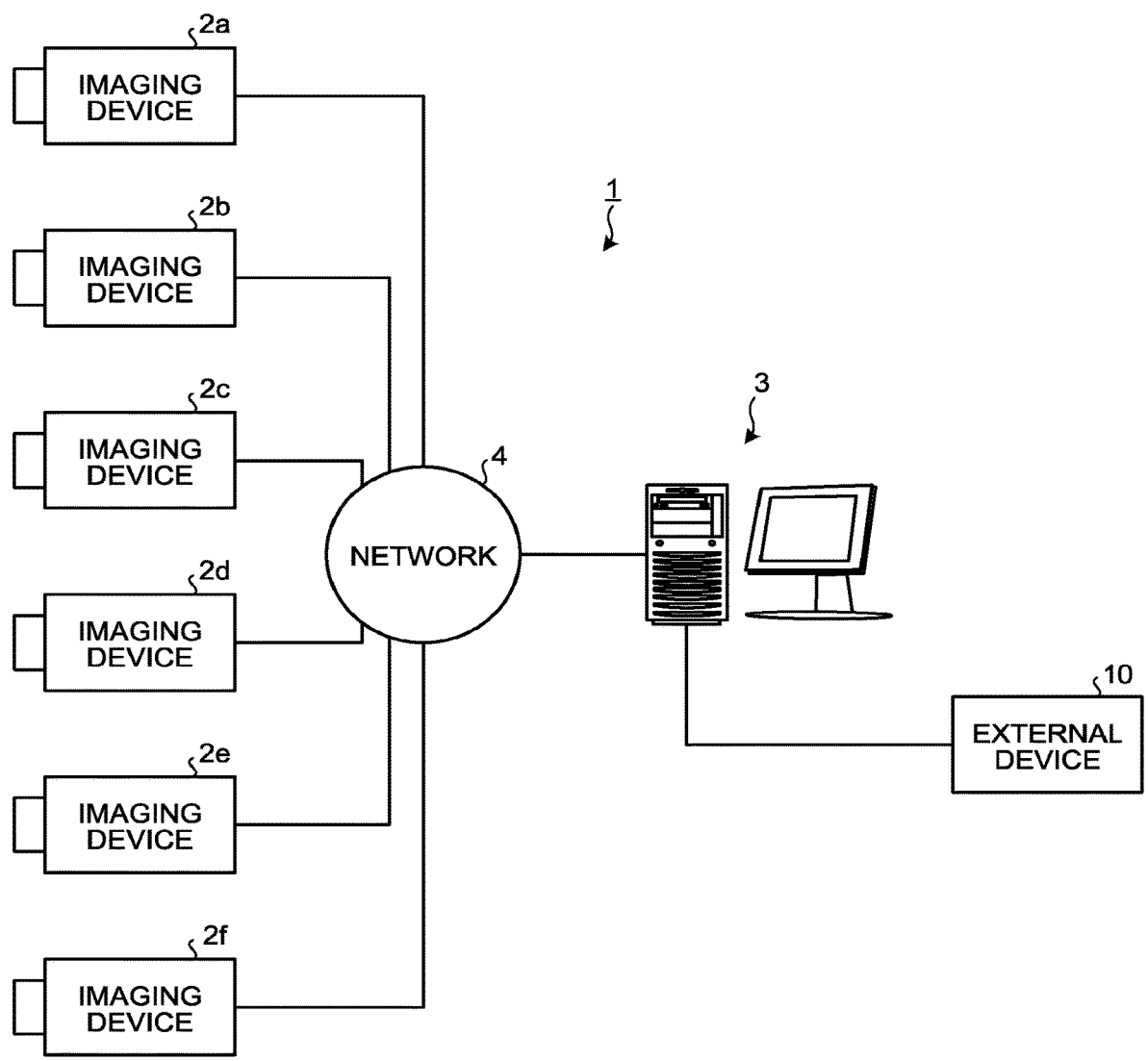
FIG. 1 is a diagram illustrating an example of an overall configuration of an image processing system according to an embodiment.

The terminology used herein is for the purpose of describing particular embodiments only and is not intended to be limiting of the present invention.

As used herein, the singular forms "a", "an" and "the" are intended to include the plural forms as well, unless the context clearly indicates otherwise.

In describing preferred embodiments illustrated in the drawings, specific terminology may be employed for the sake of clarity. However, the disclosure of this patent specification is not intended to be limited to the specific terminology so selected, and it is to be understood that each specific element includes all technical equivalents that have the same function, operate in a similar manner, and achieve a similar result.

Hereinafter, embodiments of an image processing device, an image processing system, and an image processing method of the present invention will be described in detail with reference to the drawings. In addition, the present invention is not limited by the following embodiments, and constituents in the following embodiments include constituents which can be easily conceived by a person skilled in the art, substantially the same constituents, and constituents in a range of so-called equivalents. Further, various omissions, substitutes, changes, and combines can be performed of the constituents within a range not departing from the gist of the following embodiments.

An embodiment has an object to provide an image processing device, an image processing system, and an image processing method, in which a camera can be easily disposed in a correct change position.

(Overall Configuration of Image Processing System)

FIG. 1 is a diagram illustrating an example of the overall configuration of an image processing system according to an embodiment. The overall configuration of an image processing system 1 of this embodiment will be described with reference to FIG. 1.

As illustrated in FIG. 1, the image processing system 1 of this embodiment includes imaging devices 2a to 2f (imaging means), an information processing device 3, and a network 4.

The imaging devices 2a to 2f is a camcorder which converts light from a subject into an electrical signal, and thus, images (shoots) the subject, and generates video data which is a moving image (for example, 10 [FPS]) formed of a plurality of frames (image data). For example, the imaging devices 2a to 2f image a production facility, a production line, or the like, which produces a product, and generate the video data for detecting abnormality with respect to a work, which is a manufacture.

Furthermore, in a case where it is not necessary to distinguish the imaging devices 2a to 2f from each other or in a case where the imaging devices 2a to 2f are collectively referred, the imaging devices 2a to 2f are simply referred to as an "imaging device 2". In addition, in FIG. 1, the image processing system 1 includes six imaging devices 2, but is not limited thereto, and may include other number of imaging devices 2.

The information processing device 3 is a personal computer (PC), a work station, or the like, which functions as an image processing device executing image determination on the basis of the video data imaged by the imaging device 2. In addition, the information processing device 3 is connected to an external device 10 such as a production facility, to communicate with each other, for example, through a field bus standard. A set-up change operation of the information processing device 3 will be described below.

The network 4, for example, is a network of an Ethernet (Registered Trademark) standard for connecting the imaging devices 2a to 2f and the information processing device 3 to each other. In this case, in the network 4, data communication is performed by a protocol such as a transmission control protocol (TCP)/an internet protocol (IP). In addition, in this case, in the imaging devices 2a to 2f and the information processing device 3, a media access control (MAC) address for communicating with a protocol such as TCP/IP is provided, and an IP address such as a private IP address is allocated. In addition, a specific configuration of the network 4, for example, includes a star wiring form in which each of the imaging devices 2a to 2f and the information processing device 3 is connected to a switching hub including a plurality of ports through a local area network (LAN) cable, as an example.

Furthermore, an example will be described in which the network 4 illustrated in FIG. 1 performs communication through TCP/IP, but is not limited thereto, and for example, a form or the like may be adopted in which a plurality of video graphics array (VGA) terminals or universal serial bus (USB) ports are provided on the information processing device 3 side, and a plurality of imaging devices 2 are connected to the information processing device 3 through the VGA cable or the USB cable.

(Hardware Configuration of Information Processing Device)

Figure 2:
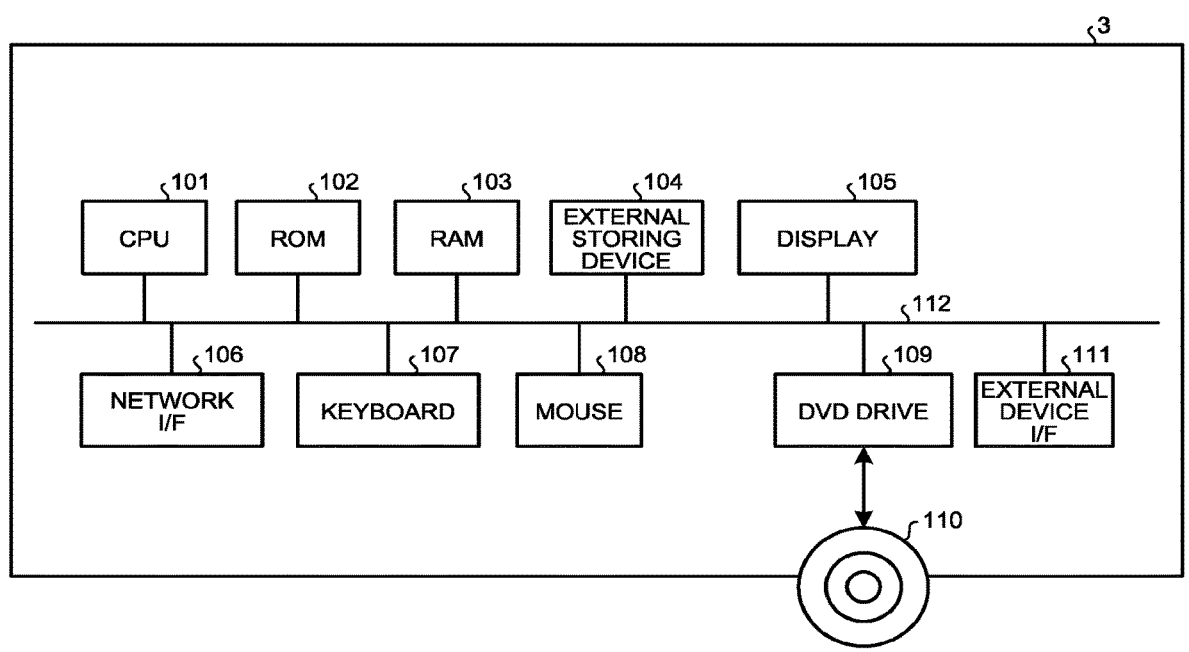
FIG. 2 is a diagram illustrating an example of a hardware configuration of an information processing device according to the embodiment.

FIG. 2 is a diagram illustrating an example of a hardware configuration of the information processing device according to the embodiment. The hardware configuration of the information processing device 3 of this embodiment will be described with reference to FIG. 2.

As illustrated in FIG. 2, the information processing device 3 includes a central processing unit (CPU) 101, a read only memory (ROM) 102, a random access memory (RAM) 103, an external storing device 104, a display 105, a network I/F 106, a keyboard 107, a mouse 108, a digital versatile disc (DVD) drive 109, and an external device I/F 111.

The CPU 101 is a device controlling the entire operation of the information processing device 3. The ROM 102 is a non-volatile storing device which stores a program for the information processing device 3. The RAM 103 is a volatile storing device which is used as a work area of the CPU 101.

The external storing device 104 is a storing device such as a hard disk drive (HDD) or a solid state drive (SSD), which stores various data items such as the video data imaged by the imaging device 2 and setting information.

The display 105 is a display device displaying a screen of various information items such as a cursor, a menu, a window, a character, or an image, or an application for executing image determination processing or the set-up change operation of the information processing device 3. The display 105, for example, is a cathode ray tube (CRT) display, a liquid crystal display, a plasma display, an organic electroluminescence (EL) display, or the like. Furthermore, the display 105, for example, is connected to a main body of the information processing device 3 through a VGA cable, high-definition multimedia interface (HDMI: Registered Trademark) cable, or the like, or is connected to the main body of the information processing device 3 through an Ethernet cable.

The network I/F 106 is an interface for performing the data communication by being connected to the network 4. The network I/F 106, for example, is a network interface card (NIC) which is capable of performing communication in a protocol such as TCP/IP. Specifically, the information processing device 3 acquires the video data from the imaging device 2 through the network 4 and the network I/F 106.

The keyboard 107 is an input device performing the selection of characters, numbers, and various instructions, the movement of the cursor, the setting of setting information, and a set-up number (set-up identification information) which is an item number or the like distinguishing a product or the setting information in the set-up change operation, and the like. Furthermore, the set-up number is not limited to a set-up number configured only of numbers, and may be a set-up number in which alphabetical characters, symbols, and the like are combined. The mouse 108 is an input device for performing the selection and the execution of various instructions, the selection of a processing target, the movement of the cursor, the setting of the setting information, and the like.

The DVD drive 109 is a device which reads out data from a DVD 110, as an example of a detachable storing medium, writes data in the DVD, and deletes data from the DVD.

The external device I/F 111 is an interface for performing the data communication by being connected to the external device 10. The external device I/F 111, for example, is an interface card which is capable of performing communication in a field bus standard. Specifically, the information processing device 3 performs the data communication with respect to the external device 10 through the external device I/F 111.

The CPU 101, the ROM 102, the RAM 103, the external storing device 104, the display 105, the network I/F 106, the keyboard 107, the mouse 108, the DVD drive 109, and the external device I/F 111 described above are connected to each other to communicate with each other through a bus 112 such as an address bus and a data bus. Furthermore, in the case of being connected through an Ethernet cable, the display 105 is connected to the network I/F 106, and in this case, the data communication is performed by the protocol such as TCP/IP.

(Block Configuration of Information Processing Device)

Figure 3:
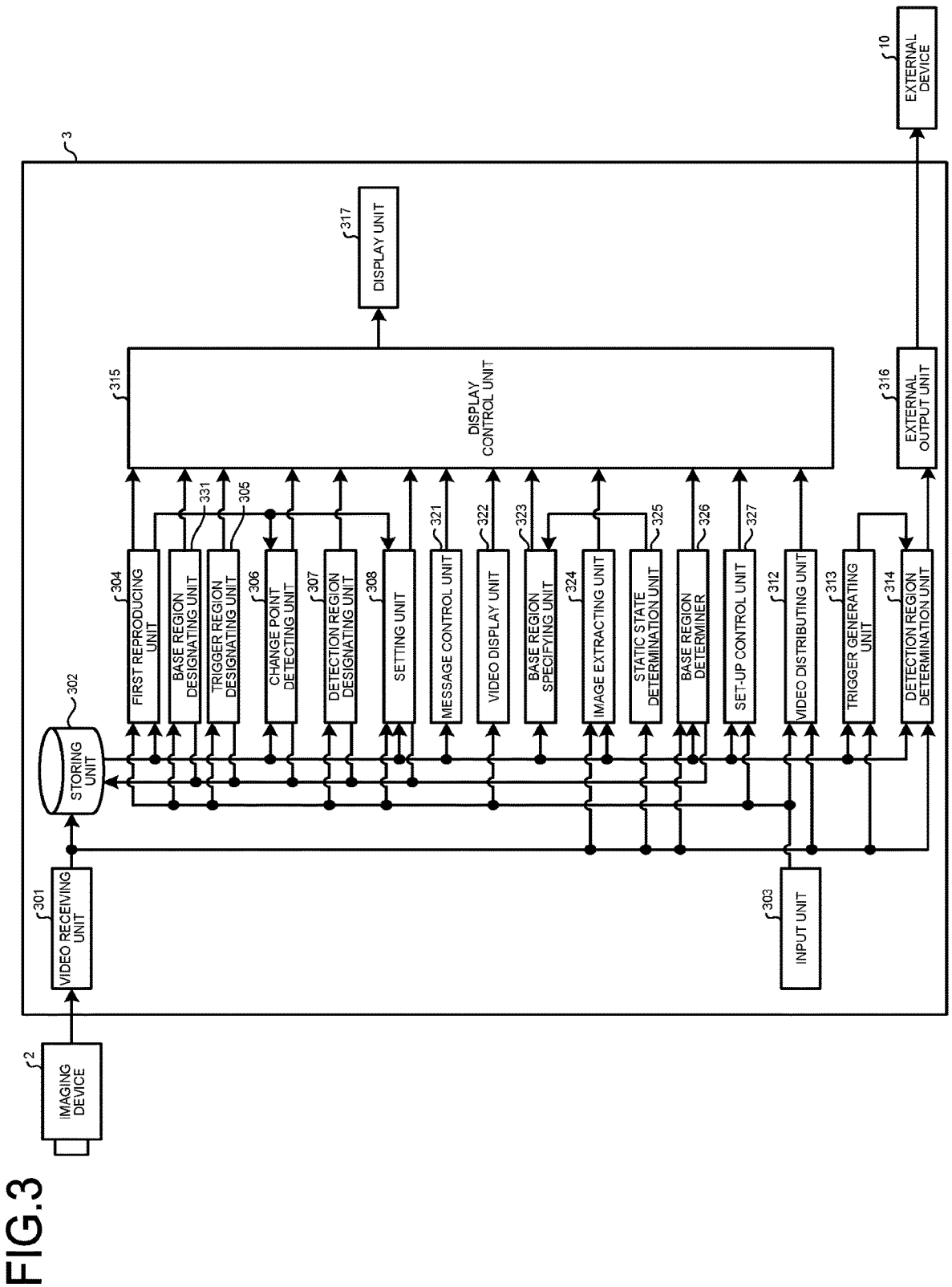
FIG. 3 is a diagram illustrating an example of a configuration of a functional block of the information processing device according to the embodiment.

FIG. 3 is a diagram illustrating an example of the configuration of a functional block of the information processing device according to the embodiment. A block configuration of the information processing device 3 will be described with reference to FIG. 3.

As illustrated in FIG. 3, the information processing device 3 includes a video receiving unit 301, a storing unit 302 (storing means), an input unit 303 (input means), a first reproducing unit 304, a trigger region designating unit 305, a change point detecting unit 306, a detection region designating unit 307, a setting unit 308, a video distributing unit 312, a trigger generating unit 313, a detection region determination unit 314, a display control unit 315, an external output unit 316, a display unit 317 (display means), a message control unit 321, a video display unit 322, a base region specifying unit 323 (specifying means), an image extracting unit 324, a static state determination unit 325 (determination means), a base region determiner 326 (determining means and correcting means), a set-up control unit 327 (control means), and a base region designating unit 331.

The video receiving unit 301 is a function unit which performs the data communication with respect to the imaging device 2 through the network 4, and receives the video data from the imaging device 2. The video receiving unit 301 stores the received video data in the storing unit 302. The video receiving unit 301 is realized by the network I/F 106 illustrated in FIG. 2. Furthermore, in FIG. 3, in order to simplify the description, the network 4 is not illustrated.

The storing unit 302 is a storing device which stores the video data received from the video receiving unit 301, various setting information items, and the like. The storing unit 302 stores the video data received from the video receiving unit 301 by identifying that the video data is generated by which imaging device 2. The storing unit 302, for example, is realized by the RAM 103 or the external storing device 104 illustrated in FIG. 2.

The input unit 303 is a device which performs manipulation input for the image determination processing and the set-up change operation which are executed by the information processing device 3. The input unit 303 is realized by the keyboard 107 and the mouse 108 illustrated in FIG. 2.

The first reproducing unit 304 is a function unit which transmits the video data acquired from the storing unit 302 to the display control unit 315 according to a manipulation signal from the input unit 303, which is manipulated by a user, and reproduces and displays the video data on the display unit 317 with respect to the display control unit 315. Specifically, the first reproducing unit 304 reproduces and displays the video data on a setting video display unit 502 of a setting screen 500 which is displayed on the display unit 317 described below in FIG. 6 or the like. The first reproducing unit 304 is realized by a program which is executed by the CPU 101 illustrated in FIG. 2.

The trigger region designating unit 305 is a function unit which designates a trigger region determining a trigger timing in a display region of the video data of the display unit 317 (the setting video display unit 502 described below in FIG. 6 or the like) according to the manipulation signal from the input unit 303, which is manipulated by the user. The trigger region designating unit 305 stores the information of the designated trigger region in the storing unit 302 in association with the set-up number, as described below. In addition, the information of the trigger region, for example, is information such as coordinates representing the position of the trigger region in the display region of the video data and the shape of the trigger region. The trigger region designating unit 305 is realized by a program which is executed by the CPU 101 illustrated in FIG. 2.

In a case where the trigger region is designated by the trigger region designating unit 305, the change point detecting unit 306 is a function unit which acquires a frame for a predetermined time before and after the time of a frame of the video data reproduced and displayed by the first reproducing unit 304 at a designated time point, and in the acquired frame, calculates a difference in pixel values of the frame and the immediately previous frame for each frame, and detects a change point with respect to an image within the trigger region on the basis of the calculated difference. The change point will be described below. In a calculating method of the difference, for example, the pixel values in the trigger regions of two frames are compared with each other, and the total number of pixels having pixel values different from each other by greater than or equal to predetermined sensitivity is calculated as the difference. Furthermore, in a case where the frame is an image in a gray scale, the pixel value is coincident with a brightness value, and thus, brightness values in the trigger regions of two frames may be compared with each other, and the total number of pixels having brightness values different from each other by greater than or equal to the predetermined sensitivity may be calculated as the difference. In addition, in a case where the frame is an image configured of pixel values of RGB, the pixel values of any one of red (R), green (G), and blue (B) may be compared with each other, and as described above, the total number of pixels having pixel values different from each other by greater than or equal to the predetermined sensitivity may be calculated as the difference. In addition, edge detection processing may be performed in the image of the frame, and the total number of edge portions may be calculated as the difference. The change point detecting unit 306 is realized by the program which is executed by the CPU 101 illustrated in FIG. 2.

The detection region designating unit 307 is a function unit which designates a detection region, which is an image determination processing target, detecting an abnormality in the display region of the video data of the display unit 317 (the setting video display unit 502) according to the manipulation signal from the input unit 303, which is manipulated by the user. As described below, the detection region designating unit 307 stores the information of the designated detection region in the storing unit 302 in association with the set-up number. In addition, the information of the detection region, for example, is information such as coordinates representing the position of the detection region in the display region of the video data and the shape of the detection region. In addition, as described below, the detection region designating unit 307 is capable of designating a plurality of detection regions in the display region of the video data. The detection region designating unit 307 is realized by a program which is executed by the CPU 101 illustrated in FIG. 2.

The setting unit 308 is a function unit which sets the setting information and stores the setting information in the storing unit 302 according to the manipulation signal from the input unit 303, which is manipulated by the user. In addition, the setting unit 308 transmits information required to be displayed in the setting information which is set to the display control unit 315 from the storing unit 302, and displays the setting information on the display unit 317 with respect to the display control unit 315. The setting unit 308 is realized by a program which is executed by the CPU 101 illustrated in FIG. 2.

The video distributing unit 312 is a function unit which transmits real-time video data acquired from the video receiving unit 301 to the display control unit 315 according to the manipulation signal from the input unit 303, which is manipulated by the user, and displays the video data on the display unit 317 with respect to the display control unit 315. Specifically, the video distributing unit 312 sorts and displays the corresponding video data on video display units 401a to 401f of a main screen 400 to be displayed on the display unit 317 described below in FIG. 4 or the like. The video distributing unit 312 is realized by a program which is executed by the CPU 101 illustrated in FIG. 2.

The trigger generating unit 313 is a function unit which compares a difference image with the image of the trigger region in the frame of the video data in trigger regions of the video display units 401a to 401f of the main screen 400 in FIG. 27 described below, and generates a trigger signal at the trigger timing. The trigger generating unit 313 is realized by a program which is executed by the CPU 101 illustrated in FIG. 2.

The detection region determination unit 314 is a function unit which compares a detection reference image with the image of the detection region in the frame of the video data in the detection regions of the video display units 401a to 401f described above, before the setting time or after the setting time at the time of receiving the trigger signal generated by the trigger generating unit 313, and determines whether or not there is an abnormality. The detection region determination unit 314 is realized by a program which is executed by the CPU 101 illustrated in FIG. 2.

The display control unit 315 is a function unit which controls a display operation of the display unit 317. Specifically, the display control unit 315 displays the video data acquired by the first reproducing unit 304, the setting information set by the setting unit 308, the trigger region designated by the trigger region designating unit 305, the detection region designated by the detection region designating unit 307, and the like on the display unit 317. The display control unit 315 is realized by a program (a driver) which is executed by the CPU 101 illustrated in FIG. 2.

In a case where the detection region determination unit 314 determines that there is an abnormality, the external output unit 316 is a function unit which outputs an abnormality signal to the external device 10. The external output unit 316 is realized by the external device I/F 111 illustrated in FIG. 2. Furthermore, the external output unit 316 outputs the abnormality signal, but is not limited thereto, and may perform a procedure such as the transmission of a batch file for notifying an abnormality through an e-mail to the external device 10 or the notification of an abnormality onto the main screen 400 (for example, flash display by a lamp icon).

The display unit 317 is a device which displays various data items according to the control of the display control unit 315. In this embodiment, the display unit 317, in particular, displays the main screen 400, the setting screen 500, a set-up change screen 700, and the like, described below, by a program (an application) which is executed by the CPU 101 illustrated in FIG. 2. The display unit 317 is realized by the display 105 illustrated in FIG. 2.

In the set-up change operation, the message control unit 321 is a function unit which displays message information according to the stage of the set-up change on the display unit 317. Specifically, the message control unit 321 displays a message of an operation procedure or the like on an operation instruction display unit 704 of the set-up change screen 700 to be displayed on the display unit 317 described below in FIG. 17 or the like. Furthermore, the message information to be displayed by the message control unit 321, for example, may be stored by the storing unit 302. The message control unit 321 is realized by a program which is executed by the CPU 101 illustrated in FIG. 2.

The video display unit 322 is a function unit which transmits the real-time video data acquired from the imaging device 2 to be specified according to the manipulation signal from the input unit 303, which is manipulated by the user, through the video receiving unit 301, to the display control unit 315, and displays the video data on the display unit 317 with respect to the display control unit 315. Specifically, the video display unit 322 displays the real-time video data on a real-time video display unit 703b of the set-up change screen 700 to be displayed on the display unit 317 described below in FIG. 17 or the like. The video display unit 322 is realized by a program which is executed by the CPU 101 illustrated in FIG. 2.

In a case where the imaging device 2 is static by being moved at the time of performing the set-up change operation, the base region specifying unit 323 is a function unit which searches for a portion matched to an image of a base region (a base reference image), which is a reference at the time of performing the set-up change operation in the real-time video display unit 703b of the set-up change screen 700 illustrated in FIG. 17 or the like described below. The base region specifying unit 323 is realized by a program which is executed by the CPU 101 illustrated in FIG. 2.

The image extracting unit 324 is a function unit which extracts an image of a provisional base region 802 (an extracted image) in the real-time video display unit 703b of the set-up change screen 700 described below at the time of performing the set-up change operation. The image extracting unit 324 is realized by a program which is executed by the CPU 101 illustrated in FIG. 2.

In a case where the imaging device 2 is static by being moved at the time of performing the set-up change operation, the static state determination unit 325 is a function unit which determines whether or not the imaging device 2 is static on the basis of the video data to be displayed on the real-time video display unit 703b of set-up change screen 700 described below. The static state determination unit 325 is realized by a program which is executed by the CPU 101 illustrated in FIG. 2.

In a case where the imaging device 2 is fixed by a jig or the like at the time of performing the set-up change operation, the base region determiner 326 is a function unit which searches for the portion matched to the image of the base region (the base reference image), which is the reference at the time of performing the set-up change operation, in the real-time video display unit 703b of the set-up change screen 700 described below, and finally determines the base region in the real-time video display unit 703b. The base region determiner 326 is realized by a program which is executed by the CPU 101 illustrated in FIG. 2.

The set-up control unit 327 is a function unit which totally controls the set-up change operation. The set-up control unit 327 is realized by a program which is executed by the CPU 101 illustrated in FIG. 2.

The base region designating unit 331 is a function unit which designates the base region, which is the reference at the time of performing the set-up change operation, in the display region of the video data (the setting video display unit 502) of the display unit 317 according to the manipulation signal from the input unit 303, which is manipulated by the user. The base region designating unit 331 stores the information of the designated base region in the storing unit 302. In addition, the information of base region, for example, is information such as coordinates representing the position of the base region in the display region of the video data and the shape of the base region.

Furthermore, a part or all of the first reproducing unit 304, the trigger region designating unit 305, the change point detecting unit 306, the detection region designating unit 307, the setting unit 308, the video distributing unit 312, the trigger generating unit 313, the detection region determination unit 314, the message control unit 321, the video display unit 322, the base region specifying unit 323, the image extracting unit 324, the static state determination unit 325, the base region determiner 326, the set-up control unit 327, and the base region designating unit 331, illustrated in FIG. 3, may be realized by a hardware circuit such as an application specific integrated circuit (ASIC) or a field-programmable gate array (FPGA) but not by a program, which is software.

In addition, the function of each function unit illustrated in FIG. 3 is conceptually described, but is not limited thereto. For example, a plurality of function units illustrated in FIG. 3 as an independent function unit may be configured of one function unit. On the other hands, the function of one function unit in FIG. 3 may be divided into a plurality of functions, and thus, the function unit may be configured as a plurality of function units.

In addition, in order to simplify the following description, expression that the display control unit 315 displays the received data on the display unit 317 will be simplified to expression that a function unit transmitting the data to the display control unit 315 displays the data on the display unit 317 (or on the screen displayed on the display unit 317). For example, in a case where the first reproducing unit 304 transmits the video data to the display control unit 315, and reproduces and displays the video data on the display unit 317 with respect to the display control unit 315, it is simply expressed that the first reproducing unit 304 reproduces and displays the video data on the display unit 317.

(Configuration of Main Screen)

Figure 4:
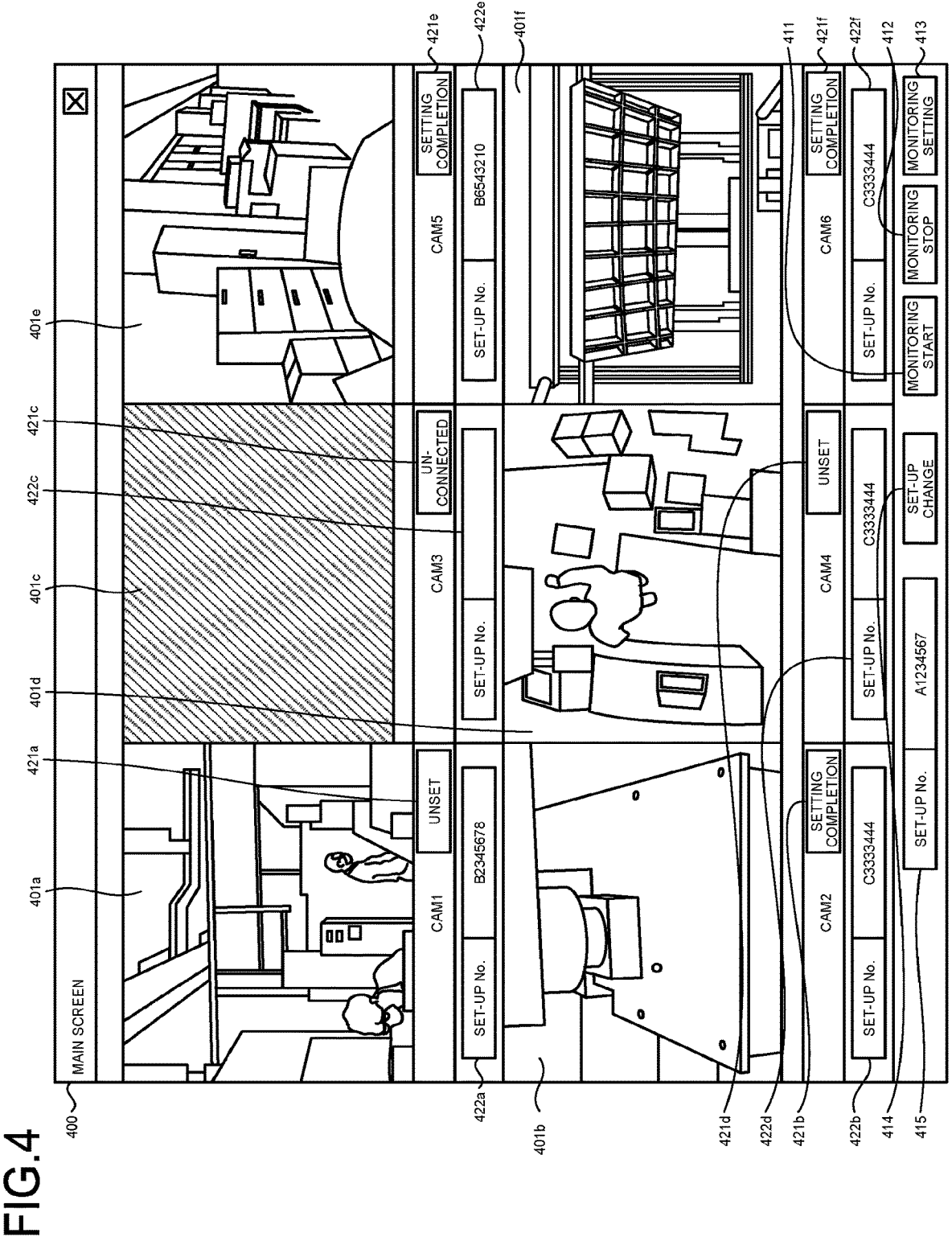
FIG. 4 is a diagram illustrating an example in which a plurality of real-time videos are displayed on a main screen which is displayed on a display device of the information processing device according to the embodiment.

FIG. 4 is a diagram illustrating an example in which a plurality of real-time videos are displayed on the main screen to be displayed on the display device of the information processing device according to the embodiment. The configuration of the main screen 400 and an operation of displaying a plurality of real-time videos will be described with reference to FIG. 4.

The main screen 400 illustrated in FIG. 4 is displayed on the display unit 317 by a program (an application) which is executed by the CPU 101. In a case where an image determination operation (a monitoring operation) is executed, the main screen 400 is a screen in which the video data received from the plurality of imaging devices 2 is displayed in real time, and the trigger signal is generated by the trigger generating unit 313 at the trigger timing in the trigger region designated by the trigger region designating unit 305. In addition, the main screen 400 is a screen in which the presence or absence of an abnormality is determined in the detection region designated by the detection region designating unit 307 before the setting time or after the setting time at the time of receiving the trigger signal by the detection region determination unit 314. As illustrated in FIG. 4, the main screen 400 includes the video display units 401a to 401f, a monitoring start button 411, a monitoring stop button 412, a monitoring setting button 413, a set-up change button 414, a set-up number input unit 415, state display units 421a to 421f, and set-up number display units 422a to 422f.

The video display units 401a to 401f are display units in which each of the real-time video data items acquired from the imaging devices 2a to 2f through the video receiving unit 301 is displayed by the video distributing unit 312, according to the manipulation signal from the input unit 303, which is manipulated by the user. In addition, the video display units 401a to 401f is capable of being in a selective state in the case of being pressed according to the manipulation of the input unit 303 by the user (for example, a click manipulation or the like of the mouse 108, the same applies hereinafter). Furthermore, in a case where the video display units 401a to 401f are referred without being distinguished or collectively referred, the video display units 401a to 401f will be simply referred to as a "video display unit 401".

When the monitoring start button 411 is pressed according to the manipulation of the input unit 303 by the user, the trigger signal is generated by the trigger generating unit 313 at the trigger timing in the trigger region designated by the trigger region designating unit 305 on the video display unit 401 in the selective state where the real-time video data is displayed, and the determination of the presence or absence of an abnormality is started in the detection region before the setting time or after the setting time at the time of receiving the trigger signal by the detection region determination unit 314.

When the monitoring stop button 412 is pressed by the manipulation of the input unit 303 by the user, a generating operation of the trigger signal by the trigger generating unit 313 at the trigger timing and a determination operation of the presence or absence of an abnormality in the detection region by the detection region determination unit 314 are stopped on the video display unit 401 in the selective state.

When the monitoring setting button 413 is pressed according to the manipulation of the input unit 303 by the user, the setting screen 500 illustrated in FIG. 6 or the like described below is displayed on the display unit 317 by the setting unit 308, in order to set the setting information with respect to the set-up number which is manipulated and input into the set-up number input unit 415.

When the set-up change button 414 is pressed according to the manipulation of the input unit 303 by the user, the set-up change screen 700 illustrated in FIG. 17 or the like described below is displayed on the display unit 317 by the set-up control unit 327, in order to execute the set-up change operation with respect to the set-up number which is manipulated and input into the set-up number input unit 415. The set-up number input unit 415 is a portion in which the set-up number for executing the set-up change operation is input by the input unit 303.

The state display units 421a to 421f are display units displaying the state of the imaging device 2 corresponding to the video display unit 401. For example, in the state display units 421a to 421f, the contents representing the state of the imaging device 2, such as "Unconnected", "Unset", "Setting Completion", and "during Monitoring", are displayed. "Unconnected" represents a state where the imaging device 2 corresponding to the video display unit 401 is not connected to the image processing system 1, and a state where the video data is not displayed on the video display unit 401. "Unset" represents a state where the setting of the base region, the trigger region, the detection region, and the like is not performed with respect to the video data to be displayed on the video display unit 401, that is, a state where the set-up change operation according to a specific set-up number is not completed. "Setting Completion" represents a state where the setting of the base region, the trigger region, the detection region, and the like with respect to the video data to be displayed on the video display unit 401 is completed, that is, a state where the set-up change operation according to the specific set-up number is completed. "during Monitoring" represents a state where the image determination operation (the monitoring operation) is executed on the basis of the setting information which is subjected to the set-up change according to the specific set-up number.

Furthermore, in a case where the state display units 421a to 421f are referred without being distinguished or collectively referred, the state display units 421a to 421f will be simply referred to as a "state display unit 421".

The set-up number display units 422a to 422f are display units which display the set-up number in a case where the set-up change is completed with respect to the imaging device 2 corresponding to the video display unit 401. Furthermore, in a case where the set-up number display units 422a to 422f are referred without being distinguished or collectively referred, the set-up number display units 422a to 422f will be simply referred to as a "set-up number display unit 422".

(Directory Structure of Setting Information)

Figure 5:
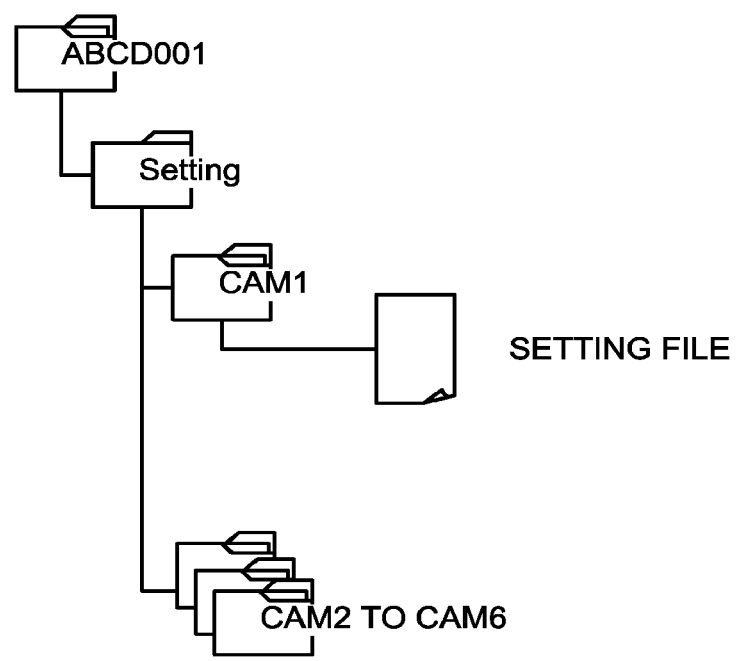
FIG. 5 is a diagram illustrating an example of a directory structure of a storing device which represents that setting information is managed for each set-up number in the information processing device according to the embodiment.

FIG. 5 is a diagram illustrating an example of a directory structure of the storing device in which represents that the setting information is managed for each set-up number in the information processing device according to the embodiment. The directory structure for managing the setting information for each of the set-up numbers in the storing unit 302 will be described with reference to FIG. 5.

First, as illustrated in FIG. 5, in the storing unit 302, a root folder for storing the setting information for each of the set-up numbers is formed, and the name of the root folder, for example, is set to the set-up number. In the example illustrated in FIG. 5, a root folder having a folder name (the set-up number) of "ABCD001" is formed.

In the root folder of "ABCD001", a setting folder for storing the setting information with respect to each of the imaging devices 2 is formed, and as illustrated in FIG. 5, the name of the setting folder, for example, is set to "Setting". In the setting folder of "Setting", a camera folder for storing the setting information for each of the imaging devices 2 is formed, and as illustrated in FIG. 5, the name of the camera folder, for example, the name of the camera folder for storing the setting information of the imaging device 2a is set to "CAM1". Specifically, the setting information with respect to the imaging device 2 is written in a setting file in the camera folder. Furthermore, the setting information for each of the set-up numbers is not limited to the setting information with respect to all of the imaging devices 2, and may be only setting information with respect to a part of the imaging devices 2. For example, the setting information of the set-up number of "A1234567" includes only setting information with respect to the imaging devices 2b, 2d, and 2f (the setting information with respect to "CAM2", "CAM4", and "CAM6").

Furthermore, the directory structure for managing the setting information for each of the set-up numbers illustrated in FIG. 5 is an example, but is not limited thereto, and another data structure may be used in which the setting information is managed.

(Configuration of Setting Screen)

Figure 6:
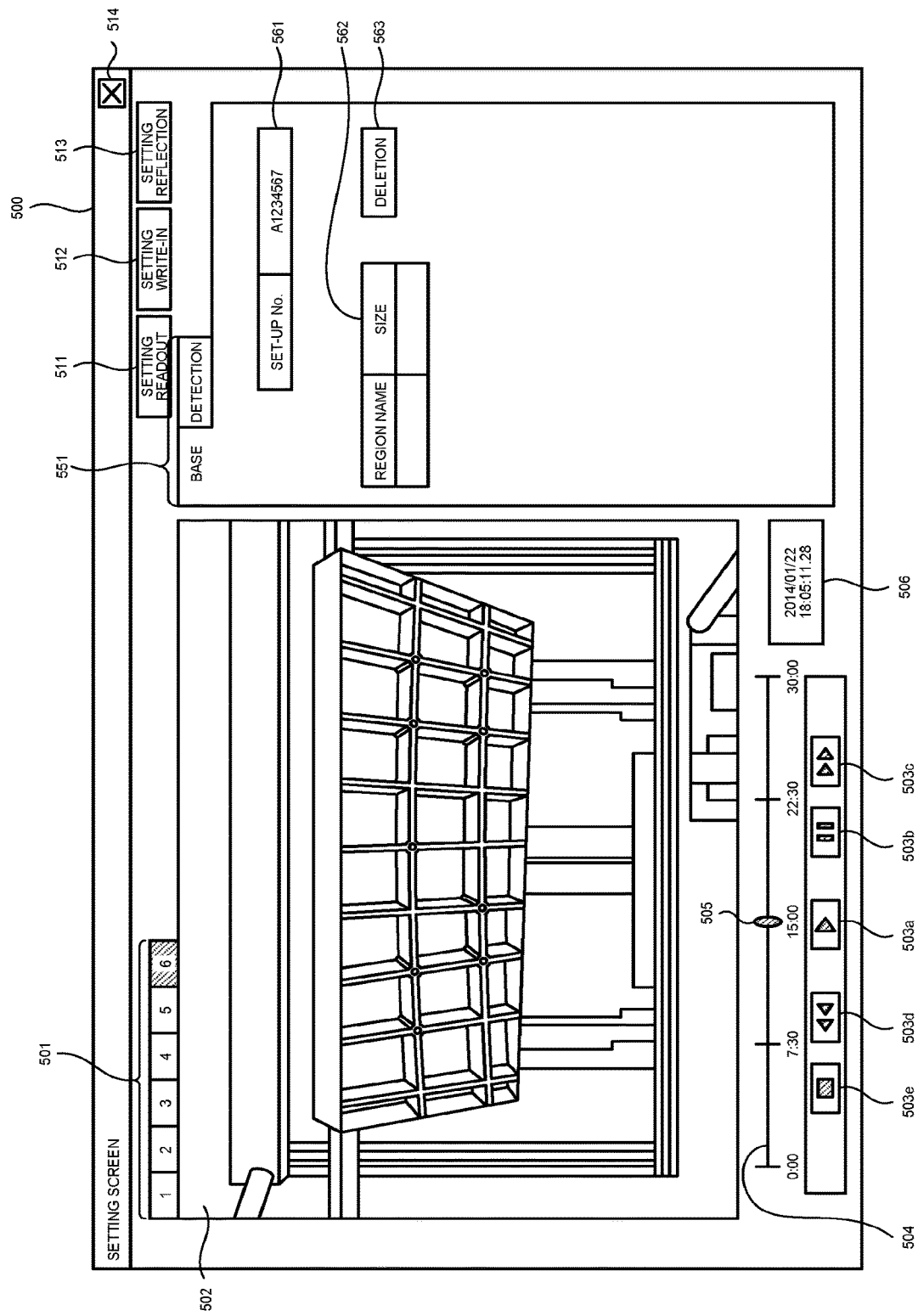
FIG. 6 is a diagram illustrating an example of a state in which video data is displayed on a setting screen to be displayed on the display device of the information processing device according to the embodiment.

FIG. 6 is a diagram illustrating an example of a state where the video data is displayed on the setting screen to be displayed on the display device of the information processing device according to the embodiment. The configuration of the setting screen 500 will be described FIG. 6 and FIG. 8 described below.

The setting screen 500 is a screen on which the base region, the trigger region, and the detection region are designated, and the sensitivity, the threshold value, and the timing of the image determination in the detection region are set. As illustrated in FIG. 6, the setting screen 500 includes a camera selection tab 501, a setting video display unit 502, a reproducing button 503a, a temporary stop button 503b, a fast-forward button 503c, a fast-backward button 503d, a stop button 503e, a seek bar 504, a slider 505, a time display unit 506, a region selection tab 551, a set-up number display unit 561, a base region information portion 562, a deletion button 563, a setting readout button 511, a setting write-in button 512, a setting reflection button 513, and a close button 514.

The camera selection tab 501 is a manipulating unit which selects which video data item in the video data items of the imaging devices 2a to 2f, of which the base region, the trigger region, and the detection region are desired to be designated by the user, to be displayed on the setting video display unit 502. For example, the video data items imaged by the imaging devices 2a to 2f are respectively associated to "1" to "6", and in the example of FIG. 6, an example is illustrated in which "6", that is, the video data of the imaging device 2f is selected.

The setting video display unit 502 is a display unit in which the video data acquired from the storing unit 302 is reproduced and displayed by the first reproducing unit 304, according to the manipulation signal from the input unit 303, which is manipulated by the user. In the example of FIG. 6, in a case where the camera selection tab 501 of "6" is selected and manipulated according to the manipulation of the input unit 303 by the user, the first reproducing unit 304 displays the video data imaged by the imaging device 2f on the display unit 317.

When the reproducing button 503a is pressed according to the manipulation of the input unit 303 by the user, the video data displayed on the setting video display unit 502 is reproduced and started by the first reproducing unit 304. When the temporary stop button 503b is pressed according to the manipulation of the input unit 303 by the user, the video data which is reproduced and displayed on the setting video display unit 502 by the first reproducing unit 304 is temporarily stopped. When the fast-forward button 503c is pressed according to the manipulation of the input unit 303 by the user, the video data which is reproduced and displayed on the setting video display unit 502 is subjected to fast-forward display by the first reproducing unit 304. When the fast-backward button 503d is pressed according to the manipulation of the input unit 303 by the user, the video data which is reproduced and displayed on the setting video display unit 502 is subjected to fast-backward display by the first reproducing unit 304. When the stop button 503e is pressed according to the manipulation of the input unit 303 by the user, the video data the video which is reproduced and displayed on the setting video display unit 502 is stopped by the first reproducing unit 304.

The seek bar 504 is a rod-like body which represents the time of the video data reproduced and displayed on the setting video display unit 502 according to the position of the slider 505 which is disposed on the seek bar. The slider 505 is a body and a manipulating unit which slide to the position on the seek bar 504 corresponding to the imaging time of the video data (time when the displayed frame is imaged) reproduced and displayed on the setting video display unit 502. In contrast, in a case where the slider 505 slides according to the manipulation of the input unit 303 by the user, the frame of the video data at the imaging time corresponding to the position on the seek bar 504 where the slider 505 exists is displayed on the setting video display unit 502 by the first reproducing unit 304.

The time display unit 506 is a display unit which displays an imaging date and an imaging time of the video data reproduced and displayed on the setting video display unit 502 by the first reproducing unit 304.

The region selection tab 551 is configured of a tab for setting the base region and a tab for setting the trigger region and the detection region. For example, the setting screen 500 illustrated in FIG. 6 represents a state where the tab for setting the base region is selected by the manipulation of the input unit 303 by the user. On the other hands, the setting screen 500 illustrated in FIG. 8 described below represents a state where the tab for setting the trigger region and the detection region is selected according to the manipulation of the input unit 303 by the user.

The set-up number display unit 561 is a display unit which displays the set-up number manipulated and input into the set-up number input unit 415 of the main screen 400 described above. The base region information portion 562 is a display unit which displays the name of the base region designated by the base region designating unit 331 and the size of the designated base region. The function of the deletion button 563 will be described below.

When the setting readout button 511 is pressed according to the manipulation of the input unit 303 by the user, the setting information of the information or the like of the base region corresponding to the set-up number displayed on the set-up number display unit 561, and the trigger region and the detection region, which is stored in the storing unit 302, is read out by the setting unit 308, and the setting information is displayed on each of the display units of the setting screen 500. When the setting write-in button 512 is pressed according to the manipulation of the input unit 303 by the user, the setting information of the information or the like of the base region, the trigger region, and the detection region set on the setting screen 500 is stored in the storing unit 302 in association with the set-up number displayed on the set-up number display unit 561 by the setting unit 308. When the setting reflection button 513 is pressed according to the manipulation of the input unit 303 by the user, the setting information of the information or the like of the base region, the trigger region, and the detection region set on the setting screen 500 is valid by the setting unit 308 until the application of the main screen 400, the setting screen 500, or the like is closed (for example, is temporarily stored in the RAM 103).

When the close button 514 is pressed according to the manipulation of the input unit 303 by the user, the setting screen 500 is closed and the main screen 400 is displayed on the display unit 317 by the setting unit 308.

As described above, the setting screen 500 illustrated in FIG. 8 described below represents that the tab for setting the trigger region and the detection region is selected, and includes a set-up number display unit 515, a trigger region information portion 507, a reference image display unit 508a, a difference image display unit 508b, a detection region information portion 509, and a detection region button portion 510.

The set-up number display unit 515 display unit which displays the set-up number manipulated and input into the set-up number input unit 415 of the main screen 400 described above.

The trigger region information portion 507 is a display unit which displays the name of the trigger region designated by the trigger region designating unit 305 and the sensitivity and the threshold value for the change point detecting unit 306 to detect the change point described above. The reference image display unit 508a is a display unit which displays a trigger reference image extracted by the change point detecting unit 306. The difference image display unit 508b is a display unit which displays the difference image (described below) extracted by the change point detecting unit 306.

The detection region information portion 509 is a display unit and a selecting manipulating unit which display the name of the detection region designated by the detection region designating unit 307, the sensitivity, the threshold value, detection delay time (in FIG. 8, represented as "delay time"), a monitoring method (in FIG. 8, represented as "monitoring"), the presence or absence of action (in FIG. 8, represented as "action"), and an image determination method (in FIG. 8, represented as "image determination") (hereinafter, such information with respect to the detection region will be referred to as attribute information).

The detection region button portion 510 is a button group which edits the attribute information with respect to the detection region which is designated by the detection region designating unit 307 and is displayed on the detection region information portion 509. The detection region button portion 510 includes an action button 510a, an image determination selection button 510b, a deletion button 510c, a sensitivity increase button 510e, a sensitivity decrease button 510f, a threshold value increase button 510g, and a threshold value decrease button 510h. The function of each button of the detection region button portion 510 will be described below.

(Designation of Base Region)

Figure 7:
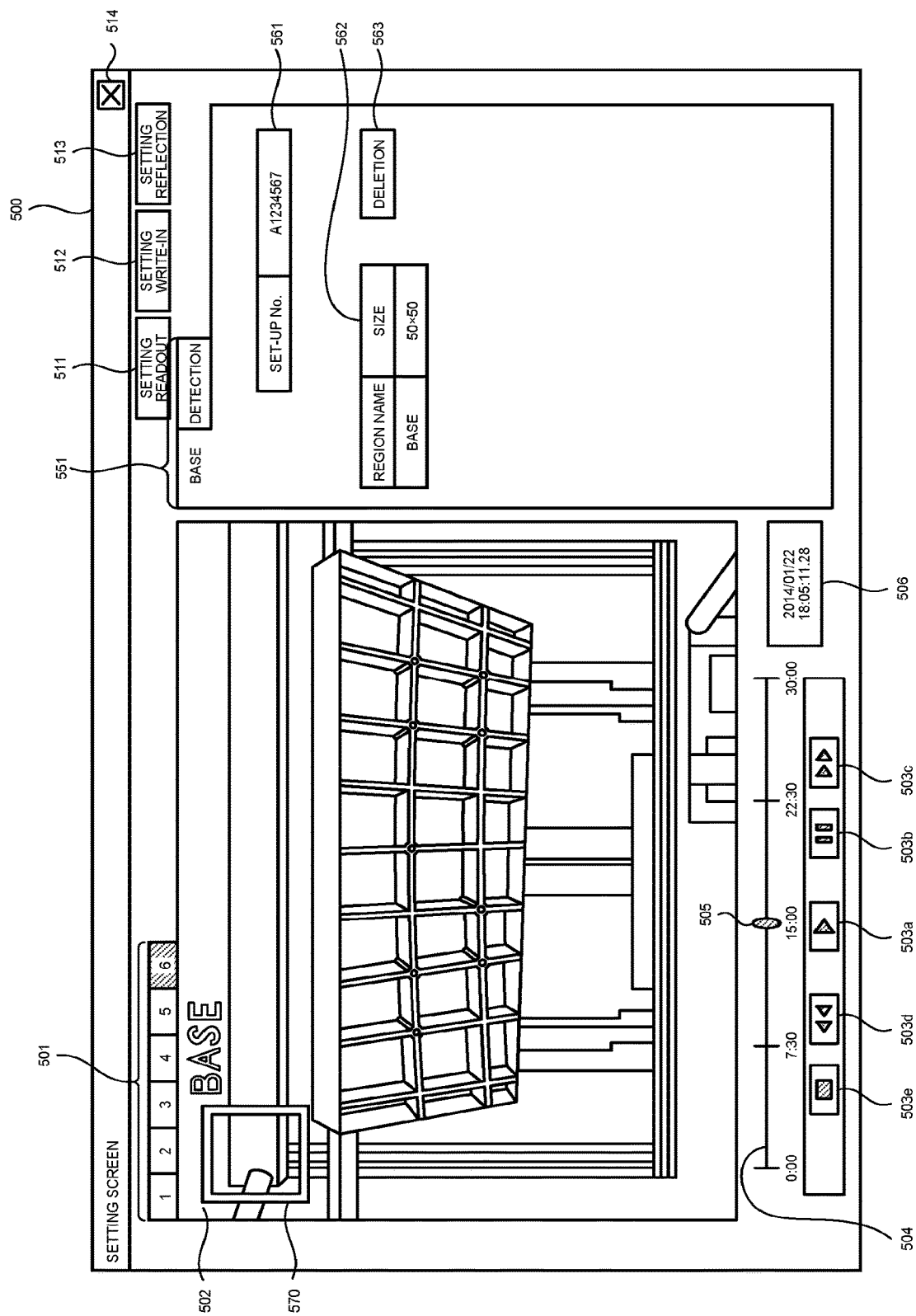
FIG. 7 is a diagram illustrating an example in which a base region is designated in a setting video display unit on the setting screen to be displayed on the display device of the information processing device according to the embodiment.

FIG. 7 is a diagram illustrating an example in which the base region is designated in the setting video display unit on the setting screen to be displayed on the display device of the information processing device according to the embodiment. The designation of the base region will be described with reference to FIG. 7.

The setting screen 500 illustrated in FIG. 7 represents a state where a base region 570 is designated in the setting video display unit 502 on which the video data is reproduced and displayed by the first reproducing unit 304. Specifically, first, in a case where the temporary stop button 503b is pressed according to the manipulation of the input unit 303 by the user, at a timing where a portion desired to function as the base reference image is displayed while the video data is reproduced and displayed on the setting video display unit 502, the first reproducing unit 304 the temporarily stops the video data which is reproduced and displayed on the setting video display unit 502, and the imaging date and the imaging time of the frame of such a time point are displayed on the time display unit 506. Next, the base region designating unit 331 designates and displays the base region 570 on the setting video display unit 502 according to the manipulation of the input unit 303 by the user (for example, a drag manipulation of the mouse 108).

In addition, the setting unit 308 displays the name named in the base region 570 which is designated by the base region designating unit 331 and the size of the base region 570 on the base region information portion 562 as the information of the base region 570. As illustrated in FIG. 7, the setting unit 308, for example, is named as "BASE" as the name of the base region 570. In addition, the base region designating unit 331 extracts the frame (the image) displayed on the setting video display unit 502 in association with the set-up number displayed on the set-up number display unit 561 at time when the base region 570 is designated as the reference static image and the image in the base region 570 of the reference static image as the base reference image, stores the extracted frame and image in the storing unit 302, and stores the information of the designated base region 570 in the storing unit 302.

(Designation of Trigger Region and Detection of Change Point)

Figure 10A:
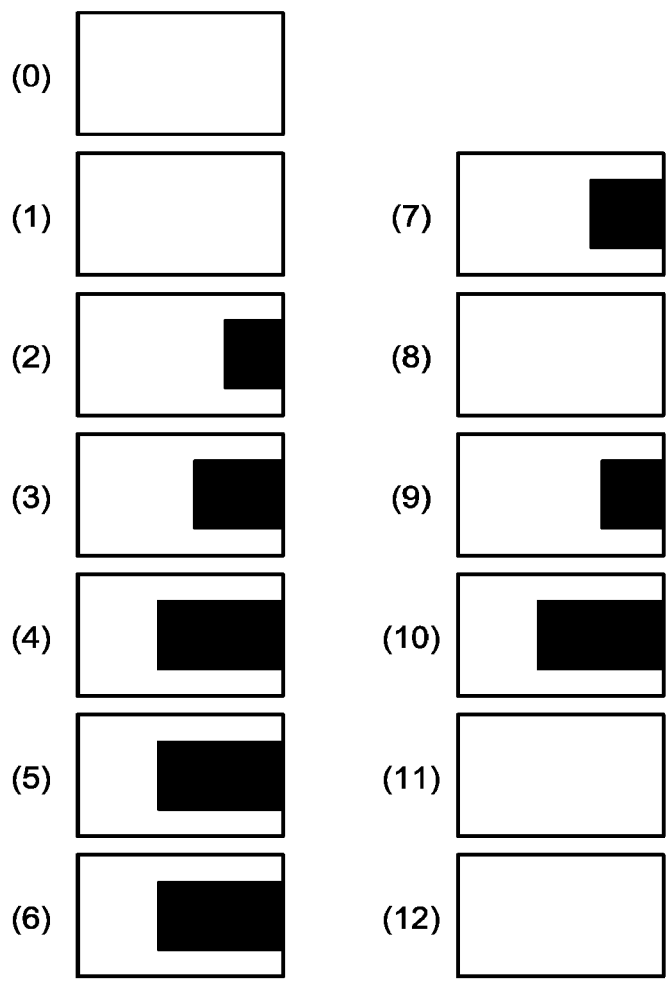
FIGS. 10A and 10B are diagrams illustrating an operation of detecting the change point in the trigger region.
Figure 10B:
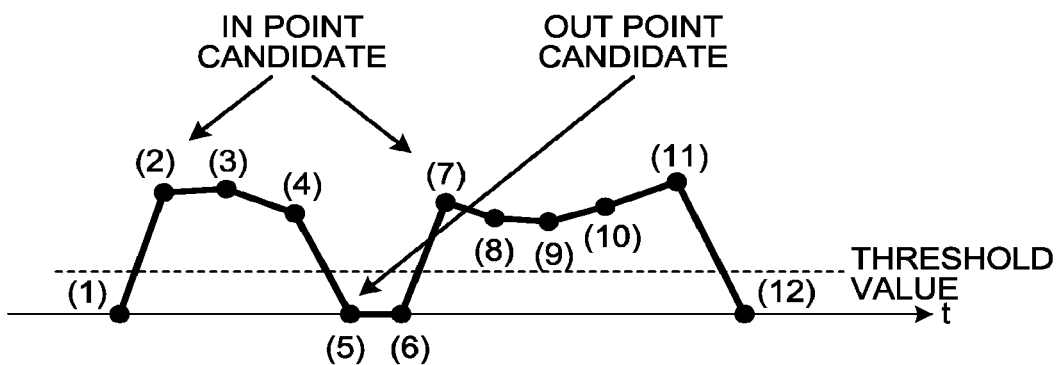
Figure 11:
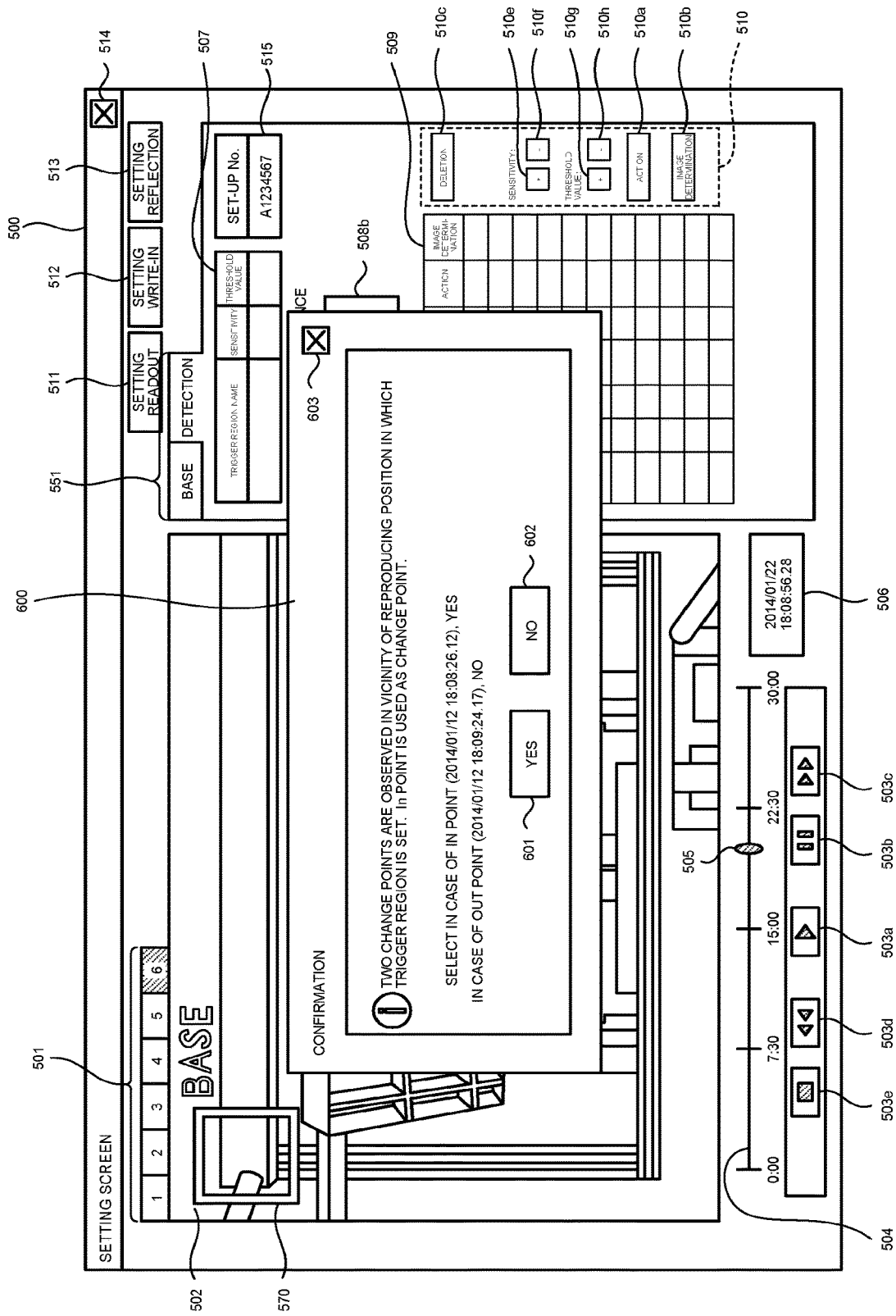
FIG. 11 is a diagram illustrating an example of a dialogue to be displayed in a case where two change points are observed in the trigger region on the setting screen to be displayed on the display device of the information processing device according to the embodiment.
Figure 12:
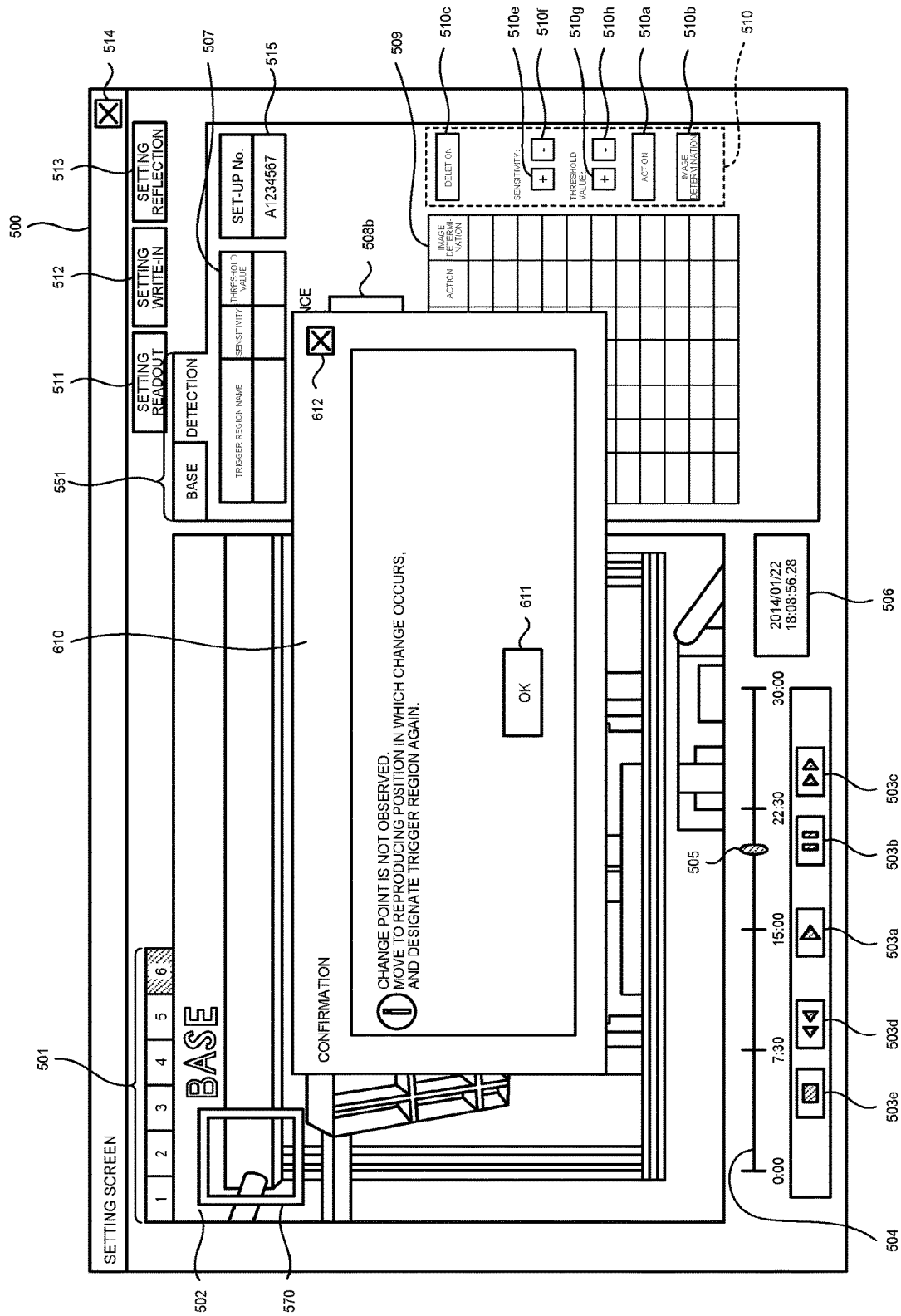
FIG. 12 is a diagram illustrating an example of a dialogue to be displayed in a case where the change point is not observed in the trigger region on the setting screen to be displayed on the display device of the information processing device according to the embodiment.

FIG. 8 is a diagram illustrating an example in which the trigger region is designated in the setting video display unit on the setting screen to be displayed on the display device of the information processing device according to the embodiment. FIG. 9 is a diagram illustrating an example of mark display in a case where the change point is observed in the trigger region on the setting screen to be displayed on the display device of the information processing device according to the embodiment. FIGS. 10A and 10B are diagrams illustrating an operation of detecting the change point in the trigger region. FIG. 11 is a diagram illustrating an example of a dialogue to be displayed in a case where two change points are observed in the trigger region on the setting screen to be displayed on the display device of the information processing device according to the embodiment. FIG. 12 is a diagram illustrating an example of a dialogue to be displayed in a case where the change point is not observed in the trigger region on the setting screen to be displayed on the display device of the information processing device according to the embodiment. The designation of the trigger region and the detection of the change point will be described with reference to FIGS. 8 to 12.

The setting screen 500 illustrated in FIG. 8 illustrates a state in which a trigger region 530 is designated in the setting video display unit 502 on which the video data is reproduced and displayed by the first reproducing unit 304. Specifically, first, in a case where the temporary stop button 503b is pressed according to the manipulation of the input unit 303 by the user at a timing where a desired portion of the image based on the occurrence of the trigger is displayed while the video data is reproduced and displayed on the setting video display unit 502, the first reproducing unit 304 temporarily stops the video data which is reproduced and displayed on the setting video display unit 502, and displays the imaging date and the imaging time of the frame at such a time point on the time display unit 506.

Next, the trigger region designating unit 305 designates the trigger region 530 (the determination region) and displays the designated trigger region on the setting video display unit 502, according to the manipulation of the input unit 303 by the user (for example, the drag manipulation of the mouse 108). Here, in order for the trigger region designating unit 305 to designate the trigger region 530, it is necessary that the base region is designated by the base region designating unit 331. This is because the position of the trigger region 530 designated by the trigger region designating unit 305 functions according to a relative position with respect to the base region designated by the base region designating unit 331. That is, the trigger region 530 designated by the trigger region designating unit 305 is associated with the base region designated by the base region designating unit 331.

The setting screen 500 illustrated in FIG. 9 illustrates a state in which the change point detecting unit 306 detects the change point in the trigger region 530 which is designated by the trigger region designating unit 305. Specifically, first, in a case where the trigger region 530 is designated by the trigger region designating unit 305, the change point detecting unit 306 acquires a frame for a predetermined time before and after the imaging time of the frame of the video data which is reproduced and displayed by the first reproducing unit 304 (for example, for 2 minutes before and after the imaging time), and extracts the image in the trigger region 530 of the time which is designated by the trigger region 530 at a designated time point as the trigger reference image. Here, the change point is a time point where a predetermined change of the image in the trigger region 530 occurs as a reference of a timing where the trigger generating unit 313 generates the trigger signal. Hereinafter, a specific detecting method of the change point of the change point detecting unit 306 will be described.

As illustrated in FIG. 10A, the change point detecting unit 306 acquires thirteen frames (a frame (0) to a frame (12)) as the frame for the predetermined time. In this case, the frame for the predetermined time before and after the frame (6) as the basis is acquired by the change point detecting unit 306. In addition, in order to simplify the description, an image of a portion corresponding to the trigger region 530 in each of the frames will also be referred to as each of a frame (0) to a frame (12). Then, the change point detecting unit 306 calculates a difference in pixel values between each of the frames and the immediately prior frame in the acquired frame. A calculating method of the difference is as described above. The change point detecting unit 306 extracts the frame exemplified in FIG. 10A, and a graph chronologically illustrating the difference calculated for each of the frames is a graph illustrated in FIG. 10B. In FIG. 10B, for example, the difference of the frame (1) represents a difference between the frame (1) and the frame (0) which is the immediately previous frame. Here, an IN point and an OUT point as the change point will be defined as described below. That is, the IN point is set to a time point at which the image in the trigger region 530 starts changing in the continuous frames. In addition, the OUT point is set to a time point at which change of the image in the trigger region 530 starts stopping in the continuous frames. Furthermore, the change point detecting unit 306 calculates the difference between each of the frames and the immediately previous frame in the acquired frame, but is not limited to the immediately previous frame, and for example, a difference between each of the frames and a frame several frames before the frame may be calculated.

The change point detecting unit 306 finds a candidate of the IN point and a candidate of the OUT point on the basis of the calculated difference between the respective frames. Specifically, in a case where the calculated difference is continuous for greater than or equal to two frames, and is greater than or equal to a predetermined threshold value, the change point detecting unit 306 sets a frame having a difference which is initially greater than or equal to the predetermined threshold value to a candidate frame of the IN point. In the example of FIG. 10B, the difference of the frame (1) is less than the threshold value, the difference of the frame (2) is greater than or equal to the threshold value, the difference of the frame (3) is greater than or equal to the threshold value, and a difference between two frames of the frames (2) and (3) is greater than or equal to the threshold value, and thus, the frame (2) having a difference which is initially greater than or equal to the threshold value is set to the candidate frame of the IN point. Similarly, the frame (7) is also set to the candidate frame of the IN point. In addition, in a case where the difference is not continuous for greater than or equal to two frames, and a difference for only one frame is greater than or equal to the threshold value, there is a possibility of noise, and thus, the frame is not set to the candidate frame of the IN point.

On the other hand, in a case where the calculated difference is continuous for greater than or equal to two frames, and is less than or equal to the predetermined threshold value, the change point detecting unit 306 sets the frame having a difference which is initially less than the predetermined threshold value to a candidate frame of the OUT point. In the example of FIG. 10B, the difference of the frame (4) is greater than or equal to the threshold value, the difference of the frame (5) is less than the threshold value, the difference of the frame (6) is also less than the threshold value, and a difference between two frames of the frames (5) and (6) is less than the threshold value, and thus, the frame (5) having a difference which is initially less than the threshold value is set to the candidate frame of the OUT point. Here, the frame (12) is a frame having a difference which is less than the predetermined threshold value, but the following frame (13) is a frame other than the frame extracted by the change point detecting unit 306, and thus, is not the candidate frame of the OUT point. In addition, in a case where the difference is not continuous for greater than or equal to two frames, and only one difference for one frame is less than the threshold value, there is a possibility of noise, and thus, the frame is not the candidate frame of the OUT point.

As described above, in the example of FIGS. 10A and 10B, the change point detecting unit 306 specifies the frames (2) and (7) as the candidate frame of the IN point, and specifies the frame (5) as the candidate frame of the OUT point. Thus, in a case where a plurality of candidate frames of the IN point are specified, the change point detecting unit 306 determines a frame closest to the frame (6) in the middle of the acquired frame, that is, the frame (7) as the frame of the IN point. Furthermore, in the example of FIGS. 10A and 10B, only one frame (the frame (5)) is specified as the candidate frame of the OUT point, and as with the candidate of the IN point, there is a case where a plurality of frames are specified as the candidate frame of the OUT point. Thus, in a case where the plurality of candidate frames of the OUT point are specified, the change point detecting unit 306 determines a frame closest to the frame (6) in the middle of the acquired frame as the frame of the OUT point, as with the candidate of the IN point. In the example of FIGS. 10A and 10B, the candidate frame of the OUT point is only the frame (5), and thus, the change point detecting unit 306 determines the frame (5) as the frame of the OUT point. As described above, the change point detecting unit 306 determines the frame of the IN point and the frame of the OUT point from the acquired frame for the predetermined time, and thus, detects the change point (the IN point and the OUT point).

Furthermore, in a case where the change point is detected, the change point detecting unit 306 may perform dynamic body detection in the trigger region 530 by using a frame before the frame of the change point, a frame after the frame of the change point, or preceding and following frames, and may store vector information representing an entrance direction of a dynamic body in the storing unit 302. In this case, the trigger generating unit 313 may confirm whether or not the dynamic body is moved from a direction which is identical to the direction represented by the vector information, by using the vector information stored in the storing unit 302, and may generate the trigger signal on the basis of the confirmation result.

In addition, the detecting method of the change point in the trigger region 530 according to the change point detecting unit 306 is not limited to the method described above, and the change point may be detected by any method insofar as the change point is a change point defining a timing at which the trigger is generated.

In addition, as described above, in a case where the difference is continuous for greater than or equal to two frames, and is greater than or equal to the predetermined threshold value, the change point detecting unit 306 sets a frame having a difference which is initially greater than or equal to the predetermined threshold value to the candidate frame of the IN point, but is not limited thereto. That is, a case may be included in which the difference is not continuous for greater than or equal to two frames, and is continuous for frames of greater or equal to the other number and is greater than or equal to the predetermined threshold value. The same applies to a case where the candidate frame of the OUT point is found.

In addition, FIGS. 10A and 10B illustrate an example in which the frames of both of the IN point and the OUT point are observed, but there is a case where only the frame of the IN point or only the frame of the OUT point is observed by the change point detecting unit 306, and in this case, the IN point or the OUT point is detected as the change point. In this case, the change point detecting unit 306 extracts an image of a frame of the detected change point in the trigger region 530 as the difference image. The change point detecting unit 306 stores the extracted trigger reference image and the difference image of the frame of the change point in the storing unit 302, displays the trigger reference image on the reference image display unit 508a, and displays the difference image on the difference image display unit 508b. Further, in the seek bar 504, the change point detecting unit 306 displays the trigger mark 540 on a portion corresponding to the time of the frame of the detected change point. In addition, in a case where the change point is detected by the change point detecting unit 306, the trigger region designating unit 305 stores the information of the trigger region 530 which is designated in association with the set-up number displayed on the set-up number display unit 515, in the storing unit 302. Furthermore, here, the information of the trigger region 530 stored by the storing unit 302, for example, is information such as information representing the relative position with respect to the base region 570 and the shape of the trigger region 530. In addition, the setting unit 308 displays the name which is named in the trigger region 530 designated by the trigger region designating unit 305, and predetermined sensitivity used for detecting the change point of the change point detecting unit 306 (for example, "50") and a predetermined threshold value (for example, "20%") (a default value) on the trigger region information portion 507. As illustrated in FIG. 8, for example, the setting unit 308 names "TR6" as the name of the trigger region 530 by assuming the trigger region as a trigger region designated with respect to video data of an imaging device of "6" (the imaging device 2f).

In a case where two change points (the IN point and the OUT point) are detected by the change point detecting unit 306 as described above, in the trigger region 530 designated by the trigger region designating unit 305, the setting screen 500 illustrated in FIG. 11 represents a state in which a change point selecting dialogue 600 is displayed. Thus, in a case where greater than or equal to two change points are detected, the change point detecting unit 306 displays the change point selecting dialogue 600 for selecting any one of two change points (the IN point and the OUT point) closest to the time point where the reference image is extracted to generate the trigger on the display unit 317. The change point selecting dialogue 600 includes a yes button 601, a no button 602, and a close button 603. The close button 603 is a button for closing the change point selecting dialogue 600.

In a case the yes button 601 is pressed according to the manipulation of the input unit 303 by the user, the change point detecting unit 306 detects the IN point as the change point, and extracts the image of the frame of the IN point in the trigger region 530 as the difference image. Then, the change point detecting unit 306 stores the extracted trigger reference image and the difference image of the frame of the IN point in the storing unit 302 in association with the set-up number displayed on the set-up number display unit 515, displays the trigger reference image on the reference image display unit 508a, and displays the difference image on the difference image display unit 508b. Further, the change point detecting unit 306 displays the trigger mark 540 on a portion corresponding to the time of the frame of the detected IN point in the seek bar 504.

On the other hands, in a case where the no button 602 is pressed according to the manipulation of the input unit 303 by the user, the change point detecting unit 306 detects the OUT point as the change point, and extracts the image of the frame of the OUT point in the trigger region 530 as the difference image. Then, the change point detecting unit 306 stores the extracted trigger reference image and the difference image of the frame of the OUT point in the storing unit 302 in association with the set-up number displayed on the set-up number display unit 515, displays the trigger reference image on the reference image display unit 508a, and displays the difference image on the difference image display unit 508b. Further, the change point detecting unit 306 displays the trigger mark 540 in a portion corresponding to the time of the frame of the detected OUT point in the seek bar 504. Other operations are identical to the operation described above in FIG. 9.

Thus, the IN point and the OUT point are detected by the change point detecting unit 306 as the change point, and any one of two change points can be selected by the user, and thus, the user is capable of selecting the change point desired to be designated.

In a case where the change point designated by the trigger region designating unit 305 is not observed by the change point detecting unit 306 in the trigger region 530, the setting screen 500 illustrated in FIG. 12 represents a state in which a no change point notification dialogue 610 is displayed. In the operation described in FIGS. 10A and 10B described above, there is a case where the change point detecting unit 306 is not capable of detecting the change point since the calculated difference is not greater than or equal to a predetermined threshold value. In this case, the change point detecting unit 306 displays the no change point notification dialogue 610 representing that the change point is not observed on the display unit 317.

The no change point notification dialogue 610 includes an OK button 611 and a close button 612. The close button 612 is a button for closing the no change point notification dialogue 610. In a case where the OK button 611 is pressed according to the manipulation of the input unit 303 by the user, the change point detecting unit 306 closes the no change point notification dialogue 610 without storing any information in the storing unit 302 or displaying the image on the reference image display unit 508a and the difference image display unit 508b.

(Designation of Detection Region and Setting of Attribute Information of Detection Region)

Figure 13:
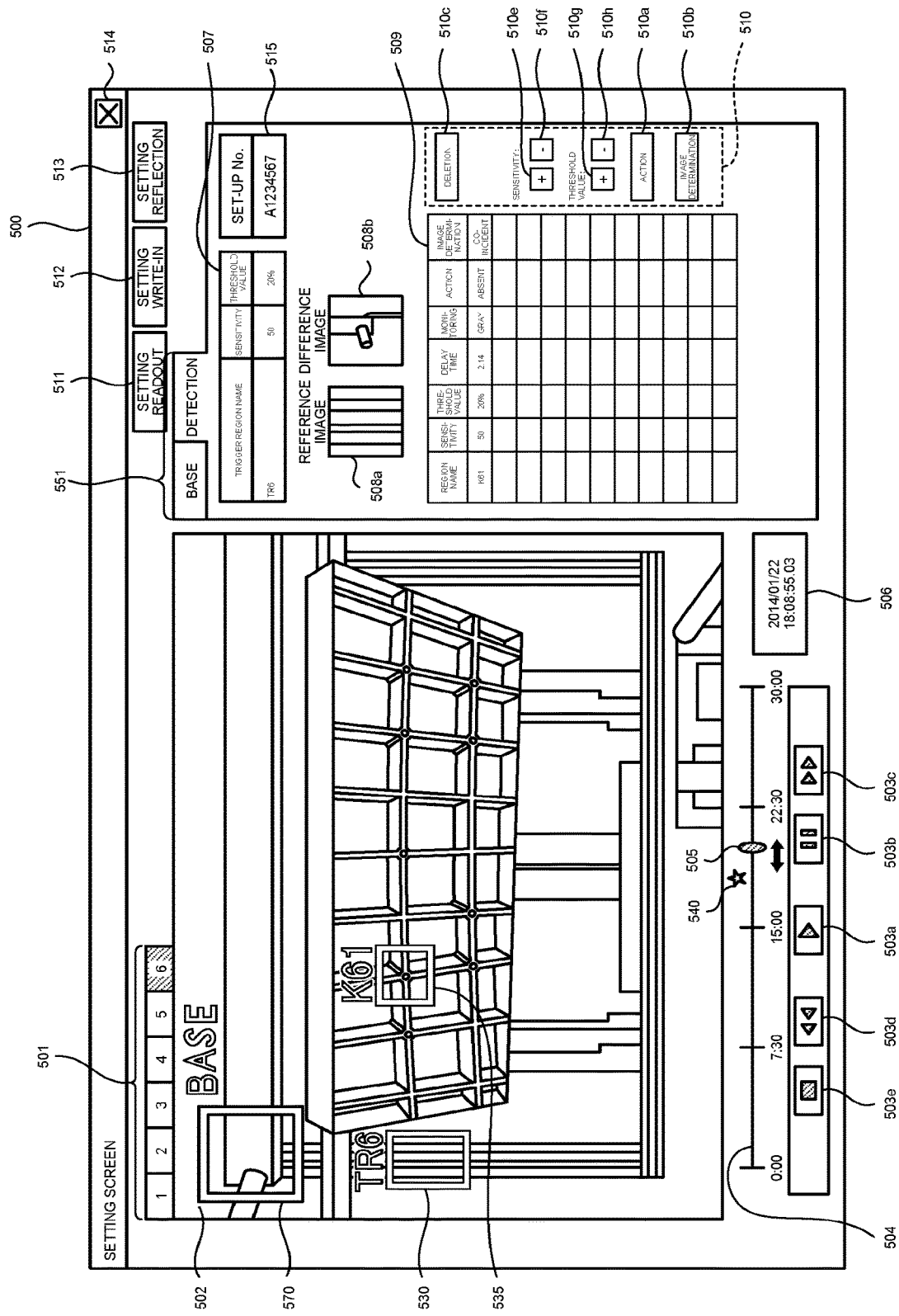
FIG. 13 is a diagram illustrating an example in which a detection region is designated in the setting video display unit on the setting screen to be displayed on the display device of the information processing device according to the embodiment.
Figure 14:
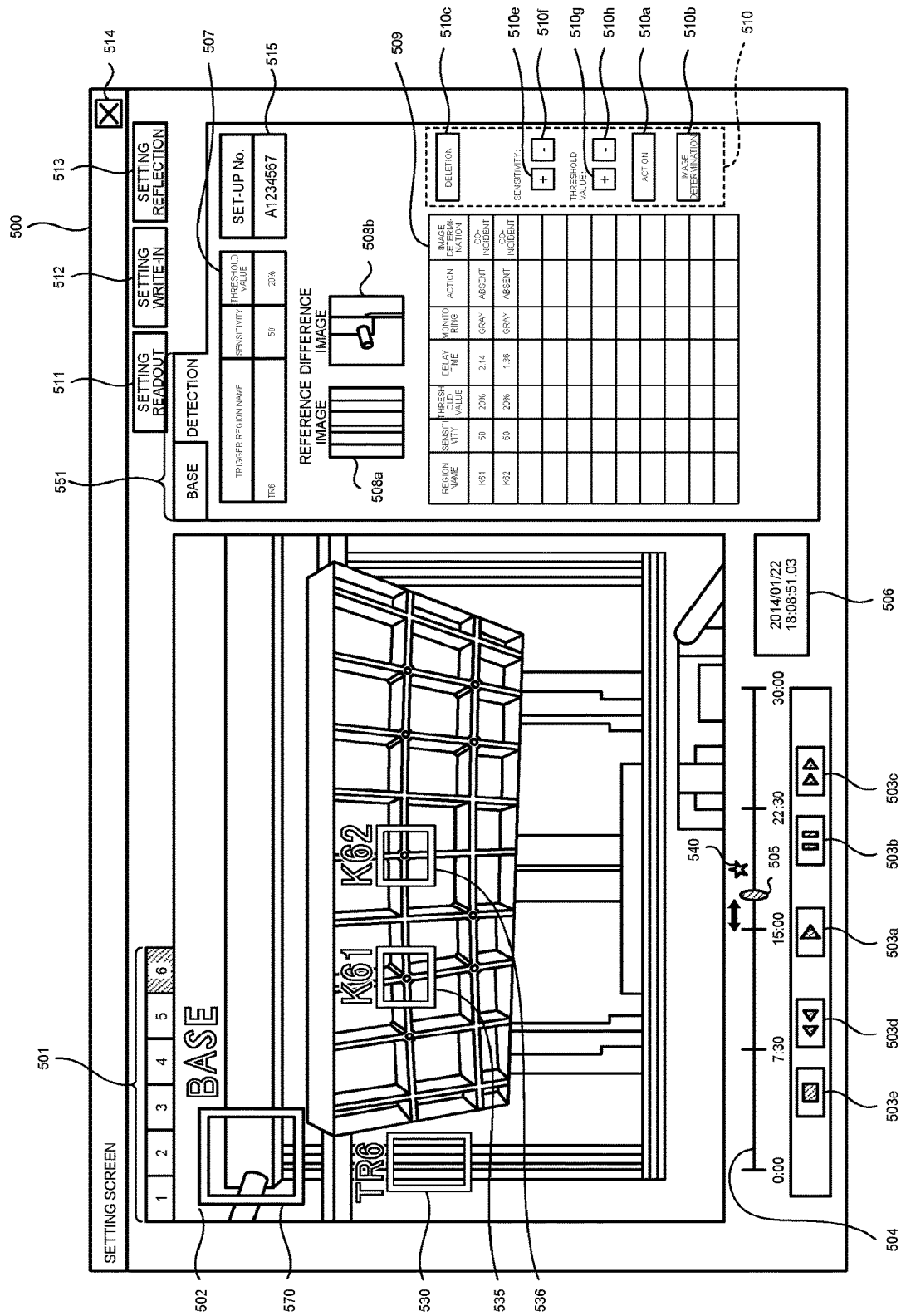
FIG. 14 is a diagram illustrating an example in which a second detection region is designated in the setting video display unit on the setting screen to be displayed on the display device of the information processing device according to the embodiment.
Figure 15:
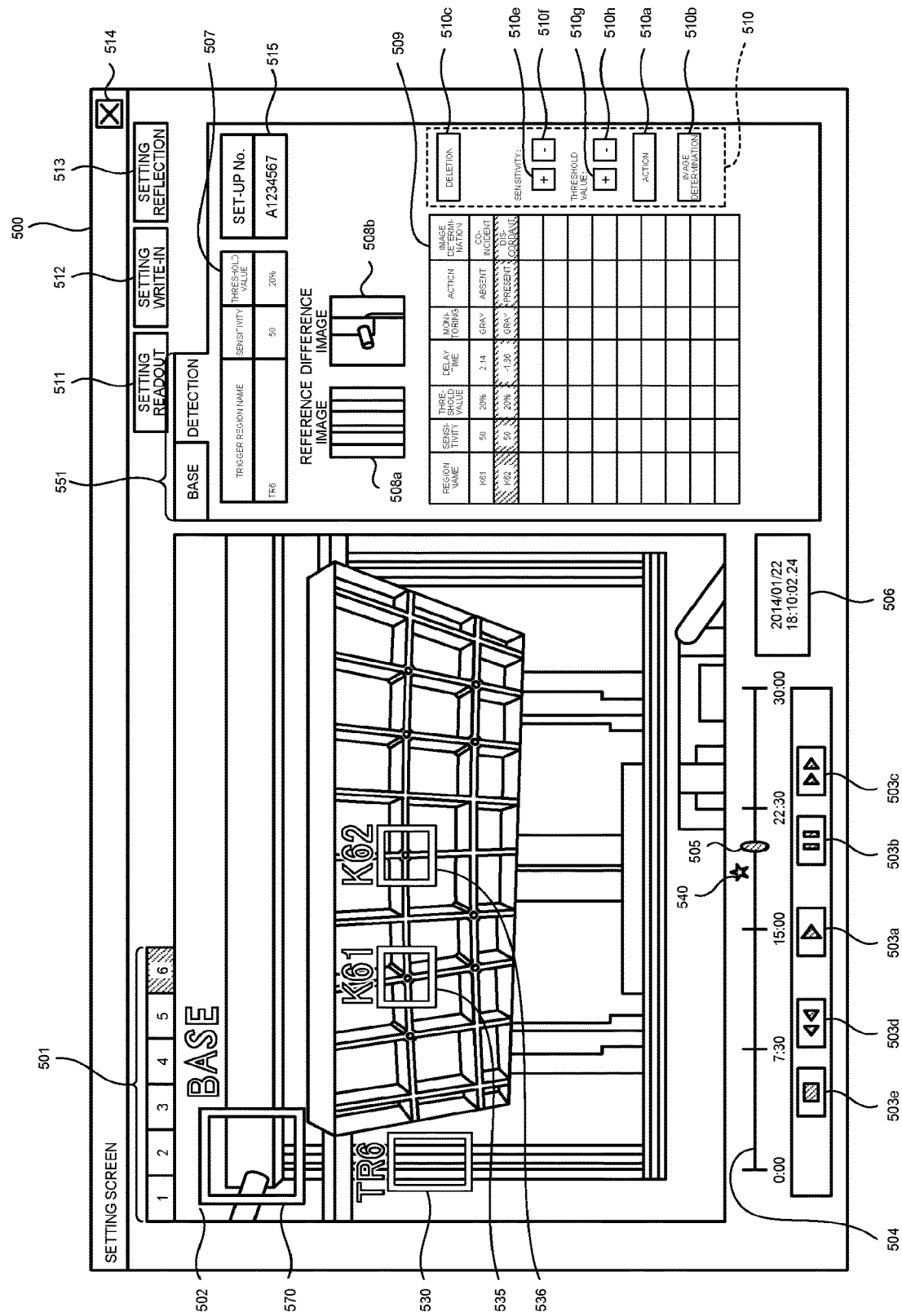
FIG. 15 is a diagram illustrating an example in which attribute information of the detection region designated in the setting video display unit is set on the setting screen to be displayed on the display device of the information processing device according to the embodiment.

FIG. 13 is a diagram illustrating an example where the detection region is designated in the setting video display unit on the setting screen displayed on the display device of the information processing device according to the embodiment. FIG. 14 is a diagram illustrating an example in which a second detection region is designated in the setting video display unit on the setting screen to be displayed on the display device of the information processing device according to the embodiment. FIG. 15 is a diagram illustrating an example in which the attribute information of the detection region designated in the setting video display unit on the setting screen to be displayed on the display device of the information processing device according to the embodiment is set. The designation of the of the detection region and the setting of the attribute information of the detection region will be described with reference to FIGS. 13 to 15.

The setting screen 500 illustrated in FIG. 13 represents a state in which a detection region 535 is designated in the setting video display unit 502 on which the video data is reproduced and displayed by the first reproducing unit 304. Specifically, first, in a case where the temporary stop button 503b is pressed according to the manipulation of the input unit 303 by the user at a timing where a portion of an image desired to be subjected to the image determination is displayed while the video data is reproduced and displayed on the setting video display unit 502, the first reproducing unit 304 temporarily stops the video data which is reproduced and displayed on the setting video display unit 502, and displays the imaging date and the imaging time of the frame at such a time point on the time display unit 506.

Next, the detection region designating unit 307 designates and displays the detection region 535 (the determination region) on the setting video display unit 502 according to the manipulation of the input unit 303 by the user (for example, the drag manipulation of the mouse 108). Here, in order for the detection region designating unit 307 to designate the detection region 535, it is necessary that the trigger region designated by the trigger region designating unit 305 is selected (in the example of FIG. 13, "TR6") in the trigger region information portion 507. That is, the detection region 535 designated by the detection region designating unit 307 is associated with the trigger region selected in the trigger region information portion 507.

In addition, the setting unit 308 displays the name named in the detection region 535 designated by the detection region designating unit 307 as the attribute information of the detection region 535, and the predetermined sensitivity (for example, "50"), the predetermined threshold value (for example, "20%"), the monitoring method (for example, a "Gray Scale"), the presence or absence of action (for example, "Absent"), and the image determination method (for example, "Coincident"), used in the image determination described below, as the default value on the detection region information portion 509. As illustrated in FIG. 13, for example, the setting unit 308 names "K61" as the name of the detection region 535 by assuming the detection region as a first region associated with the trigger region of "TR6". In addition, the setting unit 308 calculates the delay time of the time of the frame at the time point at which the detection region 535 is designated by the detection region designating unit 307 (in the example of FIG. 13 "2.14") as the attribute information with respect to the time of the change point detected by the change point detecting unit 306, and displays the delay time on the detection region information portion 509. That is, in this case, in the detection region 535 named as "K61", the image determination is set to be performed after "2.14" seconds from the trigger timing. In addition, the setting unit 308 stores the attribute information of the detection region 535 displayed on the detection region information portion 509 in the storing unit 302 in association with the set-up number displayed on the set-up number display unit 515.

In addition, the detection region designating unit 307 extracts the image in the detection region 535 at the time where the detection region 535 is designated as the detection reference image and stores the extracted image in the storing unit 302, and stores the information of the designated detection region 535 in the storing unit 302, in association with the set-up number displayed on the set-up number display unit 515. Furthermore, here, the information of the detection region 535 stored by the storing unit 302, for example, is information such as information representing the relative position with respect to the base region 570 and the shape of the detection region 535.

The setting screen 500 illustrated in FIG. 14 represents a state in which a detection region 536, which is the second detection region, is designated in the setting video display unit 502 on which the video data is reproduced and displayed by the first reproducing unit 304. Specifically, first, the slider 505 of the seek bar 504 slides according to the manipulation of the input unit 303 by the user while the video data is reproduced and displayed (temporarily stopped) on the setting video display unit 502, and performs adjustment to the timing where the portion of the image desired to be subjected to the image determination is displayed. The first reproducing unit 304 displays the imaging date and the imaging time of the frame of the video data which is temporarily stopped on the setting video display unit 502 on the time display unit 506.

Next, the detection region designating unit 307 designates and displays the detection region 536 (the determination region), which is the second detection region, on the setting video display unit 502, according to the manipulation of the input unit 303 by the user (for example, the drag manipulation of the mouse 108). Here, in order for the detection region designating unit 307 to designate the detection region 536, as with a case where the detection region 535 is designated, it is necessary that the trigger region designated by the trigger region designating unit 305 is selected (in the example of FIG. 14, "TR6") in the trigger region information portion 507. That is, the detection region 536 designated by the detection region designating unit 307 is associated with trigger region selected in the trigger region information portion 507.

In addition, the setting unit 308 displays the name named in the detection region 536 designated by the detection region designating unit 307 as the attribute information of the detection region 536, and the predetermined sensitivity (for example, "50"), the predetermined threshold value (for example, "20%"), the monitoring method (for example, "Gray Scale"), the presence or absence of action (for example, "Absent"), and the image determination method (for example, "Coincident"), used in the image determination described below, as the default value on the detection region information portion 509. As illustrated in FIG. 14, for example, the setting unit 308 names "K62" as the name of the detection region 536 by assuming the detection region as a second region associated with the detection region of "TR6". In addition, the setting unit 308 calculates the delay time of the time of the frame at the time point at which the detection region 536 is designated by the detection region designating unit 307 (in the example of FIG. 14, "−1.86") as the attribute information with respect to the time of the change point detected by the change point detecting unit 306, and displays the calculated delay time on the detection region information portion 509. That is, in this case, in the detection region 535 named as "K62", the image determination is set to be performed before "1.86" seconds from the trigger timing. In addition, the setting unit 308 stores the attribute information of the detection region 536 displayed on the detection region information portion 509 in the storing unit 302 in association with the set-up number displayed on the set-up number display unit 515.

In addition, the detection region designating unit 307 extracts the image in the detection region 536 at the time where the detection region 536 is designated as the detection reference image and stores the extracted image in the storing unit 302, and stores the information of the designated detection region 536 in the storing unit 302, in association with the set-up number displayed on the set-up number display unit 515.

The setting screen 500 illustrated in FIG. 15 represents a state in which "K62" is selected from the detection regions "K61" (the detection region 535) and "K62" (the detection region 536) of which the attribute information is displayed on the detection region information portion 509. The edition of the attribute information of the detection region will be described with reference to FIG. 15.

As illustrated in FIG. 15, first, in a case where any one of the detection regions of which the attribute information is displayed on the detection region information portion 509 is selected according to the manipulation of the input unit 303 by the user, the setting unit 308 reversely displays a display portion of the attribute information of the selected detection region of the detection region information portion 509. Hereinafter, as illustrated in FIG. 15, an example will be described in which the detection region 536 (a detection region name of "K62") is selected.

Next, for example, in a case where the action button 510a is pressed according to the manipulation of the input unit 303 by the user, the setting unit 308 switches a setting value of the presence or absence of the action of the selected detection region 536. For example, in a case where the presence or absence of the action of the detection region 536 is "Absent", and the action button 510a is pressed, the setting unit 308 sets the presence or absence of the action of the detection region 536 as "Present". In contrast, in a case where the presence or absence of the action of the detection region 536 is "Present", and the action button 510a is pressed, the setting unit 308 sets the presence or absence of the action of the detection region 536 as "Absent". As described below, in a case where the presence or absence of the action is "Present", and the detection region determination unit 314 determines that there is an abnormality in the image determination of the detection region, the external output unit 316 outputs the abnormality signal.

In addition, for example, in a case where the image determination selection button 510b is pressed according to the manipulation of the input unit 303 by the user, the setting unit 308 switches a setting value of the image determination method of the selected detection region 536. For example, in a case where the image determination method of the detection region 536 is "Coincident", and the image determination selection button 510b is pressed, the setting unit 308 sets the image determination method of the detection region 536 as "Discordant". In contrast, in a case where the image determination method of the detection region 536 is "Discordant", and the image determination selection button 510b is pressed, the setting unit 308 sets the image determination method of the detection region 536 as "Coincident".

As described below, in a case where the image determination method is "Coincident", and a difference between the extracted image and the detection reference image is greater than or equal to the threshold value of the attribute information, the detection region determination unit 314 determines that there is an abnormality. Thus, examples of a case where the image determination method is "Coincident" include a case where in a facility in which a component is inserted to a work, a state where the component is inserted to the work is set to the detection reference image, and the image determination is performed at a timing where an insertion operation of the component with respect to the work is ended. In this case, when the insertion operation of the component with respect to the work is failed, and the image determination is executed by the detection region determination unit 314 in a state where the component is not normally inserted, the difference with respect to the detection reference image is greater than or equal to the threshold value of the attribute information, and it is determined that there is an abnormality.

In contrast, in a case where the image determination method is "Discordant", and the difference between the extracted image and the detection reference image is less than the threshold value of the attribute information, the detection region determination unit 314 determines that there is an abnormality. Thus, examples of a case where the image determination method is "Discordant" include a case where in the facility in which the component is inserted to the work, the state where the component is not inserted to the work is set to the detection reference image, and the image determination is performed at the timing where the insertion operation of the component with respect to the work is ended. In this case, when the insertion operation of the component with respect to the work is failed, and the image determination is executed by the detection region determination unit 314 the state where the component is not normally inserted, the difference with respect to the detection reference image is less than the threshold value of the attribute information, and it is determined that there is an abnormality. Furthermore, examples of a circumstance where the state in which the component is not inserted to the work is set to the detection reference image include a case where it is difficult to prepare the work to which the component as a completed product is inserted.

In addition, for example, in a case where the deletion button 510c is pressed according to the manipulation of the input unit 303 by the user, the setting unit 308 deletes the attribute information of the detection region 536 which is displayed on the detection region information portion 509, and deletes the attribute information of the detection region 536 which is stored in the storing unit 302. In addition, the detection region designating unit 307 deletes the detection region 536 which is displayed on the setting video display unit 502, and deletes the detection reference image and the information of the detection region 536 which are stored in the storing unit 302.

In addition, for example, in a case where the sensitivity increase button 510e is pressed according to the manipulation of the input unit 303 by the user, the setting unit 308 increases the value of the sensitivity used for the image determination of the selected detection region 536 by a predetermined value. In contrast, in a case where the sensitivity decrease button 510f is pressed according to the manipulation of the input unit 303 by the user, the setting unit 308 decreases the value of the sensitivity used for the image determination of the selected detection region 536 by a predetermined value.

In addition, for example, in a case where the threshold value increase button 510g is pressed according to the manipulation of the input unit 303 by the user, the setting unit 308 increases the value of the threshold value used for the image determination of the selected detection region 536 by a predetermined value. In contrast, in a case where the threshold value decrease button 510h is pressed according to the manipulation of the input unit 303 by the user, the setting unit 308 decreases the value of the threshold value used for the image determination of the selected detection region 536 by a predetermined value.

(Set-Up Change Operation)
<Designation of Set-Up Number>

Figure 16:
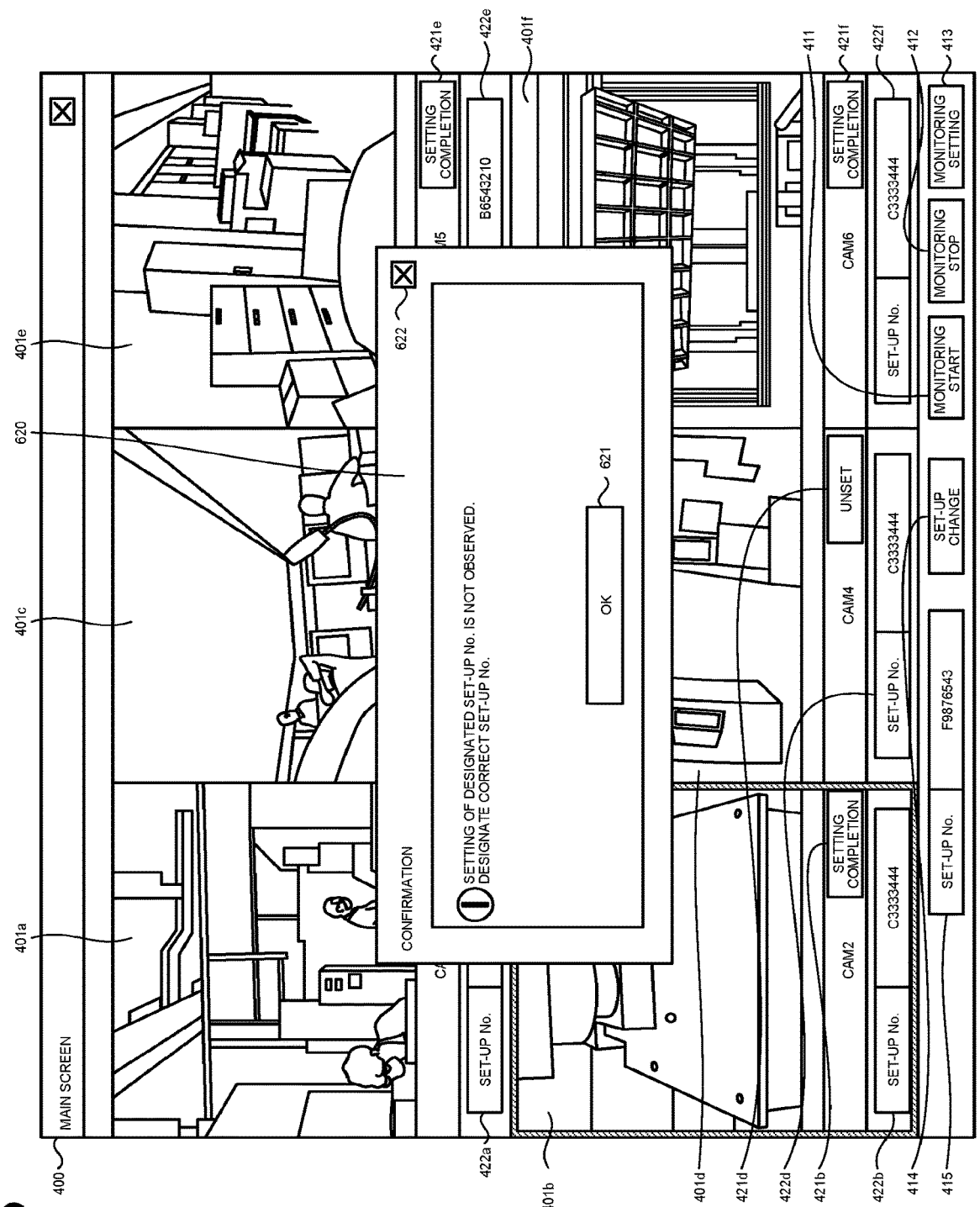
FIG. 16 is a diagram illustrating an example of a dialogue to be displayed in a case where the set-up number designated on the main screen to be displayed on the display device of the information processing device according to the embodiment is not capable of being retrieved.

FIG. 16 is a diagram illustrating an example a dialogue to be displayed in a case where the set-up number designated on the main screen to be displayed on the display device of the information processing device according to the embodiment is not capable of being retrieved. An operation of designating the set-up number in the main screen 400 at the time of performing the set-up change operation will be described with reference to FIG. 16.

The main screen 400 illustrated in FIG. 16 represents a state in which a set-up number of "F9876543" is input into the set-up number input unit 415 according to the manipulation of the input unit 303 by the user (for example, an input manipulation of the keyboard 107). Specifically, first, the user specifies the imaging device 2 desired to be subjected to the set-up change, and the set-up number corresponding to the setting information of performing the set-up change according to the manipulation of the input unit 303 is input into the set-up number input unit 415. Then, the user presses the set-up change button 414 according to the manipulation of the input unit 303.

In a case where the set-up change button 414 is pressed according to the manipulation of the input unit 303, the set-up control unit 327 retrieves whether or not the setting information corresponding to the set-up number which is input into the set-up number input unit 415 is stored in the storing unit 302. Specifically, the set-up control unit 327 confirms whether or not a root folder having the name of the set-up number which is input into the set-up number input unit 415 exists in a directory structure of the setting information illustrated in FIG. 5 described above.

In addition, in a case where the setting information corresponding to the set-up number which is input into the set-up number input unit 415 is not stored in the storing unit 302, the main screen 400 illustrated in FIG. 16 represents a state where a no set-up number notification dialogue 620 representing that the setting information is not stored is displayed. In a case where the setting information corresponding to the set-up number is not stored in the storing unit 302, the set-up control unit 327 displays the no set-up number notification dialogue 620.

The no set-up number notification dialogue 620 includes an OK button 621 and a close button 622. The close button 622 is a button for closing the no set-up number notification dialogue 620. In a case where the OK button 621 is pressed according to the manipulation of the input unit 303 by the user, the set-up control unit 327 closes the no set-up number notification dialogue 620 without displaying the set-up change screen 700 described below.

In contrast, in a case where the setting information corresponding to the set-up number is stored in the storing unit 302, the set-up control unit 327 is transitioned from the main screen 400 to the set-up change screen 700 described below.

Furthermore, the set-up number of the set-up number input unit 415 is input into the input unit 303, but is not limited thereto, and for example, in a case where an application is activated, the set-up control unit 327 may extract the name of the root folder (the set-up number) in which the setting information stored in the storing unit 302 is stored, and may perform pull-down display on the set-up number input unit 415. In this case, the user may perform a selecting manipulation with respect to a desired set-up number from the pull-down display without inputting all of the set-up numbers by the input unit 303. In addition, a bar code reader is connected to the information processing device 3, and a bar code in which the set-up number is encoded is read out, and thus, the set-up number may be input into the set-up number input unit 415.

<Matching Operation after Imaging Device being Static>

Figure 17:
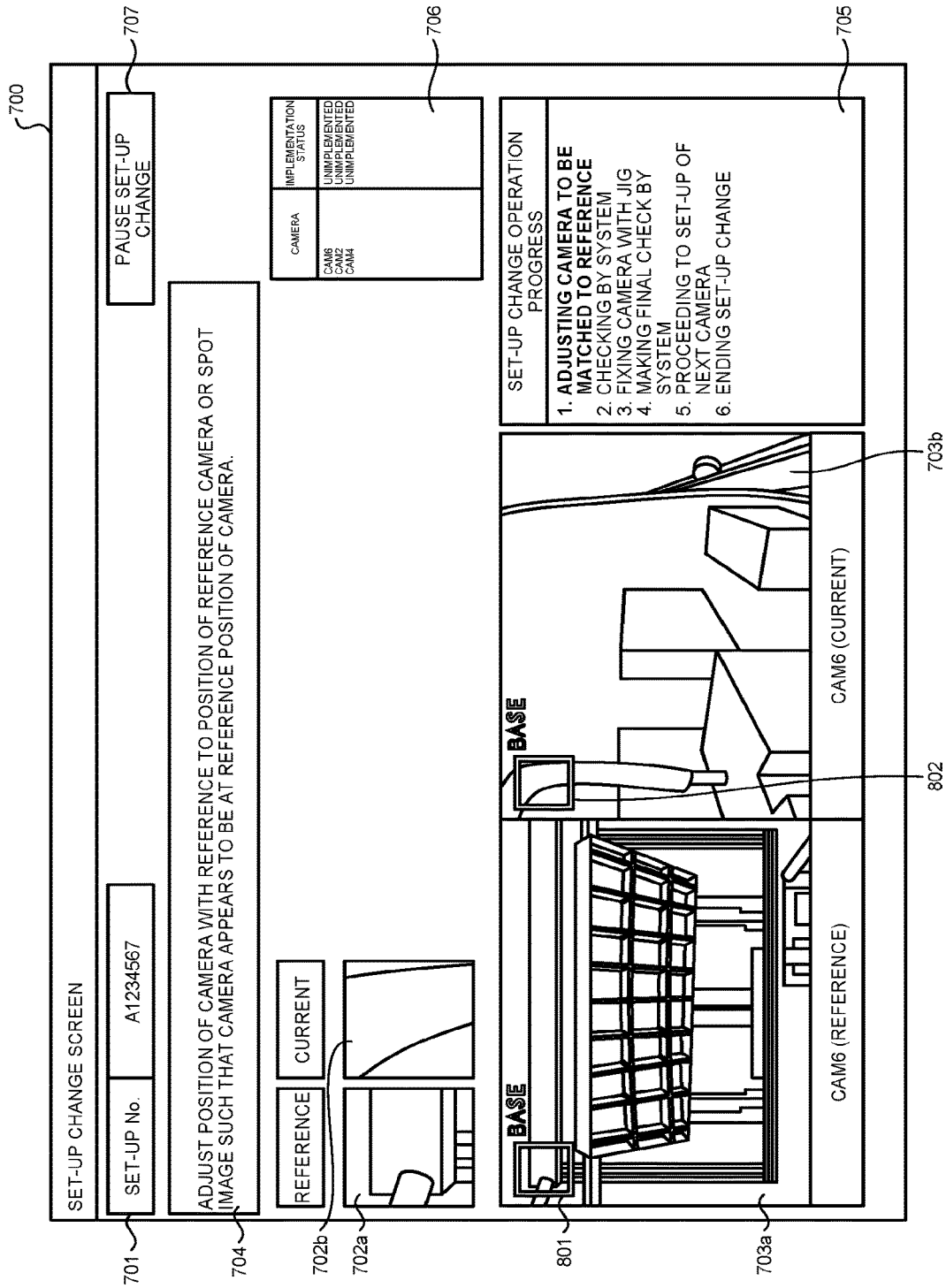
FIG. 17 is a diagram illustrating an example of a state in which a reference static image and a real-time video are displayed on a set-up change screen to be displayed on the display device of the information processing device according to the embodiment.
Figure 18:
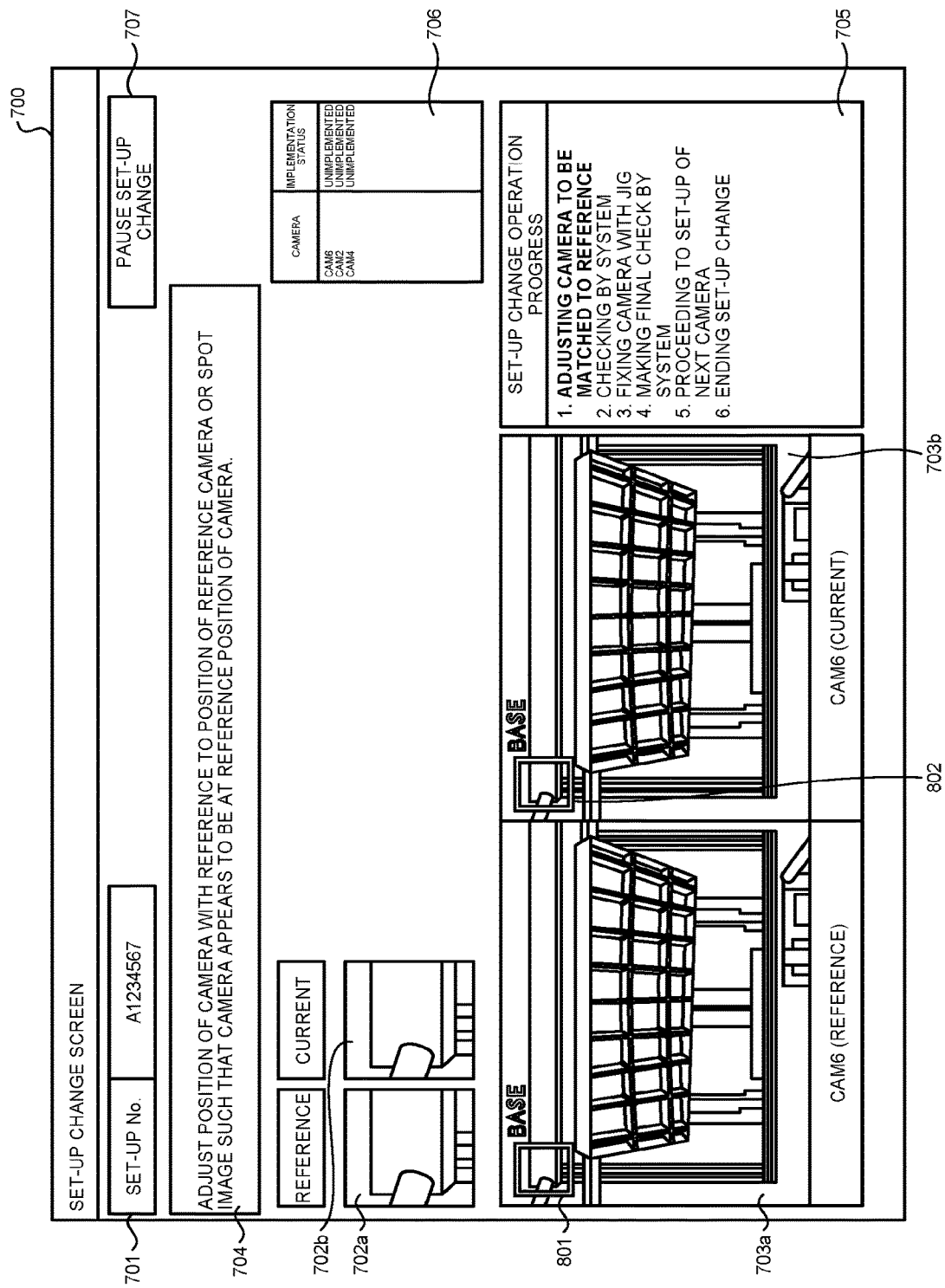
FIG. 18 is a diagram illustrating an example of a state in which a camera is disposed such that the real-time video is matched to the reference static image on the set-up change screen to be displayed on the display device of the information processing device according to the embodiment.
Figure 19:
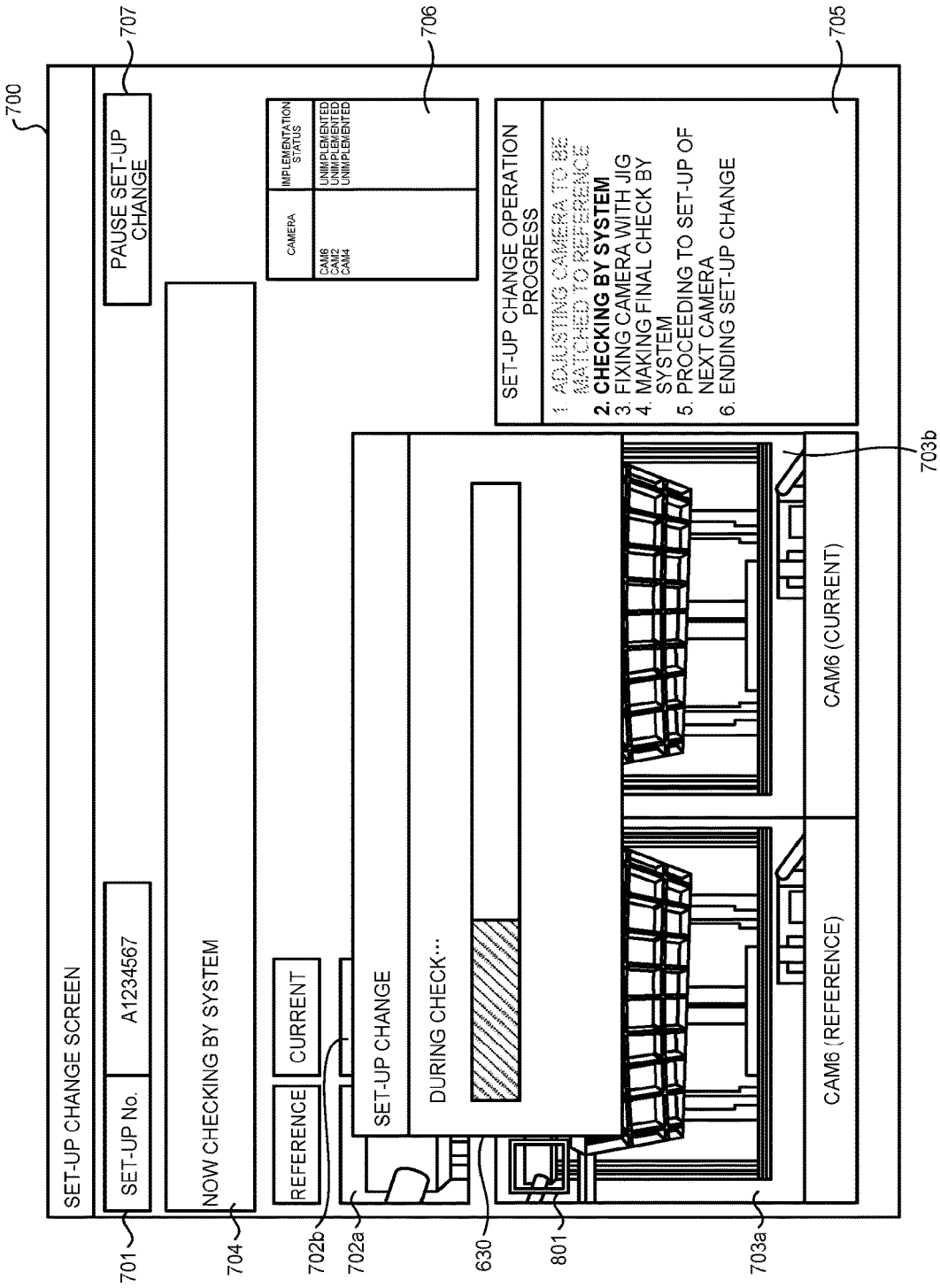
FIG. 19 is a diagram illustrating an example of a dialogue to be displayed during a matching operation of the real-time video on the set-up change screen to be displayed on the display device of the information processing device according to the embodiment.
Figure 20:
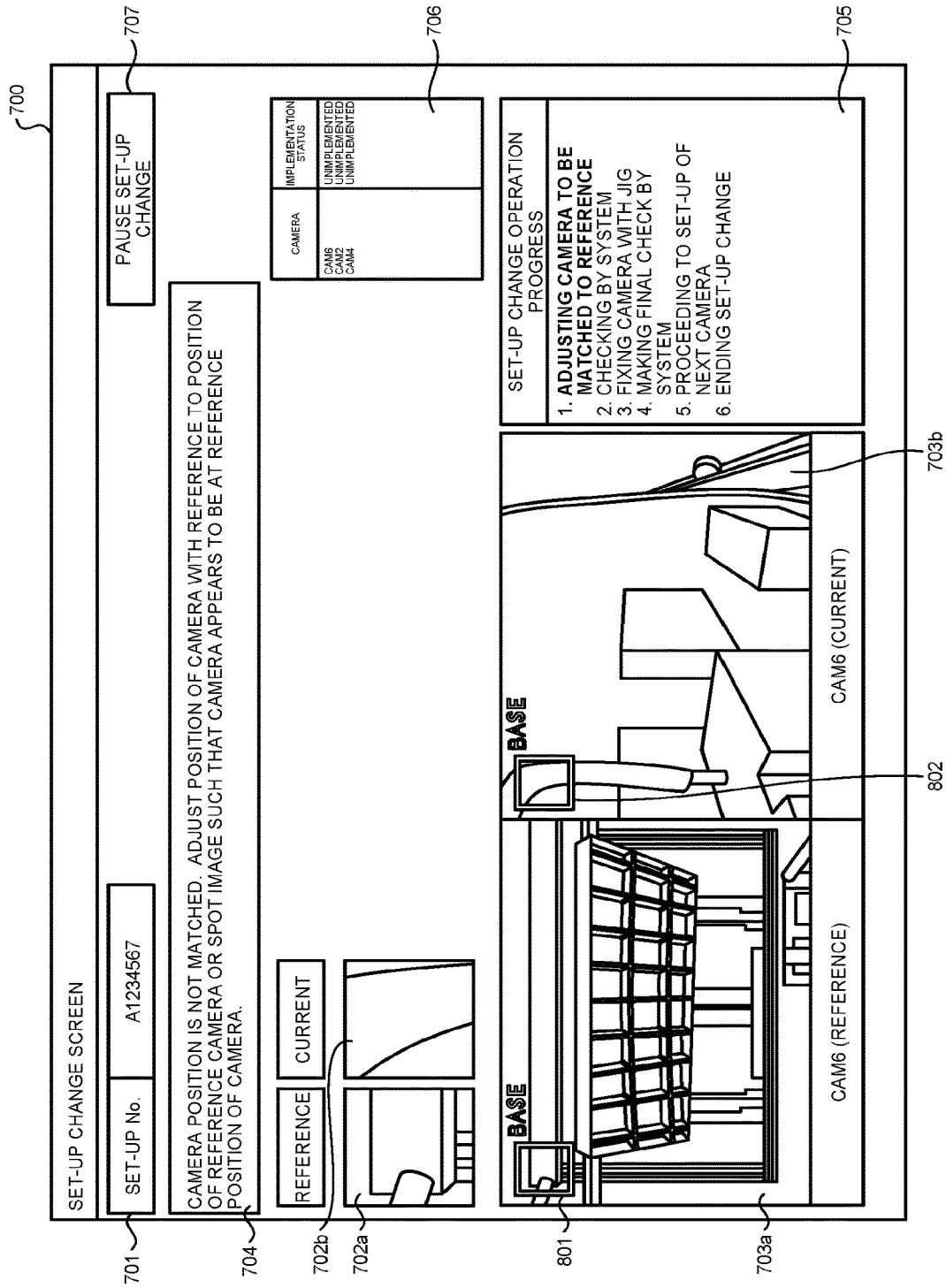
FIG. 20 is a diagram illustrating an example of a state in a case where the matching is not capable of being performed in the real-time video on the set-up change screen to be displayed on the display device of the information processing device according to the embodiment.
Figure 21:
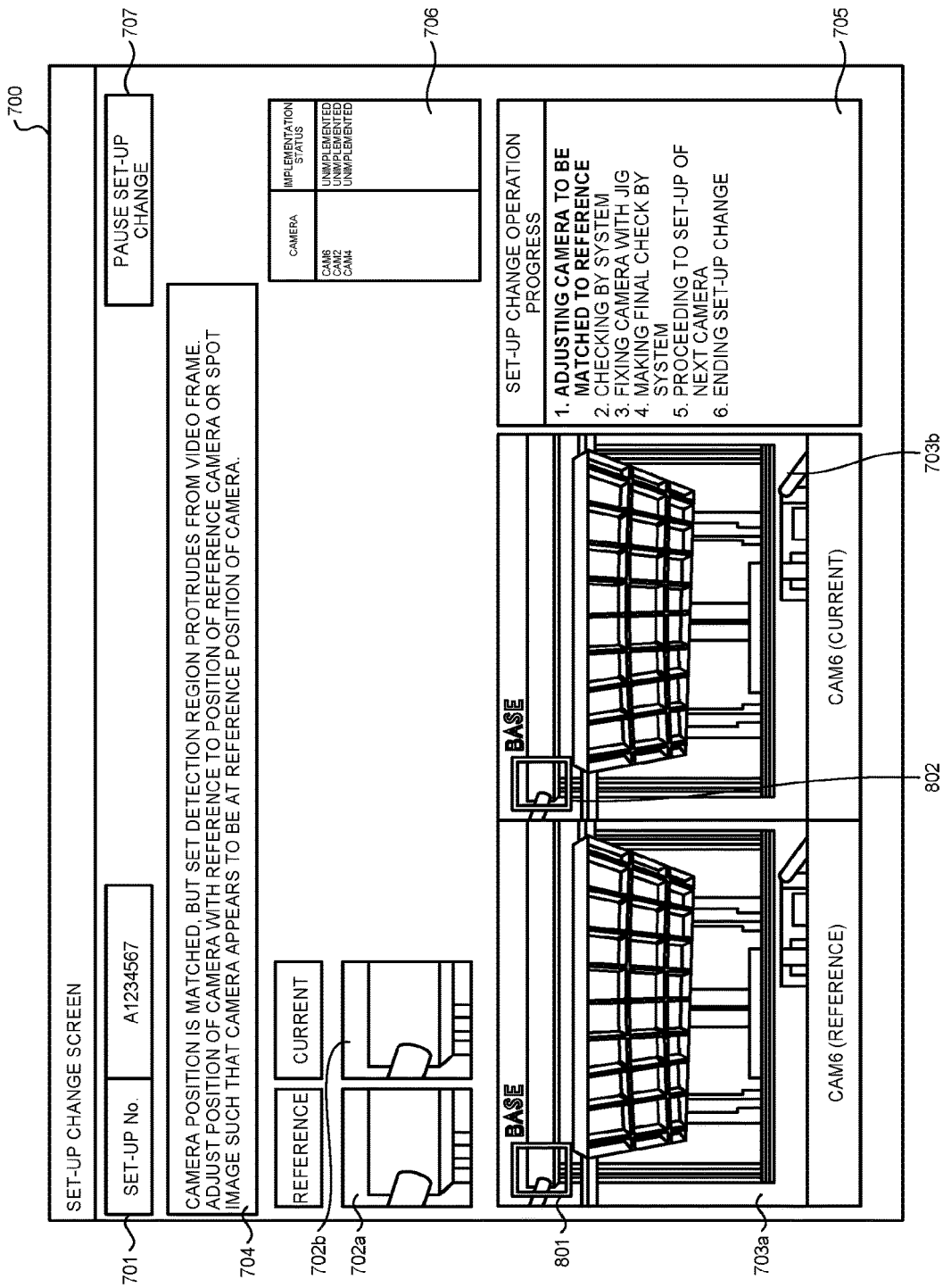
FIG. 21 is a diagram illustrating an example of a state in a case where another setting region protrudes from a display frame in the real-time video on the set-up change screen to be displayed on the display device of the information processing device according to the embodiment.

FIG. 17 is a diagram illustrating an example of a state in which the reference static image and the real-time video are displayed on the set-up change screen to be displayed on the display device of the information processing device according to the embodiment. FIG. 18 is a diagram illustrating an example of a state in which a camera is disposed such that real-time video is matched to the reference static image on the set-up change screen to be displayed on the display device of the information processing device according to the embodiment. FIG. 19 is a diagram illustrating an example of a dialogue to be displayed during a matching operation of the real-time video on the set-up change screen to be displayed on the display device of the information processing device according to the embodiment. FIG. 20 is a diagram illustrating an example of a state in a case where the matching is not capable of being performed in the real-time video on the set-up change screen to be displayed on the display device of the information processing device according to the embodiment. FIG. 21 is a diagram illustrating an example of a state in a case where another setting region protrudes from a display frame in the real-time video on the set-up change screen to be displayed on the display device of the information processing device according to the embodiment. In the set-up change screen 700, the matching operation to be automatically activated in a case where the imaging device 2 is static in a disposing position will be described with reference to FIGS. 17 to 21.

As illustrated in FIG. 17, the set-up change screen 700 includes a set-up number display unit 701, a reference image display unit 702a, an extracted image display unit 702b, a reference static image display unit 703a (a first display region), a real-time video display unit 703b (a second display region), an operation instruction display unit 704, an operation progress display unit 705, a camera implementation status display unit 706, and a pause button 707.

The set-up number display unit 701 is a display unit which displays the set-up number which is manipulated and input into the set-up number input unit 415 of the main screen 400 described above.

The reference image display unit 702a is a display unit which displays the base reference image corresponding to the set-up number, read out by the image extracting unit 324 from the storing unit 302. The extracted image display unit 702b is a display unit which displays the extracted image extracted as the image in the provisional base region 802 from the frame of the real-time video data displayed on the real-time video display unit 703b by the image extracting unit 324.

The reference static image display unit 703a is a display unit which displays the reference static image corresponding to the set-up number, read out from the storing unit 302 by the image extracting unit 324. The real-time video display unit 703b is a display unit which displays the real-time video data of the imaging device 2, which is a target of the set-up change operation, by the video display unit 322.

The operation instruction display unit 704 is a display unit which displays the message information according to the stage of the set-up change in the set-up change operation. The operation progress display unit 705 is a display unit which represents a progress situation of the set-up change operation. The camera implementation status display unit 706 is a display unit which represents a performing state of the set-up change operation of the imaging device 2 associated with the set-up number displayed on the set-up number display unit 701.

When the pause button 707 is pressed according to the manipulation of the input unit 303 by the user, the set-up change operation is paused by the set-up control unit 327, and the set-up change screen 700 is transitioned to the main screen 400.

The set-up change screen 700 illustrated in FIG. 17 represents a state of being transitioned from the main screen 400 in a case where it is determined that the setting information corresponding to the set-up number which is input into the set-up number input unit 415 of the main screen 400 is stored in the storing unit 302 by the set-up control unit 327. At this time, the set-up number display unit 701 displays the set-up number which is manipulated and input into the set-up number input unit 415 of the main screen 400 by the set-up control unit 327.

The reference image display unit 702a displays the base reference image corresponding to the set-up number which is read out from the storing unit 302 and is displayed on the set-up number display unit 701 (hereinafter, in the description of the set-up change operation, simply referred to as a "set-up number"), by the image extracting unit 324. In addition, the reference static image display unit 703a displays the reference static image corresponding to the set-up number which is read out from the storing unit 302, by the image extracting unit 324. In addition, the real-time video display unit 703b displays the real-time video data of the imaging device 2 (in FIG. 17, "CAM6", that is, the imaging device 2f), which is the target of the set-up change operation, by the video display unit 322. Further, the extracted image display unit 702b displays the extracted image which is extracted as the image in the provisional base region 802 from the frame of the real-time video data to be displayed on the real-time video display unit 703b, by the image extracting unit 324.

The reference static image display unit 703a displays a first base region 801 (a first reference region) in a position corresponding to the base region 570 which is superimposed on the reference static image and is designated by the base region designating unit 331, by the base region specifying unit 323. The image in the first base region 801 in the reference static image corresponds to the base reference image.

The real-time video display unit 703b displays the provisional base region 802 in a position corresponding to the position of the first base region 801 of the reference static image display unit 703a, by the base region specifying unit 323. The image in the provisional base region 802 of the video data to be displayed on the real-time video display unit 703b corresponds to the extracted image.

The camera implementation status display unit 706 represents that the set-up change with respect to the imaging device 2 associated with the set-up number (in FIG. 17, "A1234567") (the imaging device 2f which is "CAM6", the imaging device 2b which is "CAM2", and the imaging device 2d which is "CAM4") is not performed yet, by the message control unit 321. The target of the set-up change operation will be described by being simply expressed as the imaging device 2.

As illustrated in FIG. 17, the frame of the video data to be displayed on the real-time video display unit 703b is different from the reference static image displayed on the reference static image display unit 703a, and thus, it is necessary to change the disposing position of the imaging device 2. Therefore, the message control unit 321 displays the message information urging the adjustment of the position of the imaging device 2, which is a set-up change target, on the operation instruction display unit 704, and displays that an operation progress of the set-up change operation is a stage of "1. Adjusting Camera to be Matched to Reference" on the operation progress display unit 705.

The set-up change screen 700 illustrated in FIG. 18 represents a state in which the position of the imaging device 2, which is the set-up change target, is adjusted into the vicinity of the position represented by the reference static image by the user. The video display unit 322 extracts the extracted image (the image in the provisional base region 802) from the frame of the real-time video data to be displayed on the real-time video display unit 703b, and displays the extracted image on the extracted image display unit 702b, while the user adjusts the position of the imaging device 2. The position of the imaging device 2, which is the set-up change target, is adjusted into the vicinity of the position represented by the reference static image by the user, and thus, as illustrated in FIG. 18, the reference static image displayed on the reference static image display unit 703a is approximately coincident with the frame of the video data displayed on the real-time video display unit 703b.

The imaging device 2 is moved to a position as illustrated in FIG. 18 by the user, and the static state determination unit 325 determines whether or not the imaging device 2 is static. In a case where the static state determination unit 325 determines that the imaging device 2 is static, the base region specifying unit 323 executes the matching operation (a first matching operation) of searching for an image coincident with the base reference image in the frame of the video data displayed on the real-time video display unit 703b. Here, for example, a frame at a time point where the static state determination unit 325 determines that the imaging device 2 is static may be used as the frame of the video data of the real-time video display unit 703b, which is a target of the matching operation. Here, the "Coincident" includes not only the case of being completely coincident, but also a state of approximating the degree which can be regarded as coincident. Furthermore, the base region specifying unit 323 is not limited to execute the matching operation with respect to the entire frame displayed on the real-time video display unit 703b, and for example, may execute the matching operation in a range of a predetermined pixel in up-and-down and right-and-left directions of the displayed provisional base region 802 (at this time point, the provisional base region is displayed in a position corresponding to the first base region 801) (for example, 30 pixels). In addition, a method of the matching operation may be a known template matching method, and for example, sum of absolute difference (SAD), sum of squared difference (SSD), normalized cross-correlation (NCC), phase-only correlation (POC), or the like can be applied to the method of the matching operation.

The determination of the static state determination unit 325 described above of whether or not the imaging device 2 is static, that is, the determination of whether or not the real-time video data displayed on the real-time video display unit 703b is static, for example, is performed by the following method. First, the static state determination unit 325 gray-scales each frame of the real-time video data such that the pixel value, for example, is configured of a brightness value of 0 to 255. Next, the static state determination unit 325 calculates a difference in the brightness values between preceding and following frames of real-time video data by each of the corresponding pixels. Next, in a case where the pixel corresponding to the difference of less than or equal to a predetermined value (for example, 30) is greater than a predetermined rate (for example, 95%) of the entire image, the static state determination unit 325 determines that the preceding and following frames are identical to each other with respect to the calculated difference in the brightness values of each of the pixels. Then, in a case where an operation of determining that the preceding and following frames are identical to each other is continuous for a predetermined time (for example, 2 seconds), the static state determination unit 325 determines the real-time video data displayed on the real-time video display unit 703b as static.

In a case where the static state determination unit 325 determines that the imaging device 2 is static, the set-up change screen 700 illustrated in FIG. 19 represents a state where the matching operation is executed by the base region specifying unit 323, and a search progress dialogue 630 is displayed. Specifically, in a case where the static state determination unit 325 determines that the imaging device 2 is static, the base region specifying unit 323 displays the search progress dialogue 630, and executes the matching operation described above. The search progress dialogue 630 is a dialogue displaying a progress bar which represents a progress situation of the matching operation. In addition, the message control unit 321 displays message information representing the effect that the matching operation is executed (in the example of FIG. 19, displays "Now Checking by System") on the operation instruction display unit 704 while the matching operation of the base region specifying unit 323 is executed. In addition, the message control unit 321 displays that the operation progress of the set-up change operation is a stage of "2. Checking by System" on the operation progress display unit 705.

As a result of the matching operation of the base region specifying unit 323, in a case where the image which is coincident with the base reference image is not observed in the frame of the video data displayed on the real-time video display unit 703b, as illustrated in FIG. 20, the message control unit 321 displays the message information representing the effect on the operation instruction display unit 704. In addition, as a result of the matching operation, the image which is coincident with the base reference image is not observed, and thus, it is necessary for the user to adjust again the position of the imaging device 2, and therefore, the message control unit 321 displays that the operation progress of the set-up change operation is returned to the stage of "1. Adjusting Camera to be Matched to Reference" on the operation progress display unit 705.

In addition, as a result of the matching operation of the base region specifying unit 323, in a case where the image which is coincident with the base reference image is observed in the frame of the video data displayed on the real-time video display unit 703b, but other detection regions and the like (the trigger region 530, the detection region 535, the detection region 536, and the like described above), which are set according to the position of the coincident image (to be displayed on the provisional base region 802), protrude from the frame of the real-time video display unit 703b, as illustrated in FIG. 21, the message control unit 321 displays the message information representing the effect on the operation instruction display unit 704. In addition, the matching operation is not successful, and thus, it is necessary for the user to adjust again the position of the imaging device 2, and therefore, the message control unit 321 displays that the operation progress of the set-up change operation is returned to the stage of "1. Adjusting Camera to be Matched to Reference" on the operation progress display unit 705.

<Matching Operation after Fixing Imaging Device>

Figure 22:
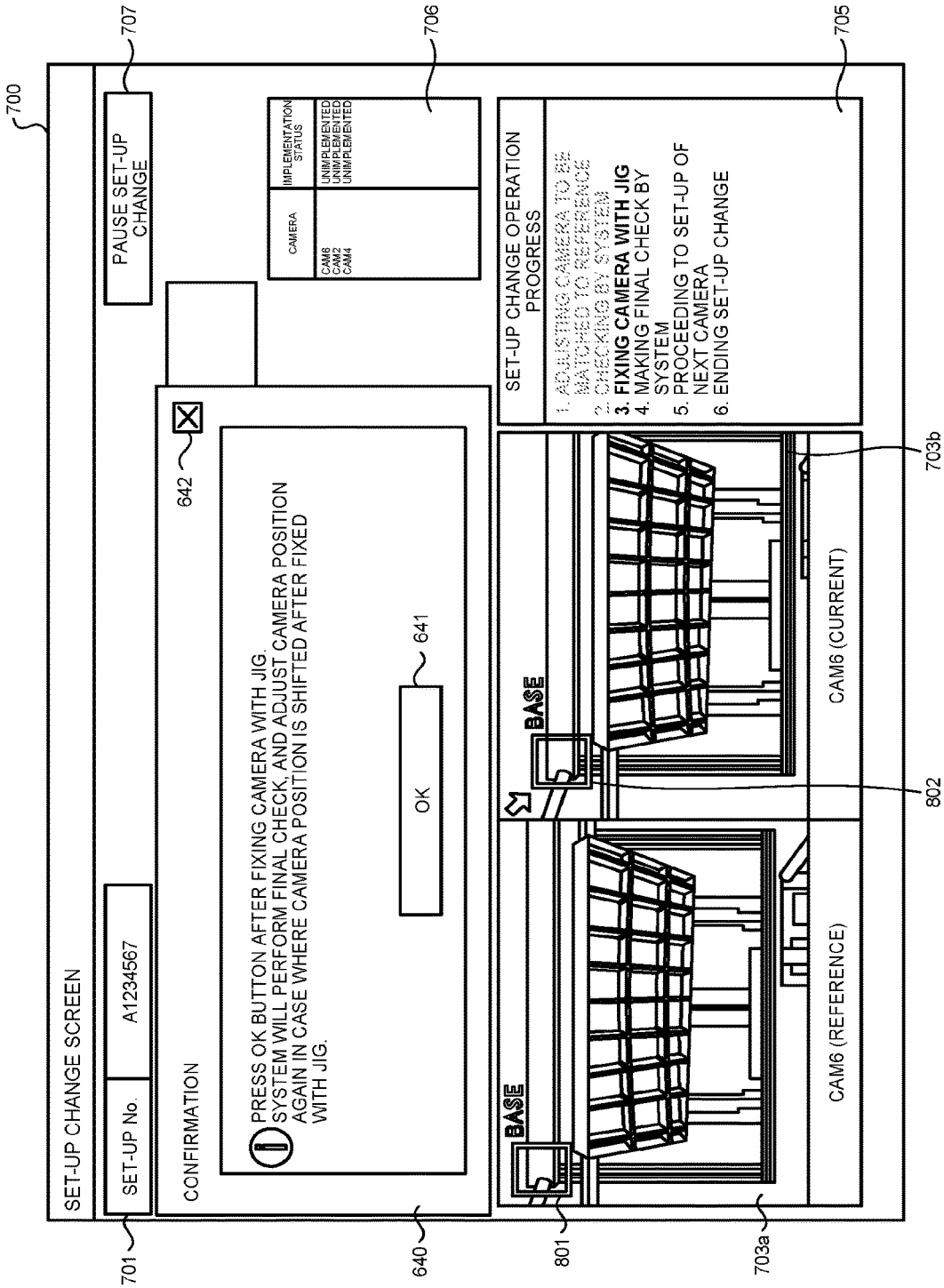
FIG. 22 is a diagram illustrating an example of a dialogue to be displayed in a case where the matching is capable of being performed in the real-time video on the set-up change screen to be displayed on the display device of the information processing device according to the embodiment.
Figure 23:
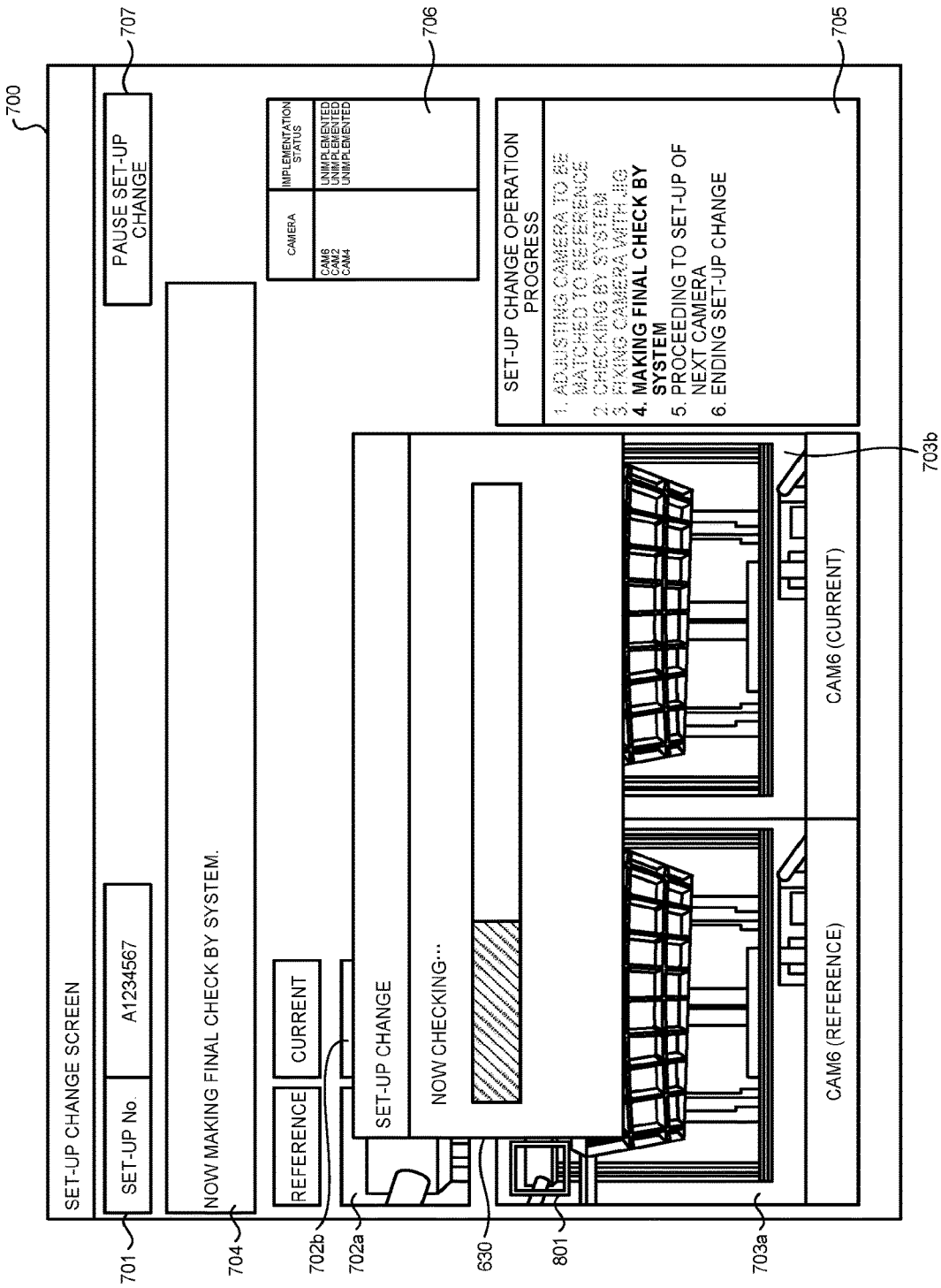
FIG. 23 is a diagram illustrating an example of a dialogue to be displayed during the matching operation for a final check on the set-up change screen to be displayed on the display device of the information processing device according to the embodiment.
Figure 24:
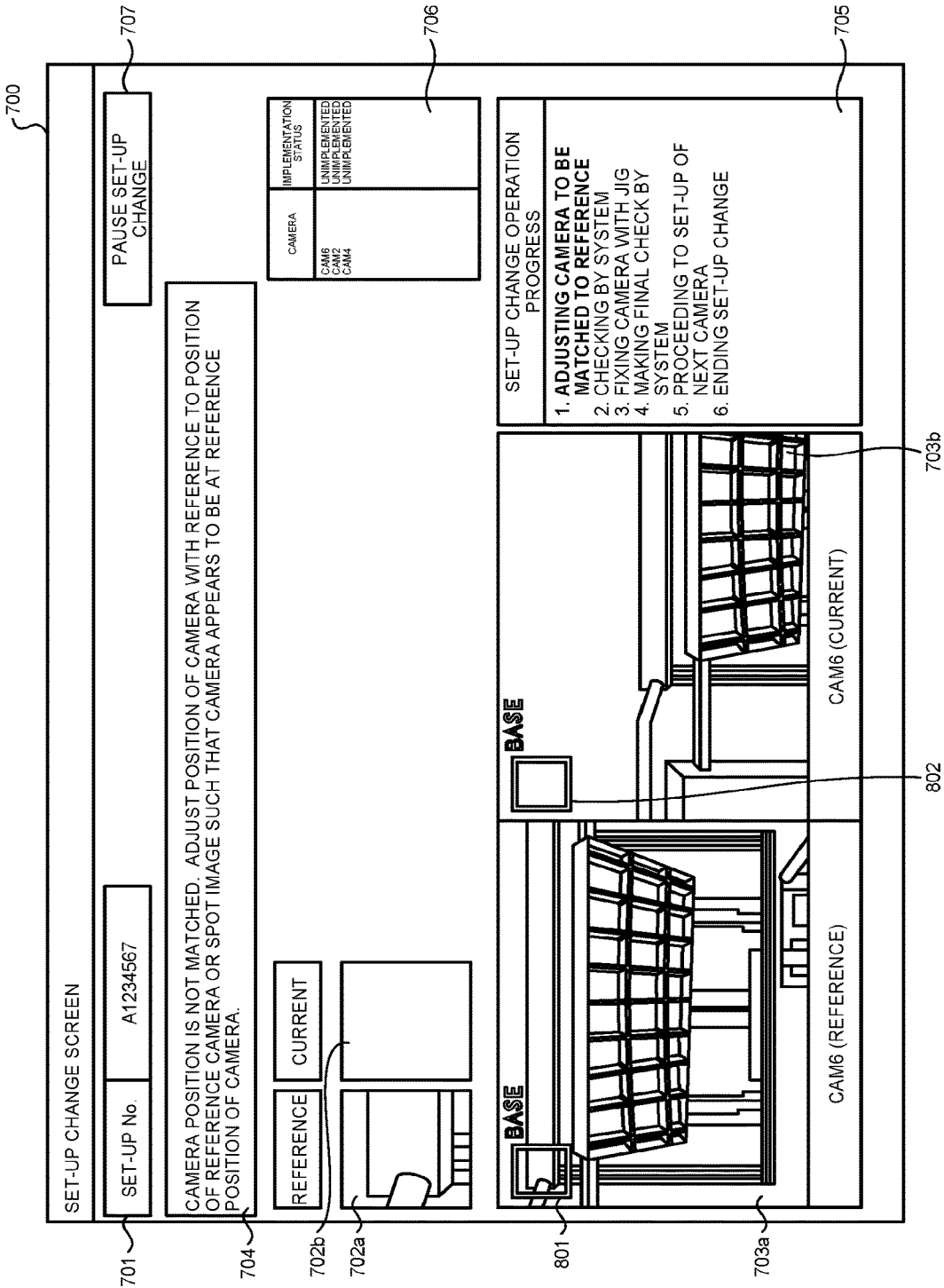
FIG. 24 is a diagram illustrating an example of a state in a case where the matching is not capable of being performed as a result of the matching operation for the final check on the set-up change screen to be displayed on the display device of the information processing device according to the embodiment.
Figure 25:
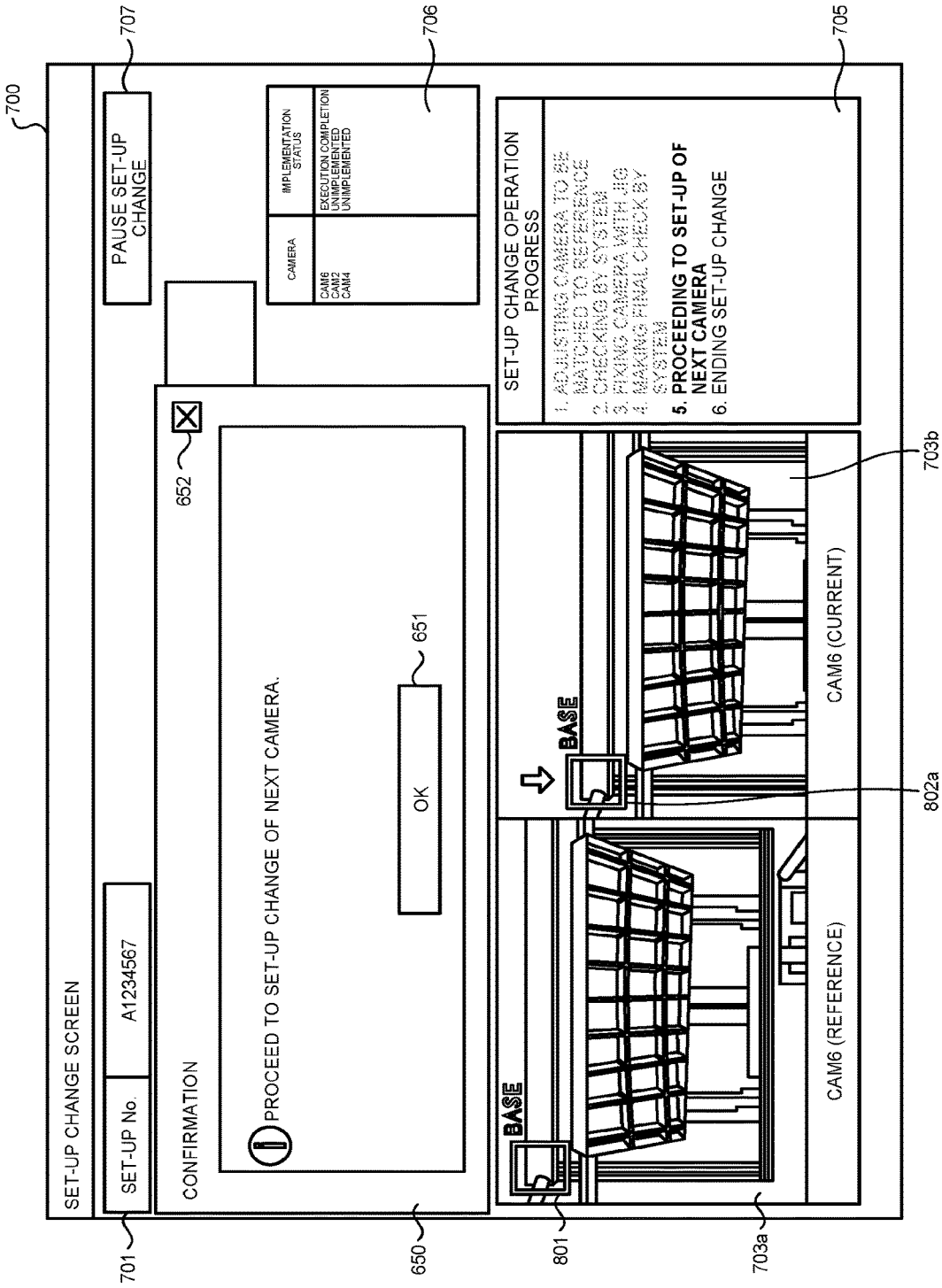
FIG. 25 is a diagram illustrating an example of a dialogue to be displayed for urging set-up change of the next camera on the set-up change screen to be displayed on the display device of the information processing device according to the embodiment.
Figure 26:
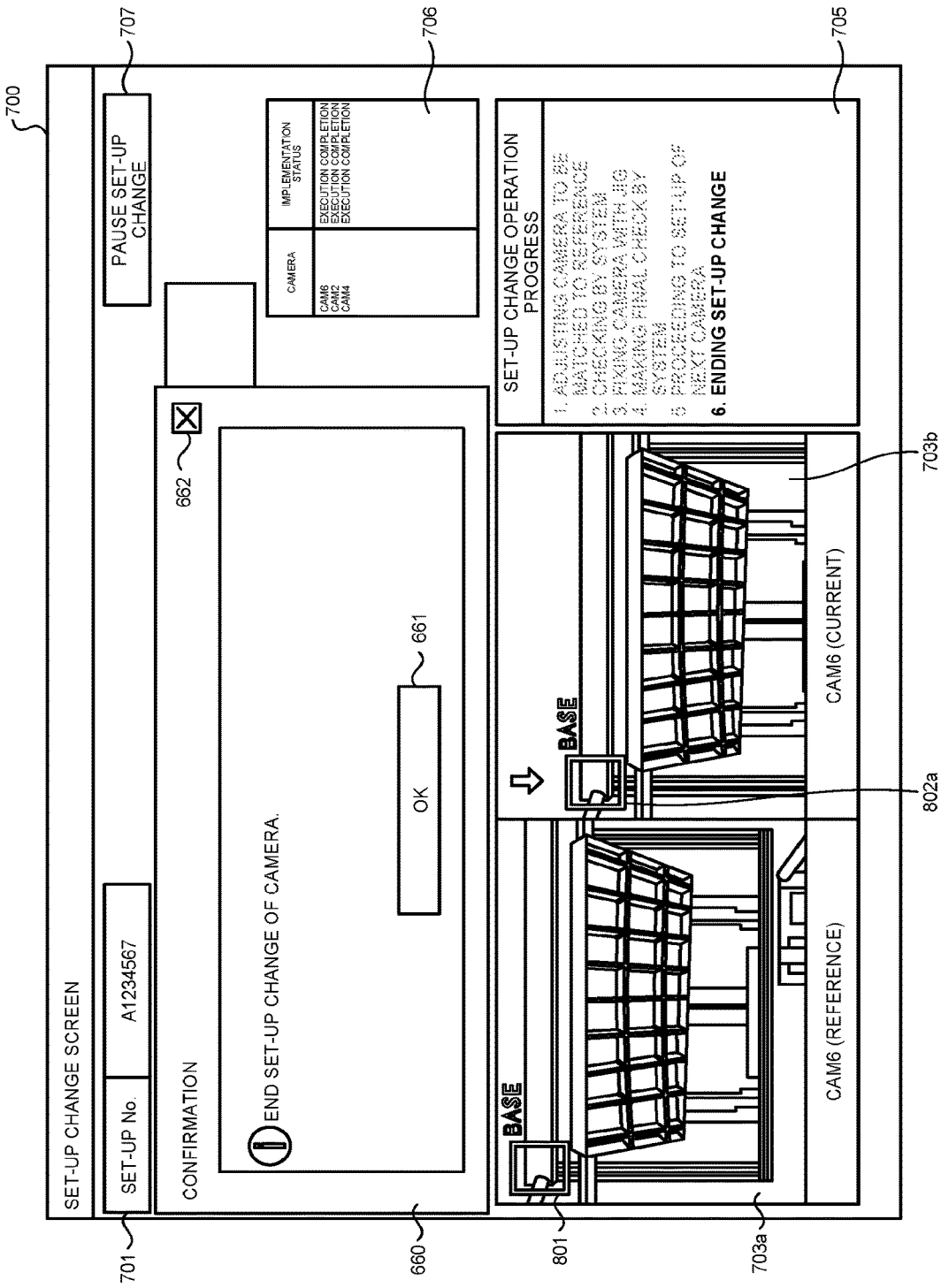
FIG. 26 is a diagram illustrating an example of a dialogue to be displayed in a case where the set-up change is ended on the set-up change screen to be displayed on the display device of the information processing device according to the embodiment.

FIG. 22 is a diagram illustrating an example of a dialogue to be displayed in a case where the matching is capable of being performed in the real-time video on the set-up change screen to be displayed on the display device of the information processing device according to the embodiment. FIG. 23 is a diagram illustrating an example of a dialogue to be displayed during the matching operation for a final check on the set-up change screen to be displayed on the display device of the information processing device according to the embodiment. FIG. 24 is a diagram illustrating an example of a state in a case where the matching is not capable of being performed as a result of the matching operation for the final check on the set-up change screen to be displayed on the display device of the information processing device according to the embodiment. FIG. 25 is a diagram illustrating an example of a dialogue to be displayed for urging the set-up change of the next camera on the set-up change screen to be displayed on the display device of the information processing device according to the embodiment. FIG. 26 is a diagram illustrating an example of a dialogue to be displayed in a case where the set-up change is ended on the set-up change screen to be displayed on the display device of the information processing device according to the embodiment. A final matching operation which is executed on the set-up change screen 700 in the case of fixing the imaging device 2 will be described with reference to FIGS. 22 to 26.

In a case where the matching operation is successful, as illustrated in FIG. 22, the base region specifying unit 323 displays the provisional adjustment result notification dialogue 640 representing the effect that the matching operation is successful and the effect of urging the imaging device 2 to be fixed. The provisional adjustment result notification dialogue 640 includes an OK button 641 and a close button 642. As described below, the OK button 641 is a button for executing the final matching operation in the base region determiner 326. The close button 642 is a button for closing the provisional adjustment result notification dialogue 640.

In addition, as a result of the matching operation, the base region specifying unit 323 specifies the image which is coincident with the base reference image in the frame displayed on the real-time video display unit 703b by moving the provisional base region 802 (the provisional reference region). In addition, the message control unit 321 displays that the operation progress of the set-up change operation is a stage of "3. Fixing Camera with Jig" on the operation progress display unit 705.

The user fixes the imaging device 2, and then, presses the OK button 641 according to the manipulation of the input unit 303, according to the message displayed on the provisional adjustment result notification dialogue 640. As a result thereof, as illustrated in FIG. 23, the base region determiner 326 displays the search progress dialogue 630, and executes the final matching operation (the matching operation for final confirmation) (a second matching operation). Furthermore, the base region determiner 326 is not limited to execute the matching operation with respect to the entire frame displayed on the real-time video display unit 703b, and for example, may execute the matching operation in a range of a predetermined pixel in the up-and-down and right-and-left directions of the displayed provisional base region 802 (at this time point, the provisional base region is displayed in the position of the image retrieved by the matching operation of the base region specifying unit 323) (for example, 30 pixels). In addition, as with the matching operation of the base region specifying unit 323, the matching operation may be executed in the range of the predetermined pixel in the up-and-down and right-and-left directions from a position corresponding to the first base region 801.

In addition, the message control unit 321 displays the message information representing the effect that the final matching operation is executed (in the example of FIG. 23, displays "Now Making Final Check by System") on the operation instruction display unit 704 while the final matching operation of the base region determiner 326 is executed. In addition, the message control unit 321 displays that the operation progress of the set-up change operation is a stage of "4. Making Final Check by System" on the operation progress display unit 705.

As result of the final matching operation of the base region determiner 326, in a case where the image which is coincident with the base reference image is not observed in the frame of the video data displayed on the real-time video display unit 703b, as illustrated in FIG. 24, the message control unit 321 displays the message information representing the effect on the operation instruction display unit 704. In addition, as a result of the matching operation, the image which is coincident with the base reference image is not observed, and thus, it is necessary for the user to adjust again the position of the imaging device 2, and therefore, the message control unit 321 displays that the operation progress of the set-up change operation is returned to the stage of "1. Adjusting Camera to be Matched to Reference" on the operation progress display unit 705. Here, examples of the example where the image which is coincident with the base reference image is not observed in the frame of the video data displayed on the real-time video display unit 703b include a case where an imaging direction of the imaging device 2 is shifted at the time of fixing the imaging device 2 by the user, and the like. Furthermore, the image which is coincident with the base reference image is observed, but a procedure in a case where other detection regions and the like (the trigger region 530, the detection region 535, the detection region 536, and the like described above), which are set according to the position of the coincident image (to be displayed on the provisional base region 802), protrude from the frame of the real-time video display unit 703b is identical to that in the matching operation of the base region specifying unit 323 described above.

In a case where the final matching operation is successful, as illustrated in FIGS. 25 and 26, the base region determiner 326 displays the image which is coincident with the base reference image as a second base region 802a (a second reference region) in the frame displayed on the real-time video display unit 703b by moving the provisional base region 802. That is, the base region determiner 326 determines the position of the second base region 802a as a position which is corrected from the position corresponding to the first base region 801 of the reference static image display unit 703a. Then, the base region determiner 326 stores the information of the determined second base region 802a in the storing unit 302 in association with set-up number. Here, the information of the second base region 802a, for example, is information such as the information representing the position of the second base region 802a and the shape of the second base region 802a. Accordingly, in the examples of the FIGS. 25 and 26, the set-up change operation with respect to the imaging device 2 of "CAM6", that is, the imaging device 2f is completed. Then, the message control unit 321 displays "Execution Completion"

in order to represent that set-up change operation is completed with respect to the imaging device 2f ("CAM6"), which is associated with the set-up number, on the camera implementation status display unit 706.

In addition, in a case where the set-up change operation of one imaging device 2 associated with the set-up number (in the above description, the imaging device 2f) is completed, and there is the imaging device 2 which is similarly associated with the same set-up number and to which the set-up change operation is not completed (in the example of FIG. 25, "CAM2" and "CAM4"), as illustrated in FIG. 25, the set-up control unit 327 displays a next camera processing dialogue 650 representing the effect of allowing the operation to proceed to the set-up change operation with respect to the next imaging device 2. In addition, the set-up change operation of the next imaging device 2 is performed in the operation progress display unit 705, and thus, the message control unit 321 displays that the operation progress is the stage of "5. Proceeding to Set-Up of Next Camera".

The next camera processing dialogue 650 includes an OK button 651 and a close button 652. The OK button 651 is a button for starting the set-up change operation of the next imaging device 2. The close button 652 is a button for closing the next camera processing dialogue 650.

On the other hands, in a case where the set-up change operation of one imaging device 2 associated with the set-up number (in the above description, the imaging device 2f) is completed, and there is no imaging device 2 which is similarly associated with the same set-up number and to which the set-up change operation is not completed, the set-up control unit 327, as illustrated in FIG. 26, displays a set-up change end dialogue 660 representing the effect that the set-up change operations of all of the imaging devices 2 associated with the displays set-up number are completed. In addition, in this case, the set-up change operations are completed all of the imaging devices 2 ("CAM6", "CAM4", and "CAM2") associated with the set-up number, and thus, the message control unit 321 displays "Execution Completion" with respect to all of the imaging devices 2 on the camera implementation status display unit 706. In addition, the set-up change operations of all of the imaging devices 2 associated with the set-up number are completed, and thus, the message control unit 321 displays that the operation progress is a stage of "6. Ending Set-up Change" on the operation progress display unit 705.

The set-up change end dialogue 660 includes an OK button 661 and a close button 662. The OK button 661 is a button for ending the set-up change operations with respect to all of the imaging devices 2 associated with the set-up number. The close button 662 is a button for closing the set-up change end dialogue 660.

The set-up change operation described above is completed, and thus, it is possible to set the disposing position of the imaging device 2 corresponding to the set-up change of the set-up number.

(Image Determination Operation of Main Screen)

Figure 27:
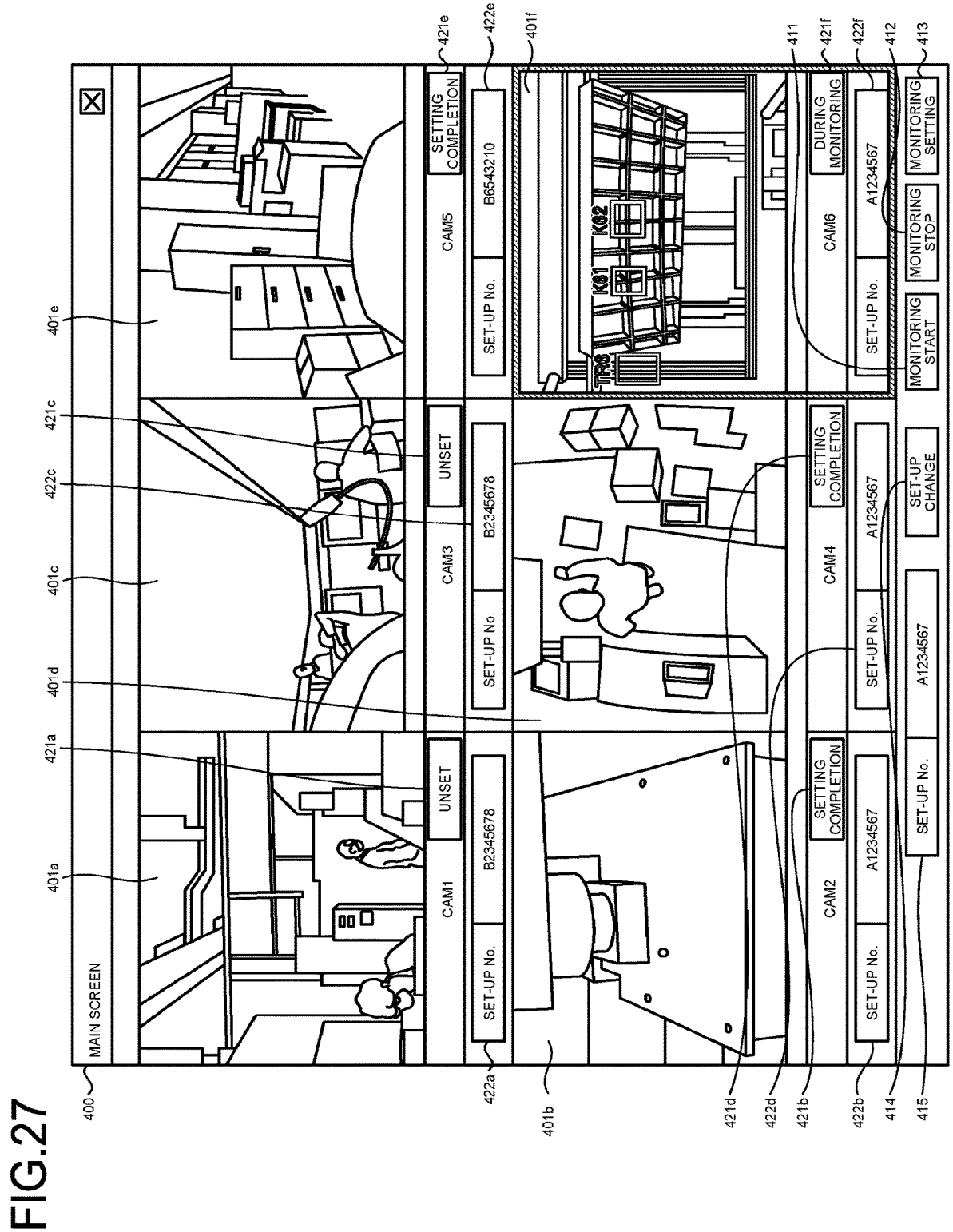
FIG. 27 is a diagram illustrating an example of a state after the set-up change is ended on the main screen to be displayed on the display device of the information processing device according to the embodiment.

FIG. 27 is a diagram illustrating an example of a state after the set-up change is ended on the main screen to be displayed on the display device of the information processing device according to the embodiment. An image determination operation of the main screen 400 will be described with reference to FIG. 27.

In a case where the OK button 661 of the set-up change end dialogue 660 illustrated in FIG. 26 is pressed according to the manipulation of the input unit 303 by the user, the set-up control unit 327 transitioned from the set-up change screen 700 to the main screen 400. The main screen 400 illustrated in FIG. 27 is the main screen 400 displayed after the set-up change operation with respect to the imaging device 2 (the imaging devices 2b, 2d, and 2f) which is associated with the specific set-up number (in the example of FIG. 27, "A1234567") is ended.

The set-up control unit 327 displays the set-up number on set-up number display units 422b, 422d, and 422f respectively corresponding to the imaging devices 2b, 2d, and 2f to which the set-up change operation is ended. In addition, the set-up change operations with respect to the imaging devices 2b, 2d, and 2f are ended, and thus, "Setting Completion" is displayed on each of the set-up control unit 327 state display units 421b, 421d, and 421f.

Next, the user presses the video display unit 401 corresponding to the imaging device 2 to which the image determination operation (the monitoring operation) is planned to be started according to the manipulation of the input unit 303, and sets the selective state. In the example illustrated in FIG. 27, a state is illustrated in which the video display unit 401f is pressed and the selective state is set. Then, in a case where the monitoring start button 411 is pressed according to the manipulation of the input unit 303 by the user, the image determination operation is started with respect to the real-time video data of the imaging device 2f to be displayed on the video display unit 401f. At this time, as illustrated in FIG. 27, the set-up control unit 327 displays "during Monitoring" on the state display unit 421f in order to represent the effect that the image determination operation is executed with respect to the imaging device 2f.

The main screen 400 illustrated in FIG. 27 displays the video data which is received from the plurality of imaging devices 2 in real time, and represents a state in which the trigger region of "TR6", and the detection regions of "K61" and "K62" are designated by the video display unit 401f. Here, the trigger region and the detection region which are designated on the main screen 400 exist in a position which is relatively set with respect to the position of the second base region 802a of which the position is determined by the set-up change screen 700. This is because the position information of the trigger region and the detection region, which is stored in the storing unit 302, is not the information of an absolute position in the display region of the image, but information representing a relative position with respect to the base region (here, the second base region 802a). Furthermore, the position information of the trigger region and the detection region, which is stored in the storing unit 302, may be the information of an absolute position of the display region. In this case, the positions of the trigger region and the detection region are respectively corrected by the trigger region designating unit 305 and the detection region designating unit 307 by a shift amount between the first base region 801 and the second base region 802a.

In the image determination operation of a specific main screen 400, first, the video distributing unit 312 sorts and displays the real-time video data acquired from the video receiving unit 301 on the video display units 401a to 401f. The trigger generating unit 313 acquires a difference image of the frame at the change point which is detected by the change point detecting unit 306 from the storing unit 302. Then, the trigger generating unit 313 compares the difference image with the image in the trigger region of the frame of the video data in the trigger region of "TR6" designated by the video display unit 401f. The trigger generating unit 313 compares the image in the trigger region of the frame of the video data with the difference image of the frame of the change point, and thus, generates the trigger signal at a timing where a difference, which is the total number of pixels of which the pixel value is different by greater than or equal to predetermined sensitivity, is less than a predetermined threshold value.

The detection delay time of the attribute information of the detection regions of "K61" and "K62" is set to a value illustrated in FIG. 14. The detection region determination unit 314 acquires the attribute information of the designated detection region from the storing unit 302. The detection region determination unit 314 compares the detection reference image with the image in the detection region of the frame of the video data in the designated detection region before the setting time or after the setting time at the time of receiving the trigger signal generated by the trigger generating unit 313, and performs the image determination of whether or not there is an abnormality.

Specifically, the detection region determination unit 314 compares the image in the detection region of the frame of the video data after the detection delay time of "2.14" seconds corresponding to the detection region of "K61" from a time point at which the trigger signal corresponding to the trigger region of "TR6" is received from the trigger generating unit 313 with the detection reference image, and performs the image determination of whether or not there is an abnormality. At this time, in the image determination, the detection region determination unit 314 compares the detection reference image with the image in the detection region, and in a case where the difference, which is the total number of pixels of which pixel value is different by greater than or equal to the sensitivity of the attribute information of the detection region of "K61", is greater than or equal to the threshold value of the attribute information, it is determined that the image determination of the detection region of "K61" is abnormal. Thus, examples of a case where the detection region determination unit 314 performs the image determination at a timing earlier than the time point where the trigger signal is received, include a case where in a facility such as a press fitting machine, image determination is performed with respect to a press fitting state after being press-fitted by using a timing where a press fitting operation is started as the trigger. Specifically, the trigger generating unit 313 generates the trigger signal by using a timing where an operation of allowing the press fitting machine to press-fit a press fitting component with respect to the work is started as the trigger. After that, the press fitting machine press-fits the press fitting component with respect to the work, and each actuator of the press fitting machine is returned to an origin position after being press-fitted operation is ended. Then, the detection region determination unit 314 performs the image determination with respect to the press fitting state of the work after being press-fitted. The timing of the image determination of the detection region determination unit 314 is a timing after time set by the detection delay time from the trigger signal is received from the trigger generating unit 313. Time from the start of the press fitting operation in which the trigger signal is generated to the image determination of the press fitting state after being press-fitted is executed is an automatic operation of the press fitting machine, and thus, is fixing time, and the detection delay time from the trigger timing to the image determination is set as the fixing time.

In addition, the detection region determination unit 314 compares the image in the detection region of the frame of the video data after the detection delay time of "−1.86" seconds corresponding to the detection region of "K62" from the time point where the trigger signal corresponding to the trigger region of "TR6" is received from the trigger generating unit 313, that is, before "1.86" seconds, with the detection reference image, and performs the image determination of whether or not there is an abnormality. Thus, examples of a case where the detection region determination unit 314 performs the image determination at a timing before the time point where the trigger signal is received include a case where in a facility such as a press fitting machine in which a press fitting component is manually press-fitted with respect to the work, a timing where an operator puts the work after being press-fitted in a completed product is used as the trigger, and the image determination is performed with respect to the work after being press-fitted in a state of being in the press fitting machine before being put in the completed product. Specifically, first, the operator sets the work before being press-fitted in the press fitting machine. Next, the operator presses a press fitting start button, and allow the press fitting machine to start the press fitting operation of the press fitting component with respect to the work. After the press fitting, the operator picks up the work after being press-fitted and puts the work in the completed product. The trigger generating unit 313 generates the trigger signal by using the timing where the operator puts the work after being press-fitted in the completed product as the trigger. Then, the detection region determination unit 314 performs the image determination with respect to the work a timing after being press-fitted from the time point where the trigger signal is received and before time set by the detection delay time, that is, a timing set in the press fitting machine before being put in the completed product. Thus, it is possible to prevent the following problem by performing the image determination with respect to the work set in the press fitting machine at a timing before the time point where the trigger signal is generated. That is, for example, there is a case where the operator sets the work, and then, temporarily vacates and returns to an operation site due to a lunch break, and after that, puts the work before being the press-fitted in the completed product without recalling the press fitting operation. In this case, a timing where the work is put in the completed product is used as the trigger, and the image determination is performed at a timing before time set by the detection delay time from a time point of the trigger, and thus, it is possible for the operator to determine that the work is not press-fitted yet, and to prevent the work before being press-fitted is mixed in with the completed product.

Then, in a case where the detection region determination unit 314 determines whether or not there is an abnormality, the external output unit 316 outputs the abnormality signal to the external device 10.

(Total Flow of Set-Up Change Operation)

Figure 28:
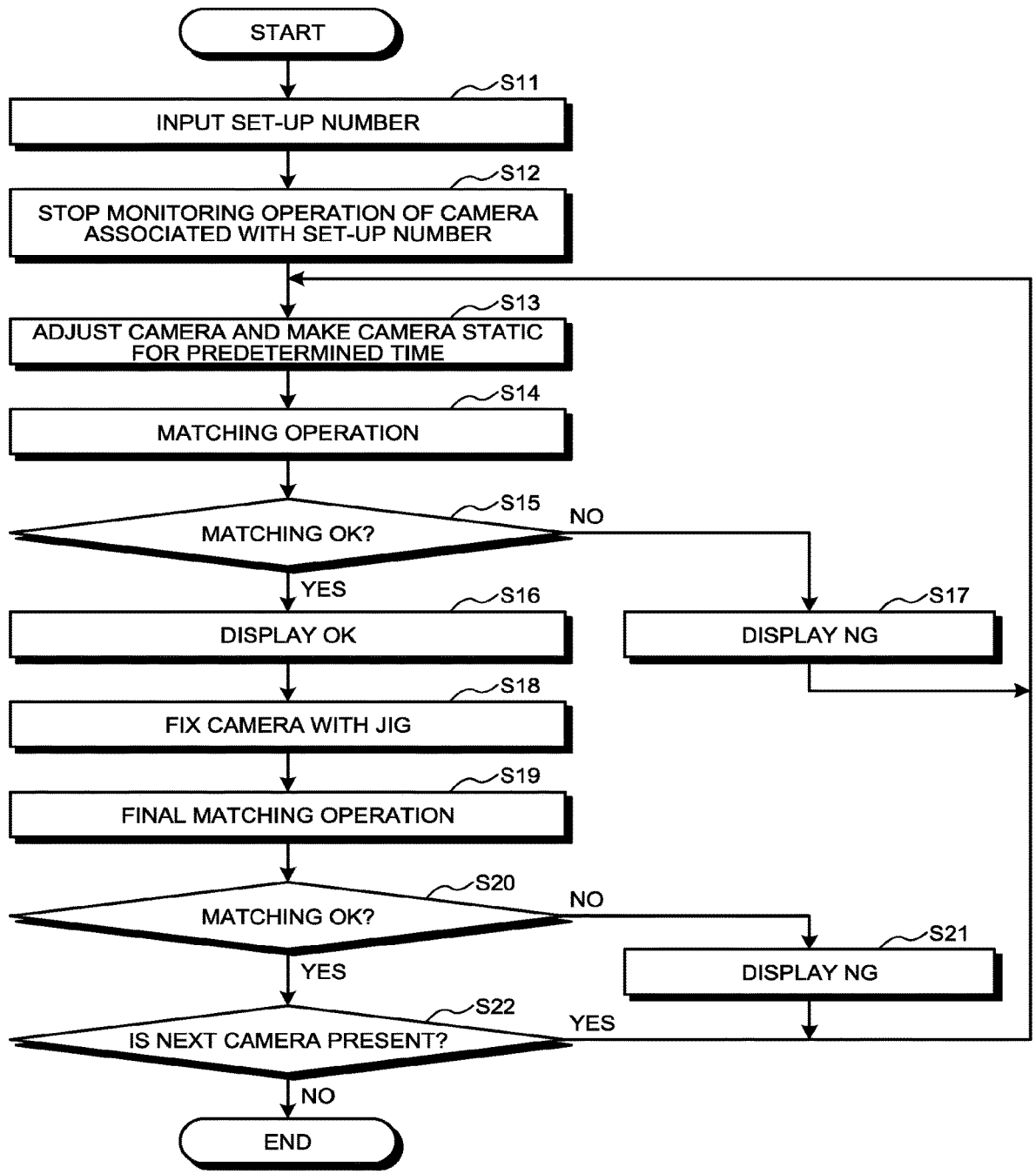
FIG. 28 is a flowchart illustrating an example of a set-up change operation on the set-up change screen to be displayed on the display device of the information processing device according to the embodiment.

FIG. 28 is flowchart illustrating an example of the set-up change operation on the set-up change screen to be displayed on the display device of the information processing device according to the embodiment. The flow of the set-up change operation will be generally described with reference to FIG. 28.

<Step S11>

The user inputs the set-up number of performing the set-up change into the set-up number input unit 415 of the main screen 400 (refer to FIG. 4) according to the manipulation of the input unit 303. In a case where the set-up change button 414 is pressed according to the manipulation of the input unit 303 by the user, the set-up control unit 327 retrieves whether or not the setting information corresponding to the set-up number which is input into the set-up number input unit 415 is stored in the storing unit 302. Hereinafter, a case will be described in which the set-up control unit 327 retrieves the setting information corresponding to the set-up number stored in the storing unit 302. Then, the process proceeds to Step S12.

<Step S12>

The set-up control unit 327 stops the image determination operation (the monitoring operation) of the imaging device 2 associated with the input set-up number. Then, the set-up control unit 327 is transitioned from the main screen 400 to the set-up change screen 700. Then, the process proceeds to Step S13.

<Step S13>

The message control unit 321 displays the message information of urging the adjustment of the position of the imaging device 2 which is the set-up change target on the operation instruction display unit 704, and displays that the operation progress of the set-up change operation is the stage of "1. Adjusting Camera to be Matched to Reference" on the operation progress display unit 705. The video display unit 322 extracts the image extracted from the frame of the real-time video data to be displayed on the real-time video display unit 703b (the image in the provisional base region 802), and displays the extracted image on the extracted image display unit 702b, while the user adjusts the position of the imaging device 2. The user moves the imaging device 2 to a position illustrated in FIG. 18 and makes the imaging device 2 static.

<Step S14>

The static state determination unit 325 determines whether or not the imaging device 2 is static. In a case where the static state determination unit 325 determines that the imaging device 2 is static, the base region specifying unit 323 executes the matching operation of searching for the image which is coincident with the base reference image in the frame of the video data displayed on the real-time video display unit 703b. The message control unit 321 displays the message information representing the effect that the matching operation is executed (in the example of FIG. 19, displays "Now Checking by System") on the operation instruction display unit 704, while the matching operation is executed by the base region specifying unit 323. In addition, the message control unit 321 displays that the operation progress of the set-up change operation is the stage of "2. Checking by System" on the operation progress display unit 705. Then, the process proceeds to Step S15.

<Step S15>

In a case where the matching operation of the base region specifying unit 323 is successful (in FIG. 28, represented as "Matching OK") (Step S15: Yes), the process proceeds to Step S16, and as a result of the matching operation, and in a case where the image which is coincident with the base reference image is not observed in the frame of the video data displayed on the real-time video display unit 703b (Step S15: No), the process proceeds to Step S17.

<Step S16>

In a case where the matching operation is successful, as illustrated in FIG. 22, the base region specifying unit 323 displays the provisional adjustment result notification dialogue 640 representing the effect that the matching operation is successful (in FIG. 28, represented as "Display OK") and the effect of urging the imaging device 2 to be fixed. In addition, as a result of the matching operation, the base region specifying unit 323 represents the image which is coincident with the base reference image by moving the provisional base region 802, in the frame displayed on the real-time video display unit 703b. In addition, the message control unit 321 displays that the operation progress of the set-up change operation is the stage of "3. Fixing Camera with Jig" on the operation progress display unit 705. Then, the process proceeds to Step S18.

<Step S17>

The message control unit 321 displays the message information representing the effect that the matching operation is not successful (in FIG. 28, represented as "Display NG") on the operation instruction display unit 704. In addition, the matching operation is not successful, and thus, it is necessary for the user to adjust again the position of the imaging device 2, and therefore, the message control unit 321 displays that the operation progress of the set-up change operation is returned to the stage of "1. Adjusting Camera to be Matched to Reference" on the operation progress display unit 705. Then, the process is returned to Step S13.

<Step S18>

The user fixes the imaging device 2 according to the message represented by the provisional adjustment result notification dialogue 640, and then, presses the OK button 641 according to the manipulation of the input unit 303. Then, the process proceeds to Step S19.

<Step S19>

As illustrated in FIG. 23, the base region determiner 326 displays the search progress dialogue 630, and executes the final matching operation (the matching operation for the final confirmation). In addition, the message control unit 321 displays the message information representing that the final matching operation is executed (in the example of FIG. 23, displays "Now Making Final Check by System") on the operation instruction display unit 704, while the final matching operation of the base region determiner 326 is executed. In addition, the message control unit 321 displays that the operation progress of the set-up change operation is the stage of "4. Making Final Check by System" on the operation progress display unit 705. Then, the process proceeds to Step S20.

<Step S20>

In a case where the final matching operation of the base region determiner 326 is successful (in FIG. 28, represented as "Matching OK") (Step S20: Yes), the process proceeds to Step S22, and as a result of the final matching operation, in a case where the image which is coincident with the base reference image is not observed in the frame of the video data displayed on the real-time video display unit 703b (Step S20: No), the process proceeds to Step S21.

<Step S21>

The message control unit 321 displays the message information representing that the final matching operation is not successful (in FIG. 28, represented as "Display NG") on the operation instruction display unit 704. In addition, the final matching operation is not successful, and thus, this necessary for the user to adjust again the position of the imaging device 2, and therefore, the message control unit 321 displays that the operation progress of the set-up change operation is returned to the stage of "1. Adjusting Camera to be Matched to Reference" on the operation progress display unit 705. Then, the process is returned to Step S13.

<Step S22>

In a case where the final matching operation is successful, as illustrated in FIGS. 25 and 26, the base region determiner 326 represents the image which is coincident with the base reference image in the frame displayed on the real-time video display unit 703b as the second base region 802a, by moving the provisional base region 802. That is, the base region determiner 326 determines the position of the second base region 802a as the position which is corrected from the position corresponding to the first base region 801 of the reference static image display unit 703a. In addition, the base region determiner 326 stores the information of the determined second base region 802a in the storing unit 302 in association with the set-up number. Accordingly, the set-up change operation with respect to one imaging device 2 which is associated with the set-up number is completed. In addition, the message control unit 321 displays "Execution Completion" for representing that the set-up change operation with respect to the imaging device 2 which is associated with the set-up number is completed on the camera implementation status display unit 706.

Then, in a case where the set-up change operation of one imaging device 2 associated with the set-up number is completed, and there is the imaging device 2 which is similarly associated with the same set-up number and to which the set-up change operation is not completed (Step S22: Yes), as illustrated in FIG. 25, the set-up control unit 327 displays the next camera processing dialogue 650 representing the effect of allowing the operation to proceed to the set-up change operation with respect to the next imaging device 2. Then, in a case where the OK button 651 is pressed according to the manipulation of the input unit 303 by the user, the process proceeds to Step S13.

In contrast, in a case where the set-up change operation of one imaging device 2 associated with the set-up number (in the above description, the imaging device 2f) is completed, and there is no imaging device 2 which is similarly associated with the same set-up number and to which the set-up change operation is not completed (Step S22: No), as illustrated in FIG. 26, the set-up control unit 327 displays the set-up change end dialogue 660 representing the effect that the set-up change operations of all of the imaging devices 2 associated with the set-up number are completed. In a case where the OK button 661 of the set-up change end dialogue 660 illustrated in FIG. 26 is pressed according to the manipulation of the input unit 303 by the user, the set-up control unit 327 is transitioned from the set-up change screen 700 to the main screen 400. Accordingly, the set-up change operations of all of the imaging devices 2 associated with the set-up number are ended.

As described above, when the set-up change is performed, the base region determiner 326 executes the matching operation of searching for a region which is coincident (matched) with the base reference image in the frame of the video data of the imaging device 2 of which the disposing position is changed by the user, and determines the second base region 802a which is coincident with the base reference image, in the frame of the video data of the imaging device 2. At this time, the position of the determination region such as the trigger region and the detection region is corrected by a shift amount between the position of the first base region 801 representing the base reference image and the position of the second base region 802a determined by the base region determiner 326. Accordingly, when the set-up change is performed, it is not necessary to revise and designate again the determination region, and a correct change position of the imaging device 2 is represented according to the success and failure of the matching operation, and thus, it is possible to easily dispose the disposing position of the imaging device 2 in the correct change position (the position of the set-up change). In addition, when the set-up change is performed, the matching operation described above is executed, and thus, it is not necessary to dispose the imaging device 2 such that the frame of the real-time video data of the imaging device 2 is completely coincident with the reference static image, and it is possible to easily dispose the disposing position of the imaging device 2 in the correct change position (the position of the set-up change).

In addition, when the set-up change is performed, in a case where the imaging device 2 is disposed in the change position and is static, the matching operation is automatically executed by the base region specifying unit 323. Then, in a case where the matching operation is successful, the imaging device 2 is fixed by the user, and then, the final matching operation is executed by the base region determiner 326. In a case where the matching operation is manually performed after the imaging device 2 is fixed, and the matching is failed, the fixation of the imaging device 2 is released, and it is necessary to adjust the revised disposing position, but as with the operation described above, the matching operation is automatically executed in a state where the imaging device 2 is static, and thus, the disposing position of the imaging device 2 is easily adjusted, and an operation load of the set-up change can be reduced.

In addition, in the set-up change screen 700, it is desirable that the frame of the first base region 801 is displayed on the reference static image display unit 703a, and the frames of the provisional base region 802 and the second base region 802a are displayed on the real-time video display unit 703b. Accordingly, the user is a guide for the direction of the imaging device 2 in which the imaging device 2 is imaged, and thus, the disposing position of the imaging device 2 is easily adjusted, and the operation load of the set-up change can be reduced.

In addition, it is desirable that the base region specifying unit 323 and the base region determiner 326 execute the matching operation in a predetermined range of the frame displayed on the real-time video display unit 703b. Accordingly, the processing load of the matching operation can be reduced.

In addition, when the set-up change operation is started, it is desirable that the set-up control unit 327 automatically stops the image determination operation of the imaging device 2 associated with the set-up number (the monitoring operation). Accordingly, it is necessary to manually stop the monitoring operations of one or more imaging devices 2 associated with the set-up number one by one, and thus, the operation load of the set-up change can be reduced.

In addition, a change operation procedure of the disposing position of the imaging device 2 illustrated in FIG. 28 is not limited to a case where the set-up change is performed, and can be applied to a case where the disposing position of the imaging device 2 in a scene is changed, other than the set-up change.

Furthermore, in the setting screen 500, the trigger region and the detection region are designated as a region other than the base region 570, but the region is not limited thereto, and other determination regions may be designated. For example, in the detection region, the image determination is performed on the basis of the trigger signal, and a full-time detection region can be designated in which the image determination is constantly performed.

In addition, the trigger signal generated by the trigger generating unit 313 is used as a reference of a timing for the image determination of the detection region determination unit 314 in the embodiment described above, but the reference is not limited thereto. For example, the trigger signal may be used as a reference of a timing where predetermined processing is performed on a production facility side, and in this case, the trigger signal may be transmitted to the production facility at a time point where the trigger signal is generated.

In addition, in a case where at least any one of the first reproducing unit 304, the trigger region designating unit 305, the change point detecting unit 306, the detection region designating unit 307, the setting unit 308, the video distributing unit 312, the trigger generating unit 313, the detection region determination unit 314, the message control unit 321, the video display unit 322, the base region specifying unit 323, the image extracting unit 324, the static state determination unit 325, the base region determiner 326, the set-up control unit 327, and the base region designating unit 331 of this embodiment is realized by executing a program, the program is provided by being incorporated in advance in an ROM or the like. In addition, the program to be executed in the information processing device 3 of this embodiment may be configured to be provided by being recorded in a recording medium which is readable by a computer such as a CD-ROM, a flexible disk (FD), a CD-R, and a DVD in a file of an installable format or an executable format. In addition, the program to be executed in the information processing device 3 of this embodiment may be configured to be stored on a computer connected to a network such as the internet and to be provided by being downloaded through a network. In addition, the program to be executed in the information processing device 3 of this embodiment may be configured to be provided or distributed through the network such as the internet. The program to be executed in the information processing device 3 of this embodiment has a module configuration including at least any one of the first reproducing unit 304, the trigger region designating unit 305, the change point detecting unit 306, the detection region designating unit 307, the setting unit 308, the video distributing unit 312, the trigger generating unit 313, the detection region determination unit 314, the message control unit 321, the video display unit 322, the base region specifying unit 323, the image extracting unit 324, the static state determination unit 325, the base region determiner 326, the set-up control unit 327, and the base region designating unit 331 described above, and the CPU reads out and executes the program from the ROM described above as actual hardware, and thus, each of the units described above may be generated by being loaded on a main storing device.

According to an embodiment, it is possible to easily dispose a camera in a correct change position.

The above-described embodiments are illustrative and do not limit the present invention. Thus, numerous additional modifications and variations are possible in light of the above teachings. For example, at least one element of different illustrative and exemplary embodiments herein may be combined with each other or substituted for each other within the scope of this disclosure and appended claims. Further, features of components of the embodiments, such as the number, the position, and the shape are not limited the embodiments and thus may be preferably set. It is therefore to be understood that within the scope of the appended claims, the disclosure of the present invention may be practiced otherwise than as specifically described herein.

The method steps, processes, or operations described herein are not to be construed as necessarily requiring their performance in the particular order discussed or illustrated, unless specifically identified as an order of performance or clearly identified through the context. It is also to be understood that additional or alternative steps may be employed.

Further, any of the above-described apparatus, devices or units can be implemented as a hardware apparatus, such as a special-purpose circuit or device, or as a hardware/software combination, such as a processor executing a software program.

Further, as described above, any one of the above-described and other methods of the present invention may be embodied in the form of a computer program stored in any kind of storage medium. Examples of storage mediums include, but are not limited to, flexible disk, hard disk, optical discs, magneto-optical discs, magnetic tapes, non-volatile memory, semiconductor memory, read-only-memory (ROM), etc.

Alternatively, any one of the above-described and other methods of the present invention may be implemented by an application specific integrated circuit (ASIC), a digital signal processor (DSP) or a field programmable gate array (FPGA), prepared by interconnecting an appropriate network of conventional component circuits or by a combination thereof with one or more conventional general purpose microprocessors or signal processors programmed accordingly.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA) and conventional circuit components arranged to perform the recited functions.

REFERENCE SIGNS LIST

1 IMAGE PROCESSING SYSTEM
2, 2a to 2f IMAGING DEVICE
3 INFORMATION PROCESSING DEVICE
4 NETWORK
10 EXTERNAL DEVICE
101 CPU
102 ROM
103 RAM
104 EXTERNAL STORING DEVICE
105 DISPLAY
106 NETWORK I/F
107 KEYBOARD
108 MOUSE
109 DVD DRIVE
110 DVD
111 EXTERNAL DEVICE I/F
112 BUS
301 VIDEO RECEIVING UNIT
302 STORING UNIT
303 INPUT UNIT
304 FIRST REPRODUCING UNIT
305 TRIGGER REGION DESIGNATING UNIT
306 CHANGE POINT DETECTING UNIT
307 DETECTION REGION DESIGNATING UNIT
308 SETTING UNIT
312 VIDEO DISTRIBUTING UNIT
313 TRIGGER GENERATING UNIT
314 DETECTION REGION DETERMINATION UNIT
315 DISPLAY CONTROL UNIT
316 EXTERNAL OUTPUT UNIT
317 DISPLAY UNIT
321 MESSAGE CONTROL UNIT
322 VIDEO DISPLAY UNIT
323 BASE REGION SPECIFYING UNIT
324 IMAGE EXTRACTING UNIT
325 STATIC STATE DETERMINATION UNIT
326 BASE REGION DETERMINER
327 SET-UP CONTROL UNIT
331 BASE REGION DESIGNATING UNIT

400 MAIN SCREEN
401, 401a to 401f VIDEO DISPLAY UNIT
411 MONITORING START BUTTON
412 MONITORING STOP BUTTON
413 MONITORING SETTING BUTTON
414 SET-UP CHANGE BUTTON
415 SET-UP NUMBER INPUT UNIT
421, 421a to 421f STATE DISPLAY UNIT
422, 422a to 422f SET-UP NUMBER DISPLAY UNIT
500 SETTING SCREEN
501 CAMERA SELECTION TAB
502 SETTING VIDEO DISPLAY UNIT
503a REPRODUCING BUTTON
503b TEMPORARY STOP BUTTON
503c FAST-FORWARD BUTTON
503d FAST-BACKWARD BUTTON
503e STOP BUTTON
504 SEEK BAR
505 SLIDER
506 TIME DISPLAY UNIT
507 TRIGGER REGION INFORMATION PORTION
508a REFERENCE IMAGE DISPLAY UNIT
508b DIFFERENCE IMAGE DISPLAY UNIT
509 DETECTION REGION INFORMATION PORTION
510 DETECTION REGION BUTTON PORTION
510a ACTION BUTTON
510b IMAGE DETERMINATION SELECTION BUTTON
510c DELETION BUTTON
510e SENSITIVITY INCREASE BUTTON
510f SENSITIVITY DECREASE BUTTON
510g THRESHOLD VALUE INCREASE BUTTON
510h THRESHOLD VALUE DECREASE BUTTON
511 SETTING READOUT BUTTON
512 SETTING WRITE-IN BUTTON
513 SETTING REFLECTION BUTTON
514 CLOSE BUTTON
515 SET-UP NUMBER DISPLAY UNIT
530 TRIGGER REGION
535, 536 DETECTION REGION
540 TRIGGER MARK
551 REGION SELECTION TAB
561 SET-UP NUMBER DISPLAY UNIT
562 BASE REGION INFORMATION PORTION
563 DELETION BUTTON
570 BASE REGION
600 CHANGE POINT SELECTING DIALOGUE
601 YES BUTTON
602 NO BUTTON
603 CLOSE BUTTON
610 NO CHANGE POINT NOTIFICATION DIALOGUE
611 OK BUTTON
612 CLOSE BUTTON
620 NO SET-UP NUMBER NOTIFICATION DIALOGUE
621 OK BUTTON
622 CLOSE BUTTON
630 SEARCH PROGRESS DIALOGUE
640 PROVISIONAL ADJUSTMENT RESULT NOTIFICATION DIALOGUE
641 OK BUTTON
642 CLOSE BUTTON
650 NEXT CAMERA PROCESSING DIALOGUE
651 OK BUTTON
652 CLOSE BUTTON
660 SET-UP CHANGE END DIALOGUE
661 OK BUTTON
662 CLOSE BUTTON
700 SET-UP CHANGE SCREEN
701 SET-UP NUMBER DISPLAY UNIT
702a REFERENCE IMAGE DISPLAY UNIT
702b EXTRACTED IMAGE DISPLAY UNIT
703a REFERENCE STATIC IMAGE DISPLAY UNIT
703b REAL-TIME VIDEO DISPLAY UNIT
704 OPERATION INSTRUCTION DISPLAY UNIT
705 OPERATION PROGRESS DISPLAY UNIT
706 CAMERA IMPLEMENTATION STATUS DISPLAY UNIT
707 PAUSE BUTTON
801 FIRST BASE REGION
802 PROVISIONAL BASE REGION
802a SECOND BASE REGION

What is claimed is:

1. An image processing device, comprising:
a display to display a first display region displaying a static image, which is a reference for matching an imaging device to a predetermined imaging position and a second display region displaying video data which is imaged by the imaging device;
a memory, storing information representing a relative positional relationship between a determination region, which is a target of image determination performed with respect to the video data imaged by the imaging device and a first reference region set at a fixed first position in the first display region, the determination region being different from the first reference region; and
processing circuitry configured to
execute a first matching operation of searching for a coincident image that is coincident with an image of the first reference region, in a frame of the video data displayed in the second display region, and determine a region of the coincident image as a second reference region; and
correct a position of the determination region based on (1) a shift amount between the first position of the first reference region in the first display region and a second position of the second reference region in the second display region, and (2) the stored information representing the relative positional relationship between the determination region and the first reference region.

2. The image processing device according to claim 1, the processing circuitry is further configured to:
receive a manipulation input;
determine whether or not a position of the imaging device is static; and
execute a second matching operation of searching for the coincident image coincident with the image of the first reference region, in the frame of the video data displayed on the second display region, and specify a region of the coincident image as a provisional reference region, when determining that the position of the imaging device is static,
wherein the processing circuitry is further configured to execute the first matching operation after a predetermined manipulation input is received after the provisional reference region is specified.

3. The image processing device according to claim 2, wherein the display is configured to display a frame surrounding the first reference region of the first display region, and display frames surrounding the provisional reference region and the second reference region of the second display region.

4. The image processing device according to claim 2, wherein the processing circuitry is further configured to determine that the position of the imaging device is static when it is determined that adjacent preceding and following frames are identical to each other with respect to frames for a predetermined time, from among frames of the video data displayed on the second display region.

5. The image processing device according to claim 2, wherein the processing circuitry is further configured to search for the coincident image coincident with the image of the first reference region in a predetermined range of the frame of the video data displayed on the second display region in the second matching operation.

6. The image processing device according to claim 1, wherein the processing circuitry is further configured to search for the coincident image coincident with the image of the first reference region in a predetermined range of the frame of the video data displayed on the second display region in the first matching operation.

7. The image processing device according to claim 1, wherein the processing circuitry is further configured to not determine the region of the coincident image as the second reference region in the first matching operation, when the determination region determined at the position which is corrected by the shift amount between the region of the coincident image coincident with the image of the first reference region, in the frame of the video data displayed on the second display region and the first reference region, protrudes from the second display region.

8. The image processing device according to claim 1, wherein the display is configured to:
display real-time video data, which is imaged by the imaging device, in the second display region; and
display the first display region and the second display region together.

9. The image processing device according to claim 1, wherein
the imaging device includes a plurality of imaging devices, and
in a set-up change operation, one or more imaging devices associated with set-up identification information in addition to the imaging device become a set-up change target.

10. The image processing device according to claim 9, wherein the processing circuitry is further configured to stop an operation of the image determination with respect to video data of the one or more imaging devices associated with the set-up identification information, at starting the set-up change operation.

11. An image processing system, comprising:
the image processing device according to claim 1; and
the imaging device.

12. An image processing method, comprising:
displaying a first display region displaying a static image, which is a reference for matching an imaging device to a predetermined imaging position and a second display region displaying video data imaged by the imaging device;
storing information representing a relative positional relationship between a determination region, which is a target of image determination performed with respect to the video data imaged by the imaging device and a first reference region set at a fixed first position in the first display region, the determination region being different from the first reference region;
executing a first matching operation of searching for a coincident image which that is coincident with an image of the first reference region, in a frame of the video data displayed in the second display region, and determining a region of the coincident image as a second reference region; and
correcting a position of the determination region based on (1) a shift amount between the first position of the first reference region in the first display region and a second position of the second reference region in the second display region, and (2) the stored information representing the relative positional relationship between the determination region and the first reference region.

* * * * *